United States Patent
Kubota et al.

(10) Patent No.: US 11,067,841 B2
(45) Date of Patent: Jul. 20, 2021

(54) MANUFACTURING METHOD OF A DISPLAY DEVICE COMPRISING POLYMERIZING A MONOMER CONTAINED IN A SECOND LIQUID CRYSTAL LAYER IN A REGION NOT OVERLAPPING WITH A COLORING LAYER BY LIGHT IRRADIATION

(71) Applicant: Semiconductor Energy Laboratory Co., Ltd., Atsugi (JP)

(72) Inventors: Daisuke Kubota, Atsugi (JP); Masaru Nakano, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 428 days.

(21) Appl. No.: 15/714,138

(22) Filed: Sep. 25, 2017

(65) Prior Publication Data
US 2018/0095312 A1 Apr. 5, 2018

(30) Foreign Application Priority Data

Oct. 3, 2016 (JP) .............................. JP2016-195604

(51) Int. Cl.
*G02F 1/1333* (2006.01)
*G02F 1/1335* (2006.01)
(Continued)

(52) U.S. Cl.
CPC ...... *G02F 1/133377* (2013.01); *G02F 1/1343* (2013.01); *G02F 1/13471* (2013.01);
(Continued)

(58) Field of Classification Search
CPC ......... G02F 1/133524; G02F 1/133602; G02F 1/133377; G02F 1/13471
See application file for complete search history.

(56) References Cited

U.S. PATENT DOCUMENTS 6,714,268 B2 3/2004 Wang et al.
7,038,641 B2 5/2006 Hirota et al.
(Continued)

FOREIGN PATENT DOCUMENTS

JP 2001-066593 A 3/2001
JP 2002-196702 A 7/2002
(Continued)

OTHER PUBLICATIONS

Shieh.H, "Transflective display by Hybrid OLED and LCD", LEOS 2005 (IEEE Lasers and Electro-Optics Society Annual Meeting), Oct. 22, 2005, pp. 650-651, IEEE.
(Continued)

*Primary Examiner* — Paul C Lee
(74) *Attorney, Agent, or Firm* — Robinson Intellectual Property Law Office; Eric J. Robinson

(57) ABSTRACT

Provided is a display device having high visibility regardless of the intensity of external light. Provided is a display device capable of a variety of display. Provided is a display device that can operate with low power consumption. The display device includes a first electrode, a second electrode, a first liquid crystal layer, a second liquid crystal layer, a first coloring layer, and a first insulating layer. The first liquid crystal layer overlaps with the second liquid crystal layer with the first insulating layer therebetween. The first electrode is configured to reflect visible light. The second electrode includes a portion not overlapping with the first electrode and is configured to transmit visible light. The second liquid crystal layer includes a first portion overlapping with the first coloring layer and the second electrode, and a second portion not overlapping with the first coloring layer. The first portion contains monomers and liquid crystal. The second portion contains a polymer obtained by polymerization of the monomers.

6 Claims, 26 Drawing Sheets

(51) Int. Cl.
*G02F 1/1347* (2006.01)
*G02F 1/13357* (2006.01)
*G02F 1/1343* (2006.01)

(52) U.S. Cl.
CPC .. *G02F 1/133345* (2013.01); *G02F 1/133524* (2013.01); *G02F 1/133528* (2013.01); *G02F 1/133553* (2013.01); *G02F 1/133602* (2013.01)

(56) References Cited

U.S. PATENT DOCUMENTS

| | | |
|---|---|---|
| 7,084,936 B2 | 8/2006 | Kato |
| 7,102,704 B2 | 9/2006 | Mitsui et al. |
| 7,176,991 B2 | 2/2007 | Mitsui et al. |
| 7,239,361 B2 | 7/2007 | Kato |
| 7,248,235 B2 | 7/2007 | Fujii et al. |
| 7,385,654 B2 | 6/2008 | Mitsui et al. |
| 7,674,650 B2 | 3/2010 | Akimoto et al. |
| 7,732,819 B2 | 6/2010 | Akimoto et al. |
| 7,910,490 B2 | 3/2011 | Akimoto et al. |
| 7,932,521 B2 | 4/2011 | Akimoto et al. |
| 8,274,077 B2 | 9/2012 | Akimoto et al. |
| 8,466,463 B2 | 6/2013 | Akimoto et al. |
| 8,629,069 B2 | 1/2014 | Akimoto et al. |
| 8,669,550 B2 | 3/2014 | Akimoto et al. |
| 8,790,959 B2 | 7/2014 | Akimoto et al. |
| 8,796,069 B2 | 8/2014 | Akimoto et al. |
| 9,099,562 B2 | 8/2015 | Akimoto et al. |
| 2003/0201960 A1 | 10/2003 | Fujieda |
| 2006/0072047 A1 | 4/2006 | Sekiguchi |
| 2008/0180618 A1 | 7/2008 | Fujieda |
| 2008/0186435 A1* | 8/2008 | Son .................. G02F 1/133514 349/106 |
| 2008/0308805 A1 | 12/2008 | Akimoto et al. |
| 2009/0040446 A1* | 2/2009 | Hong ................... G02F 1/1337 349/129 |
| 2010/0171905 A1 | 7/2010 | Huang et al. |
| 2011/0102697 A1* | 5/2011 | Koyama ............. G02F 1/13454 349/43 |
| 2011/0104851 A1 | 5/2011 | Akimoto et al. |
| 2011/0121290 A1 | 5/2011 | Akimoto et al. |
| 2012/0075563 A1* | 3/2012 | Takeda .............. G02F 1/133377 349/139 |
| 2015/0340513 A1 | 11/2015 | Akimoto et al. |
| 2017/0082887 A1 | 3/2017 | Kubota et al. |
| 2017/0351141 A1 | 12/2017 | Kubota et al. |
| 2018/0039125 A1 | 2/2018 | Kubota et al. |

FOREIGN PATENT DOCUMENTS

| | | |
|---|---|---|
| JP | 2002-328630 A | 11/2002 |
| JP | 2003-076302 A | 3/2003 |
| JP | 2003-157026 A | 5/2003 |
| JP | 2003-157029 A | 5/2003 |
| JP | 2003-228304 A | 8/2003 |
| JP | 2003-316295 A | 11/2003 |
| JP | 2003-322850 A | 11/2003 |
| JP | 2004-296162 A | 10/2004 |
| JP | 2007-096055 A | 4/2007 |
| JP | 2007-123861 A | 5/2007 |
| JP | 2007193307 A * | 8/2007 |
| JP | 2007-232882 A | 9/2007 |
| JP | 2007240726 A * | 9/2007 |
| JP | 4161574 B2 | 10/2008 |
| JP | 2013041165 A * | 2/2013 |
| JP | 2013-221965 A | 10/2013 |
| JP | 2014041183 A * | 3/2014 |
| WO | WO-2004-053819 A | 6/2004 |

OTHER PUBLICATIONS

Lee.J et al., "High ambient-contrast-ratio display using tandem reflective liquid crystal display and organic light-emitting device", Optics Express, Nov. 14, 2005, vol. 13, No. 23, pp. 9431-9438.

* cited by examiner

MANUFACTURING METHOD OF A DISPLAY DEVICE COMPRISING POLYMERIZING A MONOMER CONTAINED IN A SECOND LIQUID CRYSTAL LAYER IN A REGION NOT OVERLAPPING WITH A COLORING LAYER BY LIGHT IRRADIATION

BACKGROUND OF THE INVENTION

1. Field of the Invention

One embodiment of the present invention relates to a display device. One embodiment of the present invention relates to a method for manufacturing a display device. One embodiment of the present invention relates to a display device including a liquid crystal element and a method for manufacturing the display device.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

In this specification and the like, a semiconductor device refers to any device that can function by utilizing semiconductor characteristics. A transistor, a semiconductor circuit, an arithmetic device, a memory device, and the like are each one embodiment of a semiconductor device. An imaging device, an electro-optical device, a power generation device (including a thin film solar cell, an organic thin film solar cell, and the like in its category), and an electronic device may each include a semiconductor device.

2. Description of the Related Art

An example of display devices is liquid crystal display devices provided with liquid crystal elements. For example, active matrix liquid crystal display devices, in each of which pixel electrodes are arranged in a matrix and transistors are used as switching elements connected to respective pixel electrodes, have attracted attention.

For example, an active matrix liquid crystal display device including transistors, in each of which a metal oxide is used for a channel formation region, as switching elements connected to respective pixel electrodes is known (Patent Documents 1 and 2).

As active matrix liquid crystal display devices, two major types are known: a transmissive type and a reflective type.

In a transmissive liquid crystal display device, a backlight such as a cold cathode fluorescent lamp or a light-emitting diode (LED) is used, and the optical modulation action of liquid crystal is utilized to select one of the two states: a state where light from the backlight passes through liquid crystal to be output to the outside of the liquid crystal display device and a state where light is not output to the outside of the liquid crystal display device, whereby a bright or dark image is displayed. Furthermore, bright and dark images are combined to display an image.

In a reflective liquid crystal display device, the optical modulation action of liquid crystal is utilized to select one of the two states: a state where external light, that is, incident light is reflected on a pixel electrode to be output to the outside of the device and a state where incident light is not output to the outside of the device, whereby a bright or dark image is displayed. Furthermore, bright and dark images are combined to display an image. Unlike a transmissive liquid crystal display device, a reflective liquid crystal display device does not use a backlight and thus has an advantage of low power consumption.

REFERENCE

Patent Documents

[Patent Document 1] Japanese Published Patent Application No. 2007-123861
[Patent Document 2] Japanese Published Patent Application No. 2007-096055

SUMMARY OF THE INVENTION

Display devices incorporated in mobile phones, smartphones, tablet terminals, smart watches, and the like, which are portable, are required to be reduced in thickness and weight and operate with low power consumption, for example.

An object of one embodiment of the present invention is to provide a display device having high visibility regardless of the intensity of external light. Another object is to provide a display device that can perform various display methods. Another object is to provide a display device that can operate with low power consumption.

Another object of one embodiment of the present invention is to provide a thin display device. Another object of one embodiment of the present invention is to provide a lightweight display device. Another object of one embodiment of the present invention is to provide a bendable display device. Another object of one embodiment of the present invention is to provide a display device with high strength. Another object of one embodiment of the present invention is to provide a novel display device.

Note that the descriptions of these objects do not disturb the existence of other objects. In one embodiment of the present invention, there is no need to achieve all the objects. Other objects can be derived from the description of the specification and the like.

One embodiment of the present invention is a display device including a first electrode, a second electrode, a first liquid crystal layer, a second liquid crystal layer, a first coloring layer, and a first insulating layer. The first liquid crystal layer overlaps with the second liquid crystal layer with the first insulating layer provided therebetween. The first electrode is configured to reflect visible light. The second electrode includes a portion not overlapping with the first electrode. The second electrode is configured to transmit visible light. The second liquid crystal layer includes a first portion and a second portion. The first portion overlaps with the first coloring layer and the second electrode. The second portion does not overlap with the first coloring layer. The first portion contains monomers and liquid crystal. The second portion contains a polymer obtained by polymerization of the monomers.

In the above embodiment, the display device preferably includes a third electrode facing the first electrode with the first liquid crystal layer therebetween, and a fourth electrode facing the second electrode with the second liquid crystal layer therebetween. Each of the third electrode and the fourth electrode is preferably configured to transmit visible light.

In the above embodiment, the coloring layer and the second electrode preferably include a portion overlapping with each other with the second liquid crystal layer therebetween.

In the above embodiment, the display device preferably includes a first structure body that transmits visible light and has an insulating property. A side surface of the first structure body is preferably covered with the first liquid crystal layer. The first structure body preferably includes a portion overlapping with the second electrode and not overlapping with the first electrode.

In the above embodiment, the display device preferably includes a second structure body having an insulating property. A side surface of the second structure body is preferably in contact with the second portion of the second liquid crystal layer.

In the above embodiment, the display device preferably includes a first transistor and a second transistor over one surface. The first transistor and the second transistor are preferably located between the first insulating layer and the second liquid crystal layer. The first transistor is preferably electrically connected to the first electrode through an opening provided in the first insulating layer. The second transistor is preferably electrically connected to the second electrode. Each of the first transistor and the second transistor preferably contains a metal oxide in a semiconductor layer where a channel is formed.

Another embodiment of the present invention is a display module including the display device described above, a first polarizing plate, a second polarizing plate, and a backlight unit. The first polarizing plate is located outward from the first liquid crystal layer of the display device. The second polarizing plate is located outward from the second liquid crystal layer of the display device. The backlight unit is located outward from the second polarizing plate and is configured to emit light to the second liquid crystal layer side.

Another embodiment of the present invention is a manufacturing method of a display device including a first step of forming a first electrode over a first substrate; a second step of forming a coloring layer over a second substrate; a third step of bonding the first substrate and the second substrate such that a liquid crystal layer containing a liquid crystal, a monomer, and a polymerization initiator is sandwiched therebetween and a portion where the coloring layer and the first electrode do not overlap with each other is formed; and a fourth step of polymerizing the monomer contained in the liquid crystal layer in a region not overlapping with the coloring layer by light irradiation to the coloring layer and the liquid crystal layer from the second substrate side.

Another embodiment of the present invention is a manufacturing method of a display device including a first step of forming, over a support substrate, a first electrode, an insulating layer covering the first electrode, and a second electrode including a portion not overlapping with the first electrode over the insulating layer; a second step of forming, over a second substrate, a coloring layer and a fourth electrode over the coloring layer; a third step of bonding the support substrate and the second substrate such that a second liquid crystal layer containing a liquid crystal, a monomer, and a polymerization initiator is sandwiched therebetween, a portion where the coloring layer and the first electrode do not overlap with each other is formed, and a portion where the coloring layer and the second electrode overlap with each other is formed; a fourth step of polymerizing the monomer contained in the second liquid crystal layer in a region not overlapping with the coloring layer by light irradiation to the coloring layer and the second liquid crystal layer from the second substrate side; a fifth step of separating the support substrate from the first electrode to remove the support substrate; and a sixth step of bonding the second substrate and the first substrate such that a first liquid crystal layer containing a liquid crystal is sandwiched between the first substrate and the first electrode.

According to one embodiment of the present invention, a display device having high visibility regardless of the intensity of external light can be provided. A display device capable of a variety of display can be provided. A display device that can operate with low power consumption can be provided.

According to one embodiment of the present invention, it is possible to provide a thin display device, a lightweight display device, a bendable display device, a display device with high strength, or a novel display device.

Note that one embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 20A, 20B1, and 20B2 are circuit diagrams of a display device of one embodiment.

DETAILED DESCRIPTION OF THE INVENTION

Figure 1A:
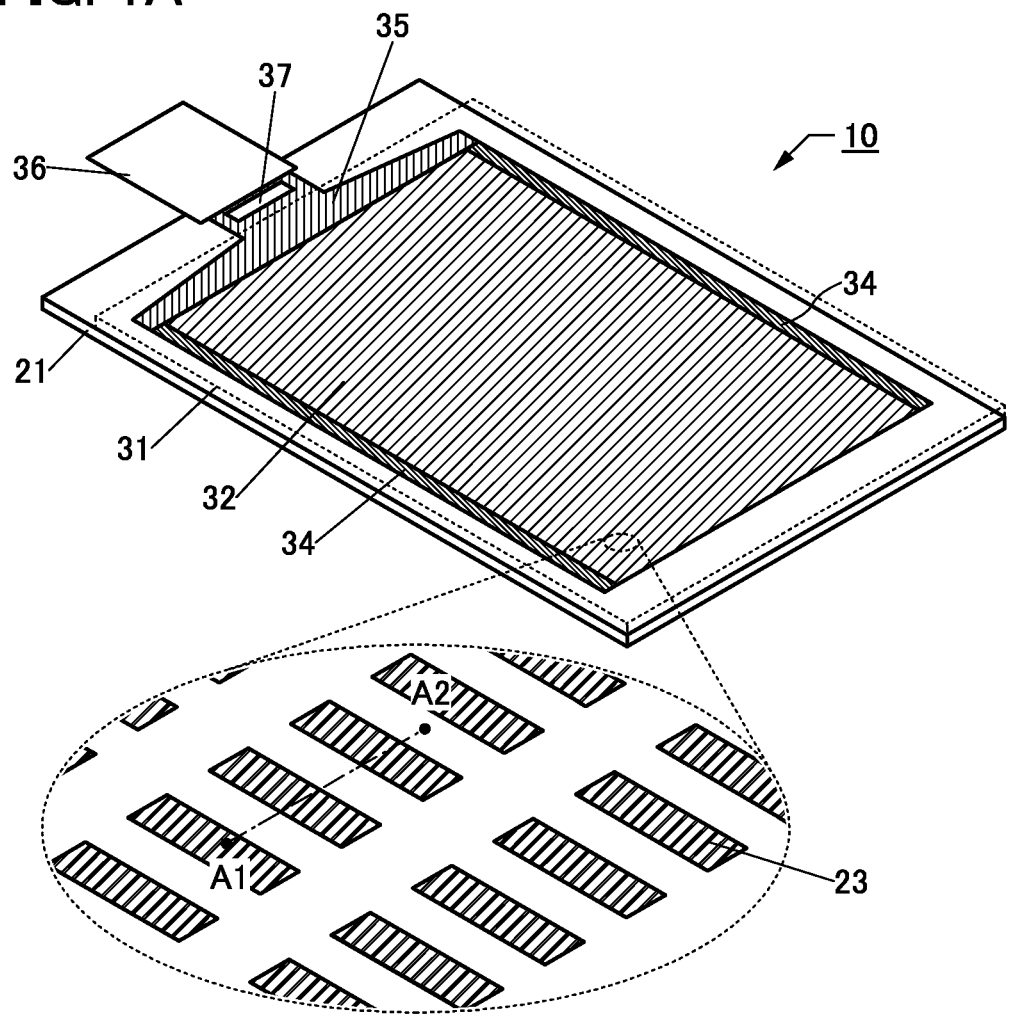
FIGS. 1A and 1B illustrate a structure example of a display device of one embodiment.

Embodiments will be described in detail with reference to the drawings. Note that one embodiment of the present invention is not limited to the description below, and it is easily understood by those skilled in the art that various changes and modifications can be made without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and description thereof is not repeated. Further, the same hatching pattern is used for portions having similar functions, and the portions are not denoted by reference numerals in some cases.

Note that in each drawing described in this specification, the size, the layer thickness, or the region of each component is exaggerated for clarity in some cases. Therefore, the size, the layer thickness, or the region is not limited to such a scale.

Note that in this specification and the like, ordinal numbers such as "first" and "second" are used in order to avoid confusion among components and do not limit the number.

A transistor is a kind of semiconductor elements and can achieve amplification of current and voltage, switching operation for controlling conduction and non-conduction, and the like. A transistor in this specification includes, in its category, an insulated-gate field effect transistor (IGFET) and a thin film transistor (TFT).

Embodiment 1

In this embodiment, structure examples of display devices of embodiments of the present invention and methods for manufacturing the display devices will be described.

The display device of one embodiment of the present invention includes a plurality of liquid crystal elements. The liquid crystal elements each include a pair of electrodes and a liquid crystal layer. One of the pair of electrodes serves as a pixel electrode, and the other serves as a common electrode. The liquid crystal layer can be provided between a pair of substrates.

The liquid crystal element can be either a reflective liquid crystal element or a transmissive liquid crystal element. In the case where the liquid crystal element is a reflective liquid crystal element, a conductive layer that reflects visible light can be used as the pixel electrode. In the case where the liquid crystal element is a transmissive liquid crystal element, a conductive layer that transmits visible light can be used as the pixel electrode.

The display device includes a coloring layer overlapping with the pixel electrode. The coloring layer can be located on an optical path of the liquid crystal element.

The liquid crystal layer includes a first portion overlapping with the pixel electrode and the coloring layer, and a second portion not overlapping with the coloring layer. The second portion can be referred to as a portion overlapping with a region between two adjacent pixel electrodes.

The first portion contains monomers and liquid crystal. The second portion contains a polymer (high molecular material) obtained by polymerization of the monomers. In the second portion, the polymer constitutes the framework of a columnar partition which bonds the pair of substrate to each other. In the second portion, liquid crystal may be contained or the columnar partition may contain a polymer and liquid crystal.

The columnar partition containing the polymer, which is provided in the second portion of the liquid crystal layer, is placed between two adjacent liquid crystal elements and has a function of dividing the liquid crystal, between the two adjacent liquid crystal elements. Thus, the columnar partition containing a polymer can also be referred to as a polymer wall. In the first portion of one liquid crystal element, liquid crystal surrounded by the partition and a pair of substrates can be contained. With the partition, the influence of the alignment state of the liquid crystal contained in the adjacent liquid crystal element is weakened; thus, a display device with the improved contrast and the like which can display a clearer image can be fabricated. Note that the liquid crystal in one liquid crystal element is not necessarily separated completely from the liquid crystal contained in the adjacent liquid crystal element as long as at least one island-like partition is provided between the two adjacent liquid crystal elements.

To manufacture a display device of one embodiment of the present invention, a coloring layer is formed over one of a pair of substrates, and a pixel electrode is formed over the other substrate. For a liquid crystal layer, a material containing liquid crystal, monomers, and a polymerization initiator is used. The substrate over which the coloring layer is formed is bonded to the substrate over which the pixel electrode is formed such that the liquid crystal layer is sandwiched therebetween. Then, the substrate over which the coloring layer is formed is irradiated with light. Here, the coloring layer can serve as a light-blocking mask. Thus, when a region of the liquid crystal layer is irradiated with light, the monomers in the region of the liquid crystal layer not overlapping with the coloring layer are polymerized to become a polymer. As a result, partition containing the polymer can be formed in the region not overlapping with the coloring layer.

It is favorable that part of the liquid crystal layer be irradiated with light having a wavelength which can be absorbed by the coloring layer and a wavelength other than the wavelength range of visible light for display, such as ultraviolet light and infrared light. Ultraviolet light with a wavelength of 100 nm to 400 nm is particularly preferable.

The above method enables the light irradiation to be performed with the coloring layer serving as a light-blocking layer and the liquid crystal layer being very close to each other. For example, when light irradiation is performed through a substrate with the use of a light-blocking mask in the state where a liquid crystal layer is sandwiched between a pair of substrates, an unintended region is also exposed to light because of scattering or diffraction of the light, so that a region where a polymer is formed extends in some cases. However, the above method allows highly accurate formation of a polymer in a desired position because the distance between the coloring layer and the liquid crystal layer is very small and the effect of light scattering or the like is significantly small.

Furthermore, it is possible to manufacture a display device at low cost without an increase in manufacturing process because the coloring layer for color-display serves as a light blocking layer for formation of polymers. Moreover, the coloring layer can be formed in any position; thus, a region where the partition is formed can be freely determined without being limited by positions of the pixel electrode, other wirings, and the like.

In the display device of one embodiment of the present invention, the partition containing the polymer that bonds the pair of substrates to each other can be placed between adjacent pixels; thus, adhesion strength between the substrates is extremely high. In addition, the partition can serve as a gap spacer for keeping a distance between the pair of substrates. Thus, when external force is applied (e.g., the display surface is pushed or the display device is bent), the display device is oscillated, and the like, the cell gap of the liquid crystal element is not easily changed; as a result, an interference fringe, a change in color, and the like due to the change of the cell gap are unlikely to occur.

By using the above-described method, a polymer can be formed with high accuracy at the position not shielded by the light-blocking layer. Thus, as compared with the case where a light-blocking mask or the like is used to form a polymer, polymers each with a small diameter can be distributed with high density. As a result, an extremely high-resolution display device can be fabricated. The use of the method of one embodiment of the present invention allows fabrication of, for example, an extremely high-resolution display device in which the resolution of a display portion is higher than or equal to 300 ppi, higher than or equal to 500 ppi, higher than or equal to 800 ppi, or higher than or equal to 1000 ppi and lower than or equal to 3000 ppi, lower than or equal to 4000 ppi, or lower than or equal to 5000 ppi.

Another embodiment of the present invention is preferably a display device (display panel) that includes both a reflective display element and a transmissive display element and can display an image in a transmission mode, in a reflective mode, and in a hybrid mode. Such a display panel can also be referred to as a transmission and reflection hybrid display (transmission/reflection hybrid display or TR-hybrid display).

In this specification and the like, hybrid display (hybrid mode) is a method for displaying a letter and/or an image using reflected light and transmitted light together in one panel that complement the color tone or light intensity of each other. Alternatively, hybrid display is a method for displaying a letter and/or an image using light from a plurality of display elements in one pixel or one subpixel. Note that when a hybrid display performing hybrid display is locally observed, a pixel or a subpixel performing display using any one of the plurality of display elements and a pixel or a subpixel performing display using two or more of the plurality of display elements are included in some cases.

Note that in the present specification and the like, hybrid display satisfies any one or a plurality of the above-described descriptions.

Furthermore, a hybrid display includes a plurality of display elements in one pixel or one subpixel. Note that as an example of the plurality of display elements, a reflective element that reflects light and a transmissive element that transmits light can be given. Note that the reflective element and the transmissive element can be controlled independently. A hybrid display has a function of displaying a letter and/or an image using one or both of reflected light and transmitted light in a display portion.

Such a display device can have a structure in which a first liquid crystal layer constituting a reflective liquid crystal element and a second liquid crystal layer constituting a transmissive liquid crystal element are stacked between a pair of substrates. The polymer wall can be formed in one of the first liquid crystal layer and the second liquid crystal layer. The polymer wall is formed in either one of the liquid crystal layers that is formed first with use of a coloring layer as a light-blocking layer, and the other liquid crystal layer is then formed. In this manner, a display device can be manufactured with a high yield.

Structure examples and manufacturing method examples of a display device of one embodiment of the present invention will be described below with reference to drawings.

Note that the expressions indicating directions such as "over" and "under" are basically used to correspond to the directions of drawings. However, in some cases, the direction indicating "over" or "under" in the specification does not correspond to the direction in the drawings for the purpose of simplicity or the like. For example, when a stacking order (formation order) of a stack or the like is described, even in the case where a surface on which the stack is provided (e.g., a formation surface, a support surface, an attachment surface, or a planarization surface) is located above the stack in the drawings, the direction and the opposite direction are referred to as "under" and "over", respectively, in some cases.

Structure Example 1

FIG. 1A is a schematic perspective view illustrating a display device 10 of one embodiment of the present invention. In the display device 10, a substrate 21 and a substrate 31 are bonded to each other. In FIG. 1A, the substrate 31 is shown by a dashed line.

The display device 10 includes a display portion 32, circuits 34, a wiring 35, and the like. The substrate 21 is provided with a conductive layer 23 which is included in the circuit 34, the wiring 35, and the display portion 32 and serves as a pixel electrode. In FIG. 1A, an IC 37 and an FPC 36 are mounted on the substrate 21. Thus, the structure illustrated in FIG. 1A can be referred to as a display module.

As the circuit 34, for example, a circuit functioning as a scan line driver circuit can be used.

The wiring 35 has a function of supplying a signal or electric power to the display portion 32 or the circuit 34. The signal or power is input to the wiring 35 from the outside through the FPC 36 or from the IC 37.

FIG. 1A shows an example in which the IC 37 is provided on the substrate 21 by a chip on glass (COG) method or the like. As the IC 37, an IC functioning as a signal line driver circuit or the like can be used. Note that the IC 37 is not necessarily provided when, for example, the display device 10 includes a circuit serving as a signal line driver circuit and when a circuit serving as a signal line driver circuit is provided outside and a signal for driving the display device 10 is input through the FPC 36. Alternatively, the IC 37 may be mounted on the FPC 36 by a chip on film (COF) method or the like.

FIG. 1A is an enlarged view of part of the display portion 32. The conductive layers 23 included in a plurality of display elements are arranged in a matrix in the display portion 32. The conductive layer 23 functions as a pixel electrode, for example.

Cross-Sectional Structure Example 1-1

Figure 1B:
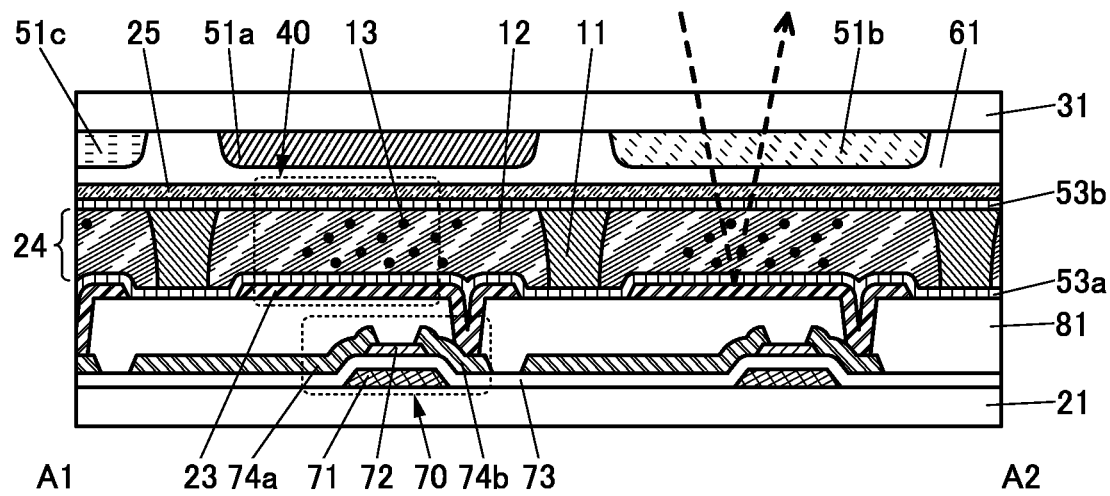

FIG. 1B shows an example of a cross section taken along line A1-A2 in FIG. 1A. A cross section of a region including adjacent two pixels (subpixels) is shown in FIG. 1B. Here, an example where a reflective liquid crystal element 40 is used as a display element is shown. In FIG. 1B, the substrate 31 side is the display surface side.

In the display device 10, the liquid crystal layer 24 is provided between the substrate 21 and the substrate 31. The liquid crystal element 40 includes the conductive layer 23 provided on the substrate 21 side, a conductive layer 25 provided on the substrate 31 side, and the liquid crystal layer 24 provided therebetween.

The conductive layer 23 serves as a pixel electrode. Here, the conductive layer 23 has a function of reflecting visible light. The conductive layer 25 serves as a common electrode or the like. Here, the conductive layer 25 has a function of transmitting visible light. Thus, the liquid crystal element 40 is a reflective liquid crystal element.

Although not illustrated here, a circularly polarizing plate is provided outward from the substrate 31. An example of a circularly polarizing plate is a stack including a linear polarizing plate and a quarter-wave retardation plate. Such a structure enables display using reflected light and reduction of reflection of external light on the display surface side. In addition, a light diffusion plate is preferably provided on the display surface side to improve visibility.

A transistor 70 electrically connected to the conductive layer 23 is provided over the substrate 21. On the substrate 21 side of the substrate 31, a coloring layer 51a, a coloring layer 51b, a coloring layer 51c, an insulating layer 61, the conductive layer 25, and the like are provided. In addition, an alignment film 53a is provided between the conductive layer 23 and the liquid crystal layer 24 and an alignment film 53b is provided between the conductive layer 25 and the liquid crystal layer 24. Note that the alignment films 53a and 53b are not necessarily provided when not needed.

The transistor 70 includes a conductive layer 71 serving as a gate, a semiconductor layer 72, an insulating layer 73 serving as a gate insulating layer, a conductive layer 74a serving as one of a source and a drain, a conductive layer 74b serving as the other of the source and the drain, and the like.

An insulating layer 81 is provided to cover the transistor 70. The conductive layer 23 is provided over the insulating layer 81. The conductive layer 23 is electrically connected to the conductive layer 74b through an opening in the insulating layer 81. The transistor 70 and the conductive layer 23 are placed in each pixel (subpixel).

The coloring layers 51a, 51b, and 51c are placed to overlap with different conductive layers 23.

The liquid crystal layer 24 contains liquid crystal 12 and monomers 13 in regions overlapping with the coloring layers 51a, 51b, and 51c and the conductive layers 23. The liquid crystal layer 24 includes the partition 11 in a region not overlapping with any coloring layers. The partition 11 overlaps with a region between two adjacent conductive layers 23.

The monomer 13 is a material which becomes a polymer by polymerization. Furthermore, the partition 11 includes a polymer obtained by polymerization of the monomers 13. In the partition 11, a material which is the same as that of the liquid crystal 12 may be included.

As the monomer 13, a polymerizable monomer can be used. For example, a photopolymerizable (photocurable) monomer, which is polymerized by light, and a thermopolymerizable (thermosetting) monomer, which is polymerized by heat, can be used. In particular, a photopolymerizable material is preferably used. The liquid crystal layer 24 may include, in addition to the monomer 13, an oligomer whose polymerization degree is greater than or equal to 2 and less than or equal to 100, for example. In that case, the oligomer is preferably a photopolymerizable oligomer or a thermopolymerizable oligomer.

As the monomer 13, a monofunctional monomer such as acrylate or methacrylate, a polyfunctional monomer such as diacrylate, triacrylate, dimethacrylate, or trimethacrylate, or the like can be used. Alternatively, a mixture of two kinds or more of the monofunctional monomer and the polyfunctional monomer may be used. Alternatively, as the monomer 13, a liquid-crystalline material, a non-liquid-crystalline material, or a mixture thereof can be used.

The liquid crystal layer 24 may include a polymerization initiator in a region overlapping with the coloring layers and the conductive layer 23. The polymerization initiator changes to a substance which is to be a trigger for polymerization of monomers due to external stimuli such as light and heat, for example. As the polymerization initiator, a radical polymerization initiator which generates radicals by irradiation with light such as ultraviolet light or heating can be used, for example. The polymerization initiator whose amount is minimal compared with those of the liquid crystal and the monomers is used. For example, the polymerization initiator may be mixed such that the weight ratio of the polymerization initiator to the total weight of a composition of the liquid crystal, the monomers, and the polymerization initiator is lower than or equal to 1 wt %. Moreover, the polymerization initiator can be selected as appropriate in accordance with the material of the monomer 13. Depending on the material of the monomer 13, a cation polymerization initiator, an anion polymerization initiator, or the like may be used instead of the radical polymerization initiator.

As the material of the monomer 13, a material with which polymerization is started by a polymerization initiator to be used is selected. In particular, for the monomer 13 and the polymerization initiator, the combination of materials with which polymerization is started and proceeds by ultraviolet light is preferably used.

The liquid crystal layer 24 may contain a chiral material, in addition to the liquid crystal 12, the monomers 13, the polymerization initiator, and the like.

The partition 11 includes a polymer obtained by polymerization of the monomers 13. For example, when acrylate is used for the monomers 13, the partition 11 includes polyacrylate.

Furthermore, the degree of polymerization of the polymer depends on the formation condition of the polymer or the material of the monomers 13. In addition, the volume density of the partition 11 also depends on the formation condition of the polymer or the material of the monomers 13, or the like. For example, the volume density of the partition 11 can be higher than or equal to 70% and lower than or equal to 100%, preferably higher than or equal to 80% and lower than or equal to 100%, more preferably higher than or equal to 90% and lower than or equal to 100%.

The partition 11 preferably bonds the substrate 21 to the substrate 31. Specifically, the partition 11 has a function of bonding a layer which is provided on the substrate 21 side and in contact with the liquid crystal layer 24 to a layer which is provided on the substrate 31 side and in contact with the liquid crystal layer 24. In FIG. 1B, the partition 11 bonds part of the alignment film 53a which is provided on the substrate 21 side and in contact with the liquid crystal layer 24 to part of the alignment film 53b which is provided on the substrate 31 side and in contact with the liquid crystal layer 24. In the case where the alignment films 53a and 53b are not provided, the partition 11 bonds part of the insulating layer 81 which is provided on the substrate 21 side and in contact with the liquid crystal layer 24 to part of the conductive layer 25 which is provided on the substrate 31 side and in contact with the liquid crystal layer 24.

The coloring layers 51a, 51b, and 51c transmit visible light showing different colors. Thus, the display device 10 can display color images.

In addition, it is preferable that the coloring layers 51a, 51b, and 51c block (absorb) light that is used for forming the partition 11, specifically, light having a wavelength absorbed by a photopolymerization initiator. For example, the transmittance of the coloring layers in a wavelength range of 100 nm to 400 nm is preferably less than or equal to 40% (further preferably 30%, still further preferably 20%, yet still further preferably 10%) and more than or equal to 0%.

Note that when one or more of the coloring layers is likely to transmit the light, a filter layer which transmits visible light and absorbs ultraviolet light may be provided to overlap with the one or more of the coloring layers or all of them. For example, an inorganic insulating film, a conductive oxide film, a metal film thin enough to have a light-transmitting property, a resin containing a pigment or a dye, or the like can overlap with the coloring layer.

For the substrate 21 and the substrate 31, a glass substrate can be used, for example. For the substrate 21 and the substrate 31, a thin lightweight material may be used. For example, a material having a smaller weight per unit area than 0.5-mm-thick glass, such as a material containing a resin or glass thin enough to have flexibility, is preferably used.

For example, for the substrate 21 or the substrate 31, a thin sheet-like material with a thickness greater than or equal to 1 μm and less than or equal to 300 μm, preferably greater than or equal to 3 μm and less than or equal to 200 μm, more preferably greater than or equal to 5 μm and less than or equal to 150 μm, still more preferably greater than or equal to 10 μm and less than or equal to 100 μm can be used. The use of such a material for each of the substrates 21 and 31 allows fabrication of a bendable display device.

In the display device 10 of one embodiment of the present invention, the adhesion strength between the substrate 21 and the substrate 31 is increased by the partition 11 which is positioned between the two conductive layers 23 serving as pixel electrodes seen from the display surface side; thus, the display device 10 is unlikely to be broken and has high reliability. Moreover, in the display device 10, by the partition 11, the physical strength against external force is increased and the change of the cell gap due to external force is suppressed.

The above is the description of Cross-sectional structure example 1-1.

Manufacturing Method Example 1-1

Next, an example of a method for manufacturing the display device 10 illustrated in FIG. 1B will be described. FIGS. 2A to 2C to FIGS. 6A to 6C are schematic cross-sectional views each illustrating a stage of the process in the method for manufacturing the display device 10.

Note that the thin films included in the display device (i.e., the insulating film, the semiconductor film, the conductive film, and the like) can be formed by any of a sputtering method, a chemical vapor deposition (CVD) method, a vacuum evaporation method, a pulsed laser deposition (PLD) method, an atomic layer deposition (ALD) method, and the like. As the CVD method, a plasma-enhanced chemical vapor deposition (PECVD) method or a thermal CVD method may be used. As an example of the thermal CVD method, a metal organic chemical vapor deposition (MOCVD) method may be used.

Alternatively, the thin films included in the display device (the insulating film, the semiconductor film, the conductive film, and the like) can be formed by a method such as spin coating, dipping, spray coating, ink-jetting, dispensing, screen printing, or offset printing, or with a doctor knife, a slit coater, a roll coater, a curtain coater, or a knife coater, for example.

When the thin films included in the display device are processed, a photolithography method or the like can be used. Alternatively, island-shaped thin films may be formed by a film formation method using a shielding mask. Alternatively, the thin films may be processed by a nanoimprinting method, a sandblasting method, a lift-off method, or the like. Examples of the photolithography method include the following two methods: a method in which a photosensitive resist material is applied to a thin film to be processed, the material is exposed to light through a photomask and then developed to form a resist mask, the thin film is processed by etching or the like, and the resist mask is removed; and a method in which a photosensitive thin film is formed and then exposed to light and developed to be processed into a desired shape.

As light for exposure in a photolithography method, light with an i-line (with a wavelength of 365 nm), light with a g-line (with a wavelength of 436 nm), light with an h-line (with a wavelength of 405 nm), or light in which the i-line, the g-line, and the h-line are mixed can be used. Alternatively, ultraviolet light, KrF laser light, ArF laser light, or the like can be used. Exposure may be performed by a liquid immersion exposure technique. As the light for the exposure, extreme ultra-violet light (EUV) or X-rays may be used. Instead of the light for the exposure, an electron beam can be used. It is preferable to use extreme ultra-violet light, X-rays, or an electron beam because extremely minute processing can be performed. Note that in the case of performing exposure by scanning of a beam such as an electron beam, a photomask is not needed.

For etching of the thin film, a dry etching method, a wet etching method, a sandblast method, or the like can be used.

<Formation of Transistor 70>

First, the conductive layer 71 is formed over the substrate 21. The conductive layer 71 can be formed in the following manner: a conductive film is formed, a resist mask is formed, the conductive film is etched, and then the resist mask is removed.

Then, the insulating layer 73 is formed to cover the substrate 21 and the conductive layer 71.

Then, the semiconductor layer 72 is formed. The semiconductor layer 72 can be formed in the following manner: a resist mask is formed after a semiconductor film is formed, the semiconductor film is etched, and the resist mask is removed.

Then, the conductive layer 74a and the conductive layer 74b are formed. The conductive layers 74a and 74b can be formed by a method similar to that of the conductive layer 71.

Figure 2A:
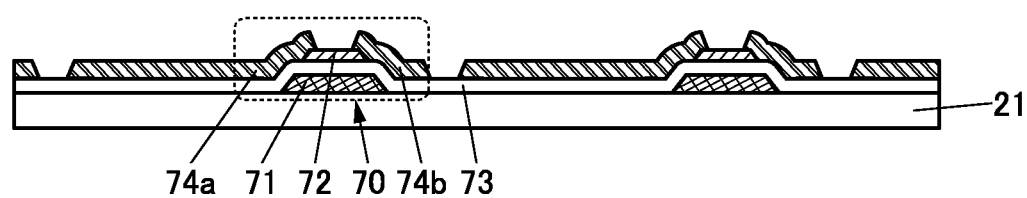
FIGS. 2A and 2B illustrate a method for manufacturing a display device of embodiment.

Through the above steps, the transistor 70 can be formed (FIG. 2A).

<Formation of Insulating Layer 81>

Then, the insulating layer 81 is formed. When a photosensitive material is used for the insulating layer 81, an opening can be formed by a photolithography method or the like. Alternatively, the opening may be formed in the following manner: an insulating film formed for the insulating layer 81 and then part of insulating film is etched with the use of a resist mask. It is preferable to use an organic insulating material for the insulating layer 81 since the flatness of the top surface thereof can be enhanced.

An inorganic insulating film may be used for the insulating layer 81. The insulating layer 81 can be formed using a single layer of any of layers of inorganic insulating materials such as silicon nitride, silicon oxide, silicon oxynitride, silicon nitride oxide, aluminum oxide, aluminum nitride, aluminum oxynitride, and aluminum nitride oxide or a stack thereof. Thus, the insulating layer 81 serves as a protective layer of the transistor 70.

Alternatively, the insulating layer 81 may have a stacked structure of an inorganic insulating film and an organic insulating film.

<Formation of Conductive Layer 23 and Alignment Film 53a>

Next, the conductive layer 23 is formed over the insulating layer 81. The conductive layer 23 can be formed by a method similar to that of the conductive layer 71.

Figure 2B:
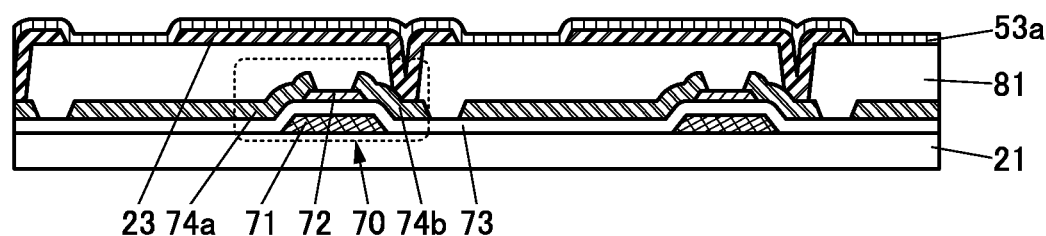

Then, the alignment film 53a is formed (FIG. 2B). A thin film to be the alignment film 53a is formed and then rubbing treatment is performed, whereby the alignment film 53a can be formed.

<Formation of Coloring Layers>

Figure 3A:
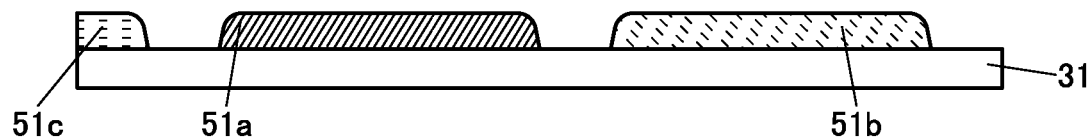
FIGS. 3A to 3C illustrate a method for manufacturing a display device of one embodiment.

Next, the coloring layers 51a, 51b, and 51c are formed over the substrate 31 (FIG. 3A).

For example, a photosensitive resin material is preferably used for the coloring layers 51a, 51b, and 51c. To form the coloring layers, the material is applied to the substrate 31, exposed to light through a photomask to be developed, and then subjected to heat treatment.

The coloring layers 51a, 51b, and 51c serve as color filters. In addition, the coloring layers 51a, 51b, and 51c each have a function of blocking the light 20 in irradiation (performed later) with the light 20 for formation of the partition 11. For example, it is preferable that the material, thickness, density, and the like of the coloring layers 51a, 51b, and 51c be determined so that the coloring layers have an absorptance of light used as the light 20 of more than or equal to 60% (preferably 70%, further preferably 80%, still further preferably 90%) and less than or equal to 100%. The material, thickness, density, and the like of the coloring layers 51a, 51b, and 51c can be changed depending on irradiation conditions of the light 20 (e.g., intensity and irradiation time).

<Formation of Insulating Layer 61>

Figure 3B:
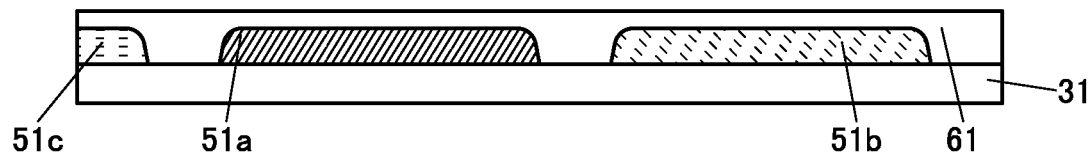

Next, the insulating layer 61 is formed over the coloring layers 51a, 51b, and 51c (FIG. 3B). The insulating layer 61 can be formed by a method similar to that of the insulating layer 81. The insulating layer 61 serves as an overcoat for preventing diffusion of the material contained in the coloring layers to the liquid crystal layer 24.

<Formation of Conductive Layer 25 and Alignment Film 53b>

Next, the conductive layer 25 is formed over the insulating layer 61. The conductive layer 25 can be formed by a method similar to that of the conductive layer 71 or the like. Alternatively, the conductive layer 25 may be formed to have an island shape by a film formation method using a shielding mask.

Figure 3C:
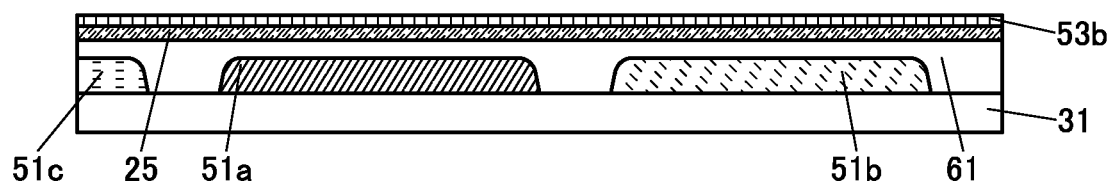

Then, the alignment film 53b is formed over the conductive layer 25 (FIG. 3C). The alignment film 53b can be formed by a method similar to that of the alignment film 53a.

Note that the above-described forming steps of the substrate 21 side and the above-described forming steps of the substrate 31b side can be separately performed.

<Bonding of Substrate 21 and Substrate 31>

Next, a bonding layer (not illustrated) for bonding the substrates 21 and 31 is formed on any one of the substrates 21 and 31 or both of them. The bonding layer is formed to surround a region in which a pixel is positioned. The bonding layer can be formed by a screen printing method, a dispensing method, or the like. For the bonding layer, a thermosetting resin, an ultraviolet curable resin, or the like can be used. Alternatively, a resin which is cured when heated after pre-cured by ultraviolet light, or the like may be used. Alternatively, a thermosetting and ultraviolet curable resin or the like may be used.

Next, a composition to be the liquid crystal layer 24 is dripped in a region surrounded by the bonding layer by a dispensing method or the like. Specifically, a composition containing the liquid crystal 12, the monomer 13, and a polymerization initiator is dripped. Furthermore, the composition may include a chiral material and the like.

Then, the substrate 21 and the substrate 31 are bonded such that the composition to be the liquid crystal layer 24 is positioned therebetween, and the bonding layer is cured. The bonding is preferably performed in a reduced-pressure atmosphere because air bubbles and the like can be prevented from entering a region between the substrate 21 and the substrate 31.

Note that the composition to be the liquid crystal layer 24 may be injected in a reduced-pressure atmosphere through a gap formed in the bonding layer after the substrates 21 and 31 are bonded to each other. In addition, after the composition to be the liquid crystal layer 24 is dripped, particulate gap spacers may be dispersed in a region where the pixel is provided or outside the region, or a composition containing the gap spacers may be dripped.

Figure 4A:
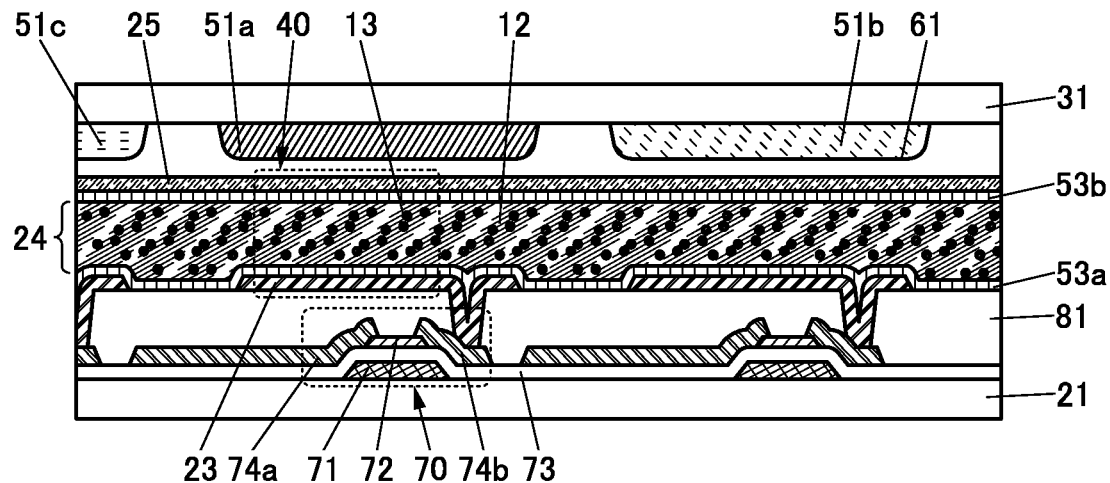
FIGS. 4A to 4C illustrate a method for manufacturing a display device of one embodiment.

At this time, the liquid crystal element 40 containing the conductive layer 23, the conductive layer 25, and the liquid crystal 12 is formed (FIG. 4A). Note that at this time, the partitions 11 are not formed yet and the concentration of the monomers 13 contained in the liquid crystal layer 24 is high.

<Formation of Partition 11>

Figure 4B:
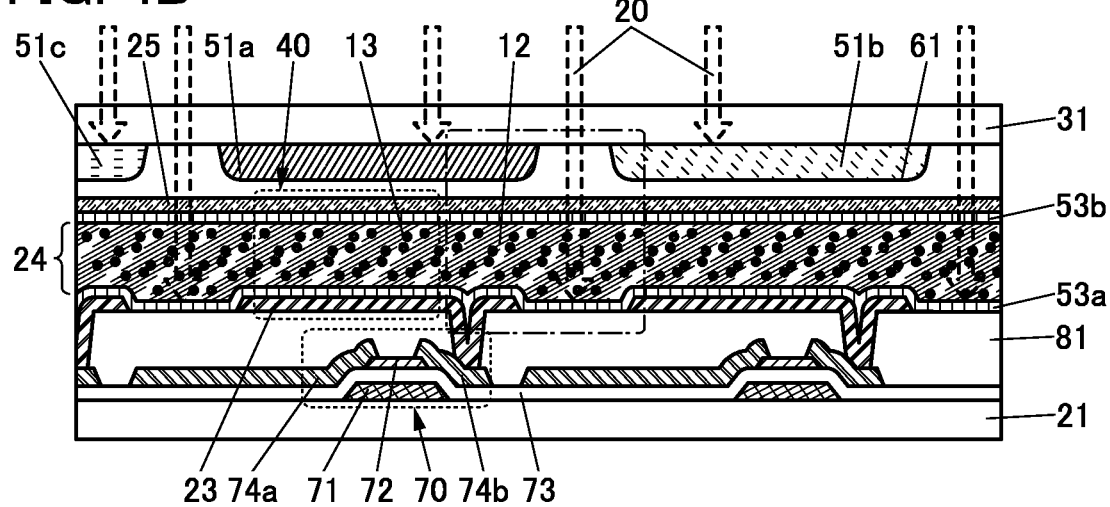

Next, light 20 is emitted from the substrate 31 side (FIG. 4B).

As the light 20, light with a wavelength and intensity with which the polymerization initiator reacts can be used. For example, as the light 20, ultraviolet light with a wavelength of 100 nm to 400 nm can be used. Light with a wavelength of 200 nm to 400 nm is preferably used because absorption due to the air can be suppressed. Typical examples include light with a wavelength of 254 nm, light with a wavelength of 365 nm, light with a wavelength of 385 nm, and the like. The light 20 can be generated using a light source such as a high-pressure mercury lamp, a low-pressure mercury lamp, a metal halide lamp, a xenon lamp, or an LED. Other than a lamp and an LED, a laser such as an excimer laser may be used as a light source.

As the light 20, light which is as close to parallel light as possible is preferably used so that the light is perpendicularly incident on the surface of the substrate 31. In particular, in the case where a plurality of light sources are used because the substrate 31 is large, for example, the light might be incident in an oblique direction. In that case, a slit or the like for making the light from the light source close to parallel light is preferably provided between the light source and the substrate 31.

If the spectrum of the light 20 is in the visible light region, part of the light 20 might transmit a blue coloring layer, for example. For this reason, the light 20 preferably has a spectrum with a peak width as small as possible. For example, a band pass filter (BPF) which transmits light only in a particular wavelength region and blocks (absorbs) light in the other wavelength region can be used to narrow the spectrum of the light 20. Here, the BPF preferably transmits light only with a wavelength absorbed by a photopolymerization initiator (typically a wavelength around 350 nm).

As illustrated in FIG. 4B, the liquid crystal layer 24 not overlapping with the coloring layers 51a, 51b, and 51c is irradiated with the light 20. In contrast, the light 20 does not reach the liquid crystal layer 24 overlapping with the coloring layers 51a, 51b, and 51c because the coloring layers 51a, 51b, and 51c block (absorb) the light 20 in most cases.

In addition, it is preferable that the output and the irradiation time of the irradiation apparatus be adjusted and the light 20 be emitted under the condition where the energy of light that reaches the liquid crystal layer 24 is higher than or equal to 0.1 J/cm$^2$ and lower than or equal to 100 J/cm$^2$, preferably higher than or equal to 1 J/cm$^2$ and lower than or equal to 50 J/cm$^2$.

Here, the transistor 70 has a bottom-gate structure in which the conductive layer 71 serving as a gate is positioned on the insulating layer 81 side. Thus, covering the semiconductor layer 72 of the transistor 70 with the conductive layer 23 as illustrated in FIG. 4B prevents scattered light from reaching the semiconductor layer 72 even in the case where part of the light 20 is scattered, so that the electrical characteristics of the transistor 70 are prevented from being changed. Note that in the case where a transmissive liquid crystal element is used as the liquid crystal element 40, a layer that blocks visible light is preferably provided between the semiconductor layer 72 and the conductive layer 23 because the conductive layer 23 has light transmittance. For example, a conductive layer that serves as a second gate of the transistor is preferably provided between the semiconductor layer 72 and the conductive layer 23.

Figure 5:
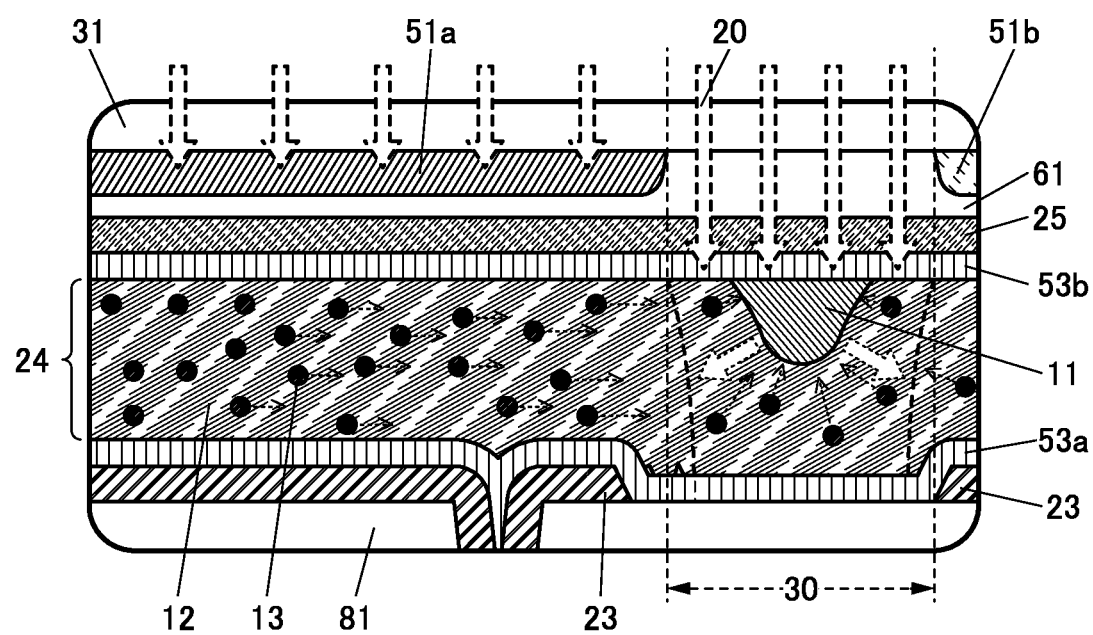
FIG. 5 illustrates a method for manufacturing a display device of one embodiment.

FIG. 5 is an enlarged view of a region shown by dashed-dotted line in FIG. 4B. FIG. 5 is a conceptual diagram of a process in which the light 20 starts to be emitted and the polymerization of the monomers 13 proceeds.

A region to which the light 20 is emitted without being shielded by the coloring layers 51a and 51b and the like is referred to as an irradiation region 30. In the irradiation region 30, when the light 20 is emitted, radicals are generated by the polymerization initiator in the liquid crystal layer 24, and thus the monomers 13 start to be polymerized. As the polymerization proceeds, the partition 11 including a polymer grows as illustrated in FIG. 5.

Here, in some cases, the polymerization of the monomers 13 is accompanied by decrease in the concentration of the monomers 13 contained in the liquid crystal layer 24 in and in the vicinity of the irradiation region 30, resulting in concentration distribution where the concentration of the monomers 13 increases as the distance from the irradiation region 30 increases. The monomers 13 are diffused from where the concentration of the monomers 13 is higher to where the concentration of the monomers 13 is lower to uniform the concentration distribution, in some cases. In that case, some of the monomers 13 are diffused toward the irradiation region 30 as shown by arrows in FIG. 5. Thus, the concentration of the monomers 13 in the liquid crystal layer 24 in a region overlapping with the conductive layer 23 after the irradiation with the light 20 is lower than that before the irradiation. In the case where the concentration of the monomers 13 contained in the liquid crystal layer 24 is sufficiently low or the monomers 13 are easily diffused into the liquid crystal layer 24, the concentration of the monomers 13 after the irradiation with the light 20 is too low to be measured, in some cases.

The optimal concentration of the monomers 13 in the liquid crystal layer 24 before the irradiation with the light 20 can be determined in accordance with the area of the irradiation region 30 with the light 20. For example, when the area proportion of the irradiation region 30 to a region where pixels are arranged (also referred to as a display region) is $\alpha$ % ($\alpha$>0), the weight concentration of the monomers 13 in the liquid crystal layer 24 is preferably set within a range from ($\alpha$-x) wt % to ($\alpha$+x) wt %. Alternatively, the volume concentration of the monomers 13 in the liquid crystal layer 24 is preferably set within a range from ($\alpha$-x) % to ($\alpha$+x) %. Here, x=0.5$\alpha$ is satisfied, x=0.3$\alpha$ is preferably satisfied, and x=0.2$\alpha$ is more preferably satisfied. As a result, the concentration of the monomers 13 in the liquid crystal layer 24 in a portion functioning as the liquid crystal element 40, after the irradiation with the light 20, can be reduced.

When the polymerization of the monomers 13 proceeds, in the irradiation region 30, the partition 11 in contact with both the alignment film 53a and the alignment film 53b is formed. The partition 11 has a function of bonding the alignment film 53a and the alignment film 53b to each other.

Although the partition 11 grows from the alignment film 53b side in FIG. 5, FIG. 5 is only a conceptual diagram and the partition 11 can grow through a variety of the processes. For example, the partition 11 grows while millions of small polymers formed in the liquid crystal layer 24 are connected, in some cases. Alternatively, in the case where the intensity of the light 20 is so high that the light 20 reaches the alignment film 53a while having a sufficient intensity or the light 20 is reflected by the conductive layer (e.g., the conductive layer 71, the conductive layer 74a, or the conductive layer 74b) located on the support substrate 21 side and emitted to the liquid crystal layer 24 again, the polymer may grow also from the alignment film 53a side and is connected to the polymer growing from the alignment film 53b side. Which growth process the partitions 11 are formed through can be roughly determined from the cross-sectional shape of the partition 11.

Figure 4C:
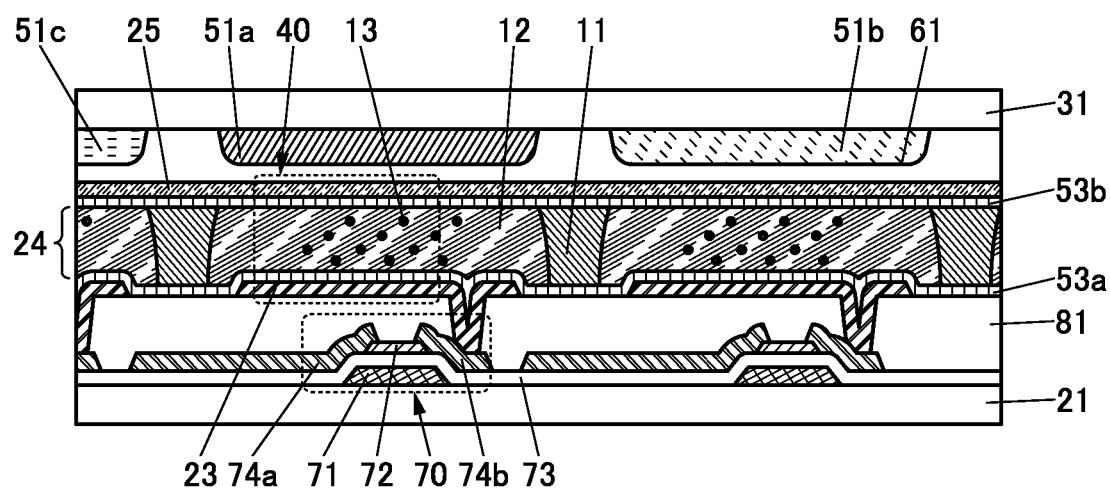

The partition 11 can be formed through the above steps (FIG. 4C).

In the above-described manufacturing method, depending on the irradiation condition of the light 20 or due to the scattering of the light 20, the partition 11 is formed also in a region of the liquid crystal layer 24 overlapping with the conductive layer 23 and the coloring layers 51a, 51b, and 51c, in some cases.

Here, in some cases, a region overlapping with the conductive layer 23 has concentration distribution where the concentration of the monomers 13 decreases as the distance from the partition 11 decreases and the concentration of the monomers 13 increases as the distance from the partition 11 increases.

Furthermore, in a region overlapping with the conductive layer 23, the polymerization initiator which does not react remains in some cases. In the case where both the monomers 13 and the polymerization initiator remain in the liquid crystal layer 24, the polymerization reaction of the monomers 13 might occur because of ultraviolet light in external light, or the like. However, in the display device 10, the coloring layer 51*a* and the like are provided closer to the display surface side than the liquid crystal layer 24; thus, the ultraviolet light in external light can be prevented from reaching the liquid crystal layer 24. Therefore, even when the monomers 13 and the polymerization initiator remain, the polymerization reaction does not occur in the usage environment, and a highly reliable display device can be fabricated.

Cross-Sectional Structure Example 1-2

Figure 6A:
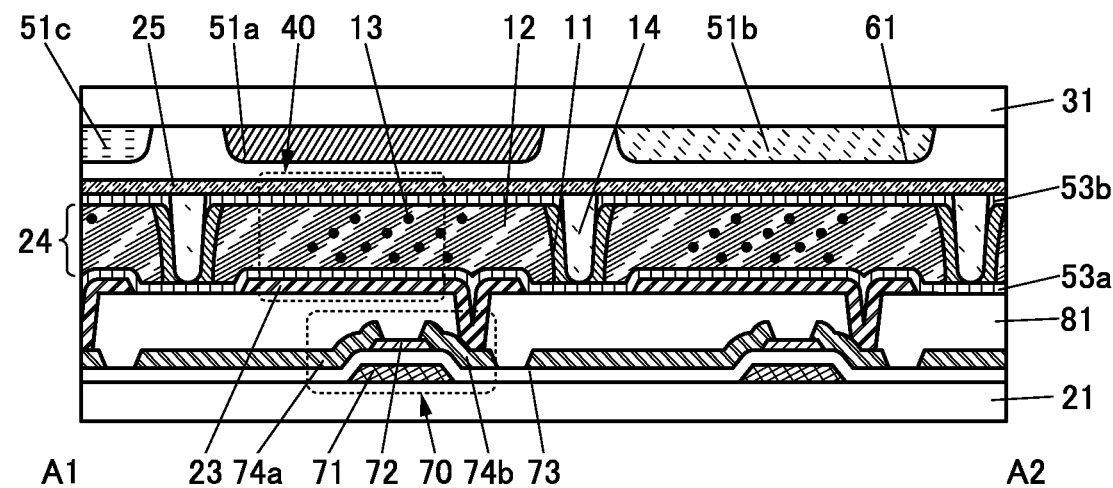
FIGS. 6A and 6B illustrate a structure example of a display device of one embodiment.

FIG. 6A is a schematic cross-sectional view of a display device described below as an example. The structure illustrated in FIG. 6A is different from that in FIG. 1B mainly in including structure bodies 14.

The structure bodies 14 are provided between the conductive layer 25 and the alignment film 53*b*. The alignment film 53*b* is provided to cover the structure bodies 14. Each structure body 14 is located between the two adjacent conductive layers 23. In addition, the structure body 14 is located between two adjacent coloring layers. The partition 11 is provided to surround the structure body 14.

When the substrate 21 and the substrate 31 are bonded to each other, the structure bodies 14 serve as spacers for preventing the substrates 21 and 31 from being unnecessarily close to each other and adjusting the cell gap of the liquid crystal element 40.

Since the partition 11 is provided to surround the structure body 14, the area of a bonding surface of the partition 11 is increased; thus, adhesion strength can be more increased by an anchor effect than that in the example shown in FIG. 1B.

To form the structure bodies 14, first, an insulating film to be the structure bodies 14 is formed over the conductive layer 25. For the insulating film, a photosensitive resin is preferably used. The insulating film can be formed by a spin coating method, for example. Next, the insulating film is exposed to light through a photomask, and then developed and baked, whereby the structure bodies 14 can be formed. Here, for the insulating film, a positive photosensitive material, a portion of which not irradiated with light remains after development, is preferably used.

The above is the description of Cross-sectional structure example 1-2.

Cross-Sectional Structure Example 1-3

Figure 6B:
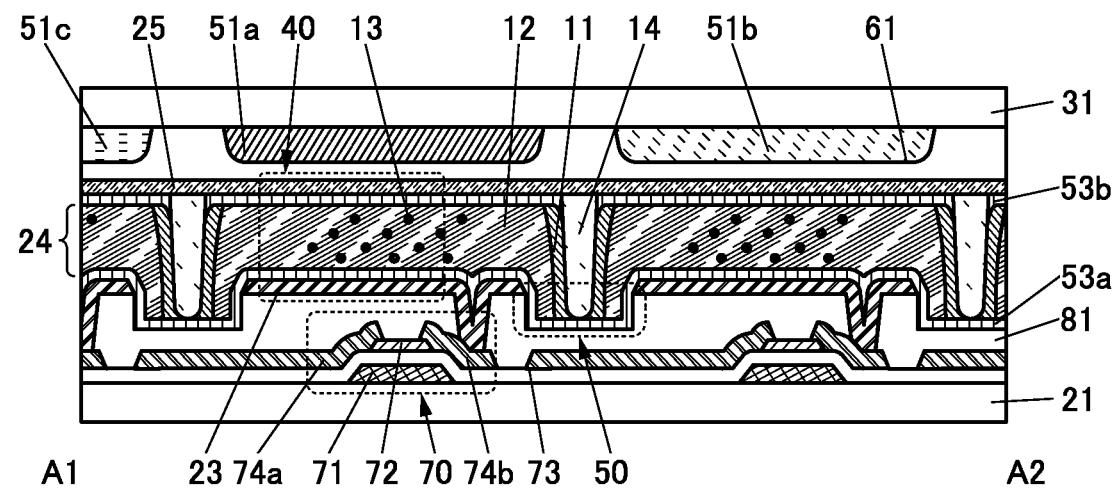

FIG. 6B is a schematic cross-sectional view of a display device described below as an example. The structure illustrated in FIG. 6B is different from that in FIG. 1B mainly in that the structure bodies 14 are provided and depressions are provided in the insulating layer 81.

The insulating layer 81 includes depressions 50. The depressions 50 are each provided in a portion not overlapping with the conductive layer 23. In other words, the insulating layer 81 includes a portion that does not overlap with the conductive layer 23 and has a smaller thickness than a portion overlapping with the conductive layer 23. The alignment film 53*a* is provided to cover the depressions 50 of the insulating layer 81. The top surface of the alignment film 53*a* has a recessed shape along the shapes of the depressions 50.

FIG. 6B illustrates an example in which the alignment film 53*a* is provided to cover side surfaces and the top surfaces of the depressions 50. In the case where coverage with the alignment film 53*a* is poor, a portion of the alignment film 53*a* that is in contact with the side surfaces of the depression 50 might be thinner than the other portion (e.g., a portion overlapping with the conductive layer 23), or might fail to cover the side surfaces of the depression 50 and might split.

The partition 11 is provided to overlap with the depression 50 of the insulating layer 81. Specifically, the partition 11 is provided in contact with part of the alignment film 53*a* that covers the top surface of the depression 50 and parts of the alignment film 53*a* that cover the side surfaces. Accordingly, the contact area between the partition 11 and the alignment film 53*a* is increased, so that the adhesion strength between the partition 11 and the alignment film 53*a* can be increased by an anchor effect. The partition 11 is preferably provided to fill the depression 50 because adhesion strength can be increased more effectively.

Note that in the case where the alignment film 53*a* fails to cover the side surfaces of the depression 50 of the insulating layer 81 and splits or the alignment film 53*a* is not provided, there may be a portion where the partition 11 and the insulating layer 81 are in contact with each other.

The projected structure bodies 14 are provided such that they fit respective depressions 50. When the partition 11 is provided in a region where both the depression 50 of the insulating layer 81 and the projected structure body 14 are provided, a better anchor effect is obtained, whereby the adhesion strength between the substrates can be more increased.

The depression 50 can be formed by, for example, etching part of the insulating layer 81 with the use of a resist mask used in forming the conductive layer 23 or etching part of the insulating layer 81 with the use of the conductive layer 23 as a hard mask.

The above is the description of Cross-sectional structure example 1-3.

Cross-Sectional Structure Example 1-4

Figure 7:
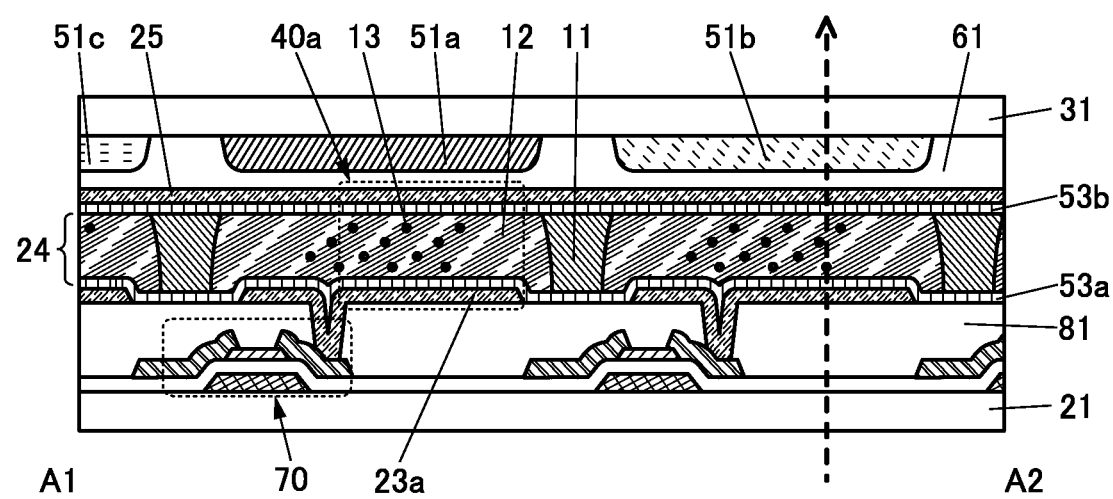
FIG. 7 illustrates a structure example of a display device of one embodiment.

FIG. 7 is a schematic cross-sectional view of a display device described below as an example. The display device illustrated in FIG. 7 is a display device using a transmissive liquid crystal element.

A liquid crystal element 40*a* includes a conductive layer 23*a*, the liquid crystal layer 24, and the conductive layer 25. Like the conductive layer 25, the conductive layer 23*a* transmits visible light. Thus, light incident from the substrate 21 side passes through the liquid crystal element 40*a* and is emitted to the substrate 31 side as shown by an arrow in FIG. 7.

Although not illustrated here, a pair of linear polarizing plates can be provided such that the substrate 21 and the substrate 31 are sandwiched therebetween. Furthermore, a backlight (backlight unit) can be provided outside the linear polarizing plate on the substrate 21 side. The use of a circularly polarizing plate instead of the linear polarizing plate enables suppression of reflection of external light on the display surface side.

The partition 11, which is located in a region that does not contribute to display, is preferably placed to overlap with a conductive layer provided over the substrate 21, as illustrated in FIG. 7. In other words, the partition 11 is preferably placed to overlap with wirings, electrodes, or the like on the substrate 21 side. In that case, even when an alignment defect of the liquid crystal 12 is caused in the vicinity of the partition 11, light leakage in the region can be suppressed, resulting in suppression of a decrease in contrast.

The above is the description of Cross-sectional structure example 1-4.

Structure Example 2

As an example of the display device of one embodiment of the present invention, a display device (display panel) which includes both a reflective liquid crystal element and a transmissive liquid crystal element and can display an image in a transmissive mode, in a reflective mode, and in a hybrid mode in which both of these modes are employed simultaneously will be described below. Such a display panel can also be referred to as a transmission and reflection hybrid display or transmission/reflection hybrid display (TR-hybrid display).

One example of such a display panel is a structure in which a reflective liquid crystal element including an electrode that reflects visible light and a transmissive light-emitting element including an electrode that transmits visible light are stacked. In this structure, it is preferable that the electrode that reflects visible light have an opening and the opening overlap with the transmissive liquid crystal element. This enables driving in the transmissive mode by which light is emitted from the transmissive liquid crystal element through the opening. Furthermore, as compared with the case where the reflective liquid crystal element and the transmissive liquid crystal element are arranged side by side, in the case where the reflective liquid crystal element and the transmissive liquid crystal element are stacked, the size of a pixel including both the transmissive liquid crystal element and the reflective liquid crystal element can be reduced in a plan view; thus, a higher-resolution display device can be fabricated.

It is also preferable that a transistor for driving the transmissive liquid crystal element and a transistor included in the reflective liquid crystal element be separately provided. Thus, the transmissive liquid crystal element and the reflective liquid crystal element can be individually driven.

Here, it is preferable that a pixel circuit for driving the liquid crystal element include a transistor using an oxide semiconductor and thus having an extremely low off-state current. Alternatively, a charge memory element may be applied to the pixel circuit. This allows the gray level to be maintained even when writing operation to a pixel is stopped while a still image is displayed using the liquid crystal element. That is, display can be maintained even when the frame rate is set to an extremely small value. Thus, display with extremely low power consumption can be performed.

In one embodiment of the present invention, switching between a first mode in which an image is displayed by the first display element, a second mode in which an image is displayed by the second display element, and a third mode in which an image is displayed by the first display element and the second display element can be performed.

In the first mode, an image is displayed using light reflected by the first display element. The first mode is a driving mode with extremely low power consumption because a light source is unnecessary, and is effective in the case where, for example, external light has a sufficiently high illuminance and is white light or light near white light.

The first mode is a display mode suitable for displaying text information of a book or a document, for example. The first mode can offer eye-friendly display owing to the use of reflected light and thus has an effect of being less likely to cause eyestrain. Note that the first mode may be referred to as reflective display mode (reflection mode) because display is performed using reflected light.

In the second mode, an image is displayed using light transmitted through the second display element. Thus, an extremely clear image (with a high contrast and high color reproducibility) can be displayed regardless of the illuminance and chromaticity of external light. For example, the second mode is effective in the case where the illuminance of external light is extremely low, such as during the nighttime or in a dark room. When a bright image is displayed under weak external light, a user may feel that the image is too bright. To prevent this, an image with reduced luminance is preferably displayed in the second mode. In that case, not only a reduction in brightness but also low power consumption can be achieved. The second mode is a mode suitable for displaying a vivid image and a smooth moving image, for example. Note that the second mode may be referred to as emission display mode (emission mode) because display is performed using light emission, that is, emitted light.

In the third mode, display is performed using both light reflected by the first display element and light transmitted through the second display element. Specifically, the display device is driven so that light emitted from the first pixel and light emitted from the second pixel adjacent to the first pixel are mixed to express one color. A clearer image than that in the first mode can be displayed and power consumption can be lower than that in the second mode. For example, the third mode is effective when the illuminance of external light is relatively low, such as under indoor illumination or in the morning or evening, or when the external light does not represent a white chromaticity. Furthermore, the use of mixed light of reflected light and emitted light enables display of an image like a real painting.

Note that in this specification and the like, display in which the first display element and the second display element are combined, i.e., the third mode, can be referred to as a hybrid display mode (HB display mode). Alternatively, the third mode may be referred to as a transmissive display mode in which an emission display mode and a reflective display mode are combined (TR-Hybrid mode).

More specifically, the display device can include a display panel including the first pixel including the first display element, the second pixel including the second display element, and a control portion. The control portion generates and outputs a first gray level and a second gray level to the first pixel and the second pixel, respectively, on the basis of image data input from the outside. Here, the image information is information including a gray level corresponding to each pixel, and an image signal such as a video signal is given as an example.

Note that the control portion may have a function of selecting the above-described display modes on the basis of external light illuminance and the like.

In the display device, the first pixel preferably includes a first transistor electrically connected to the first display element and the second pixel preferably includes a second transistor electrically connected to the second display element.

In that case, the first transistor and the second transistor are preferably provided on the same plane. One of the first display element and the second display element is preferably electrically connected to the first transistor or the second transistor through an opening provided in an insulating layer. Thus, the manufacturing process can be simplified because the first transistor and the second transistor can be manufactured in the same steps.

When the first display element, the second display element, and the transistors are provided between a pair of substrates, a thin and lightweight display device can be provided.

Cross-Sectional Structure Example 2-1

Figure 8:
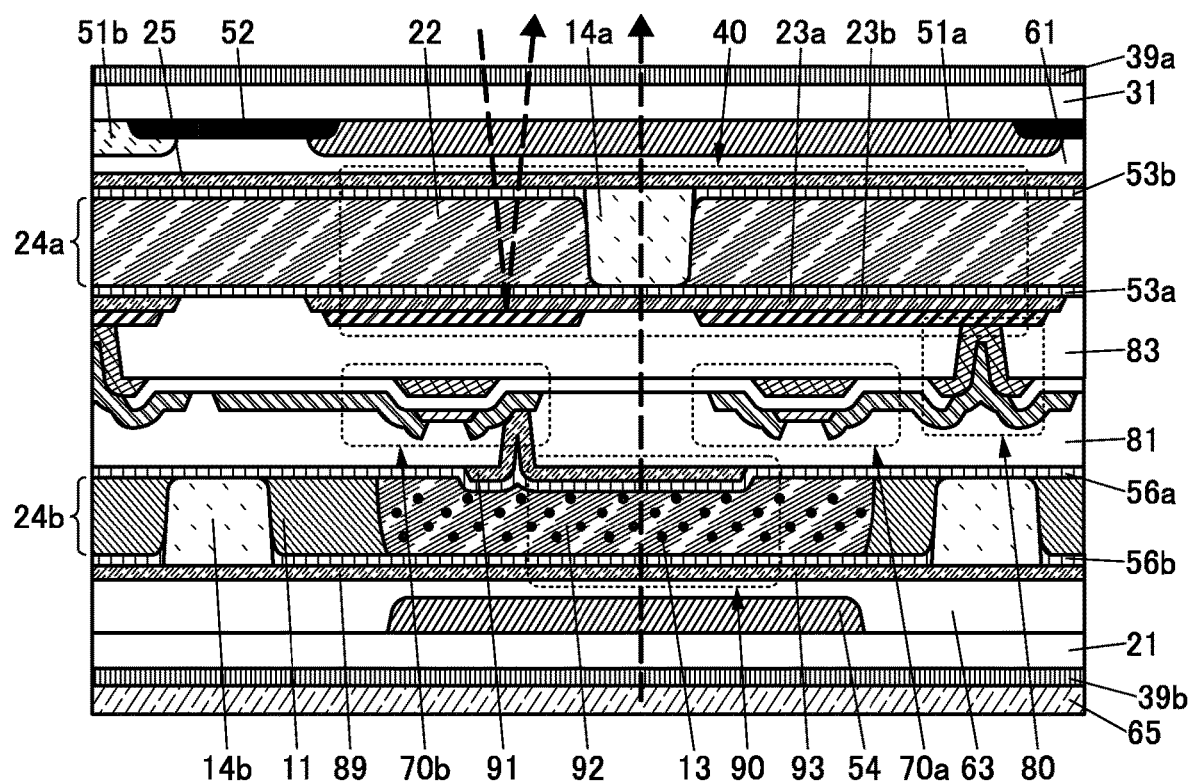
FIG. 8 illustrates a structure example of a display device of one embodiment.

FIG. 8 is a schematic cross-sectional view of a display device (display module) described below as an example. In FIG. 8, the liquid crystal element 40 and a liquid crystal element 90 overlap with each other with an insulating layer 83 therebetween. In FIG. 8, the substrate 31 side corresponds to the display surface side.

In FIG. 8, a polarizing plate 39a is provided on the outer side of the substrate 31, and a polarizing plate 39b and a backlight unit 65 are provided on the outer side of the substrate 21. For example, the structure including the substrate 21 and the substrate 31 can be referred to as a display device or a display panel. The structure further including the polarizing plates 39a and 39b and the backlight unit 65 can be referred to as a display module.

The display device includes a transistor 70a and a transistor 70b which are formed on one surface of the insulating layer 83. The transistor 70a and the transistor 70b are electrically connected to the liquid crystal element 40 and the liquid crystal element 90, respectively.

A conductive layer 91 is provided on the substrate 21 side of the insulating layer 81, which covers the transistors 70a and 70b. An alignment film 56a is provided to cover the conductive layer 91. The conductive layer 91 and one of a source and a drain of the transistor 70b are electrically connected to each other through an opening provided in the insulating layer 81. The insulating layer 81 serves as a protective layer and a planarization layer. In addition, over the substrate 21, a coloring layer 54, an insulating layer 63, a conductive layer 93, an alignment film 56b, a structure body 14b, and the like are provided. A liquid crystal layer 24b is located between the alignment films 56a and 56b. The liquid crystal layer 24b includes the partition 11, the liquid crystal 92, the monomers 13, and the like. The conductive layer 91, the liquid crystal layer 24b, and the conductive layer 93 form the liquid crystal element 90.

The conductive layer 91 and the conductive layer 93 each have a function of transmitting visible light. Therefore, the liquid crystal element 90 is a transmissive liquid crystal element.

A stack of a conductive layer 23a and a conductive layer 23b is provided on the substrate 31 side of the insulating layer 83. In addition, an alignment film 53a is provided between the conductive layer 23a and the liquid crystal layer 24a.

On the substrate 31 that faces the substrate 21, provided are the coloring layers 51a and 51b, a light-blocking layer 52, and the like. In addition, an insulating layer 61 covers these layers. On the insulating layer 61 that faces the substrate 21, the conductive layer 25 is provided. On the conductive layer 25, the alignment film 53b, a structure body 14a, and the like are provided. Between the alignment films 53a and 53b, the liquid crystal layer 24a containing liquid crystal 22 is sandwiched. The liquid crystal element 40 includes the liquid crystal 22 and the conductive layers 23a, 23b, and 25.

In addition, the display device includes a connection portion 80 where conductive layers provided on both sides of the insulating layer 83 are electrically connected to each other. In FIG. 8, the connection portion 80 includes an opening provided in the insulating layer 83 and a conductive layer which is positioned in the opening and provided by processing the same conductive film as a gate of the transistor 70a and the like. One of a source and a drain of the transistor 70a and the conductive layer 23b are electrically connected to each other through the connection portion 80.

The conductive layer 23a and the conductive layer 25 each have a function of transmitting visible light. The conductive layer 23b has a function of reflecting visible light. Thus, the liquid crystal element 40 functions as a reflective liquid crystal element.

In the conductive layer 23b which reflects visible light, an opening is provided in a region overlapping with the liquid crystal element 90. Light from the backlight unit 65 and transmitted through the liquid crystal element 90 is emitted to the substrate 31 side through the opening.

In the liquid crystal layer 24a, the structure body 14a having light-transmitting properties is provided at a position overlapping with an opening of the conductive layer 23b. The structure body 14a is located on the optical path of light transmitting through the liquid crystal element 90. Light which is emitted from the backlight unit 65, polarized by the polarizing plate 39b, and passes through the liquid crystal element 90 passes through the structure body 14a and reaches polarizing plate 39a. This can avoid a change in polarization state of light which has passed through the liquid crystal element 90 by the liquid crystal 22. That is, if the alignment state of the liquid crystal 22 is changed according to the voltage applied to the liquid crystal element 40, an adverse effect on the display performed by the liquid crystal element 90 does not occur.

Such a structure can drive the liquid crystal elements 40 and 90 individually; thus, it is possible to display images only by the liquid crystal element 40, to display images only by the liquid crystal element 90, and to display images by driving the liquid crystal elements 40 and 90 at the same time.

Since the state of the liquid crystal element 40 in the transmissive mode does not influence the display, the operation of the liquid crystal element 40 can be stopped and thus the display device can be driven with low power consumption. Here, the power consumption can be further reduced by stopping not only signals outputted from a driver circuit for driving the liquid crystal element 40, but also power supply to the driver circuit.

The display device in FIG. 8 includes the transistor 70a electrically connected to the liquid crystal element 40 and the transistor 70b electrically connected to the liquid crystal element 90; thus, the liquid crystal element 40 and the liquid crystal element 90 can be separately controlled. In addition, the transistors 70a and 70b can be formed on the same plane and through the same process; thus, the process can be simplified and the transistors can be manufactured with a high yield.

The above is the description of Cross-sectional structure example 2-1.

Cross-Sectional Structure Example 2-2

Figure 9:
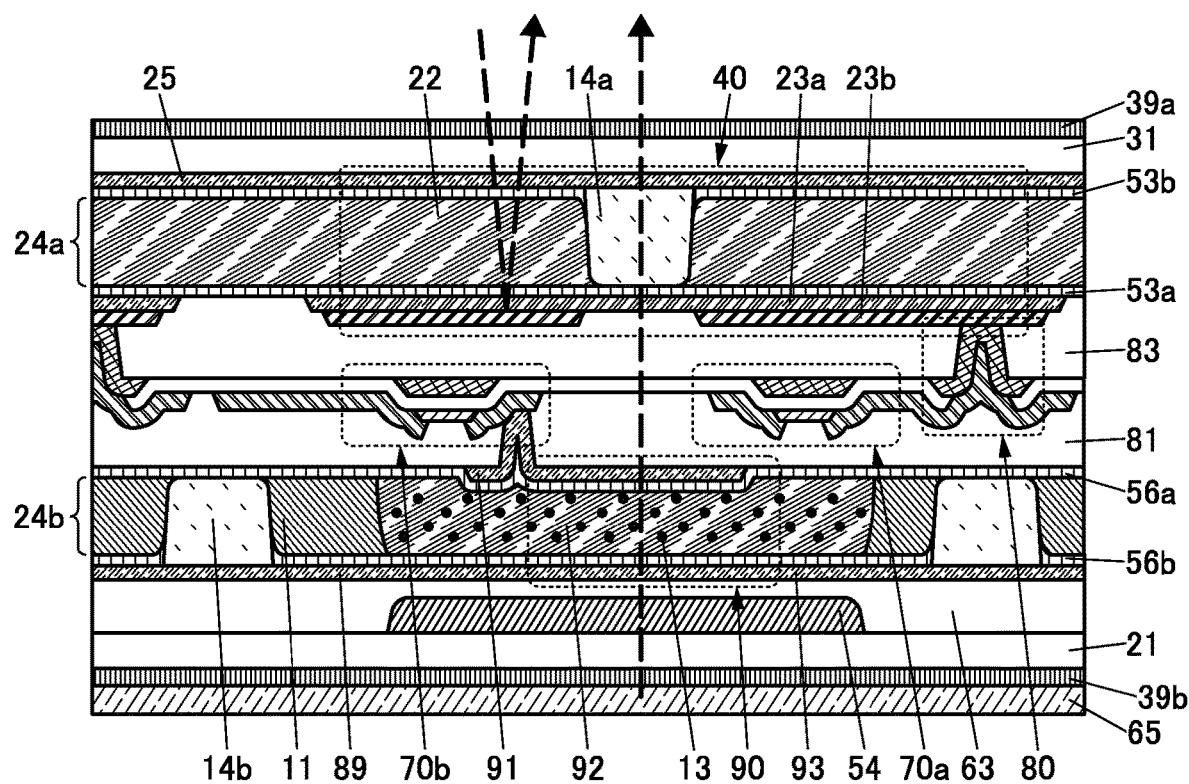
FIG. 9 illustrates a structure example of a display device of one embodiment.

FIG. 9 is a schematic cross-sectional view of a display device described below as an example. The structure shown in FIG. 9 is different from the structure shown in FIG. 8 mainly in not including the light-blocking layer 52, the coloring layers 51a and 51b, and the insulating layer 61.

The liquid crystal element 40 in FIG. 9 displays a monotone grayscale image (a black-and-white image). Since the liquid crystal element 40 does not include coloring layers, the maximum reflectance of the liquid crystal element 40 can be increased and a brighter image can be displayed.

In contrast, the liquid crystal element 90 can display a color image. Accordingly, a vivid image can be displayed.

The above is the description of Cross-sectional structure example 2-2.

Manufacturing Method Example 2

A manufacturing method example of the display device illustrated in FIG. 8 is described below. FIGS. 10A to 10D, FIGS. 11A to 11C, and FIGS. 12A to 12C are schematic cross-sectional views at respective stages in this manufacturing method example described below.

Figure 10A:
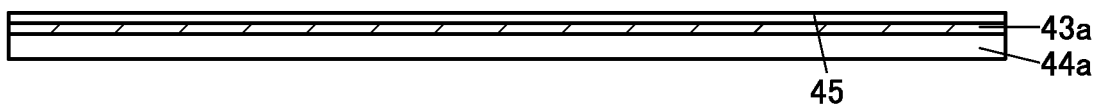
FIGS. 10A to 10D illustrate a method for manufacturing a display device of one embodiment.

First, the support substrate 44a is prepared. Over the support substrate 44a, a separation layer 43a and an insulating layer 45 are stacked (FIG. 10A).

As the support substrate 44a, a substrate having rigidity high enough to be easily transferred in a device or between devices can be used. In addition, a substrate which is resistant to heat in the manufacturing process is used. For example, a glass substrate with a thickness larger than or equal to 0.3 mm and smaller than or equal to 1 mm can be used.

As materials used for the separation layer 43a and the insulating layer 45, materials with which separation is performed at an interface between the separation layer 43a and the insulating layer 45 or in the separation layer 43a can be selected.

For example, it is possible to use a stack of a layer containing a high-melting-point metal material, such as tungsten, and a layer containing an oxide of the metal material as the separation layer 43a, and a stack of layers of inorganic insulating materials, such as silicon nitride, silicon oxide, silicon oxynitride, and silicon nitride oxide, as the insulating layer 45. A high-melting-point metal material is preferably used for the separation layer 43a because in the process after that, treatment at high temperature can be performed and there are more materials and formation methods to choose from.

When a stack of a tungsten layer and a tungsten oxide layer is used as the separation layer 43a, separation can be performed at an interface between the tungsten layer and the tungsten oxide layer, in the tungsten oxide layer, or at an interface between the tungsten oxide layer and the insulating layer 45.

For another example, an organic resin may be used for the separation layer 43a so that separation can be performed at the interface between the support substrate 44a and the separation layer 43a, in the separation layer 43a, or at the interface between the separation layer 43a and the insulating layer 45.

Typically, a polyimide resin can be used for the separation layer 43a. The polyimide resin is preferable because of its high heat resistance. Note that an acrylic resin, an epoxy resin, a polyamide resin, a polyimide-amide resin, a siloxane resin, a benzocyclobutene-based resin, a phenol resin, or the like can be used for the separation layer 43a.

To form the separation layer 43a containing an organic resin, a mixed material of a resin precursor and a solvent is formed over the support substrate 44a by a method such as spin coating, dipping, spray coating, inkjet printing, dispensing, screen printing, or offset printing, or with a doctor knife, a slit coater, a roll coater, a curtain coater, or a knife coater. After that, heat treatment is performed to remove the solvent and the like and cure the material, so that the separation layer 43a containing the organic resin can be formed.

For example, when polyimide is used for the separation layer 43a, a resin precursor in which an imide bond is formed by dehydration can be used. Alternatively, a material containing a soluble polyimide resin may be used.

The organic resin used for the separation layer 43a may be either photosensitive or nonphotosensitive. A photosensitive polyimide is a material that is suitably used for formation of a planarization film or the like of the display panel, and therefore, the formation apparatus and the material can be shared. Thus, there is no need to prepare another apparatus and another material to obtain the structure of one embodiment of the present invention. Furthermore, the separation layer 43a that is formed using a photosensitive resin material can be processed by light exposure and development treatment. For example, an opening portion can be formed and an unnecessary portion can be removed. Moreover, by optimizing a light exposure method or light exposure conditions, an uneven shape can be formed in a surface of the resin layer. For example, a multiple exposure technique or an exposure technique using a half-tone mask or a gray-tone mask may be used.

When the separation layer 43a formed using the organic resin is heated locally, the separability can be improved in some cases. For example, the separation layer 43a can be irradiated with laser light. It is preferable to perform the irradiation by scanning using linear laser light. This is because the process time can be shortened even when the support substrate is increased in area. As the laser light, excimer laser light with a wavelength of 308 nm can be suitably used.

In the irradiation with light used as laser light or the like to improve the separability, a heat generation layer may be overlap with the separation layer 43a. The heat generation layer has a function of generation heat by absorbing light. The heat generation layer is preferably provided between the support substrate 44a and the separation layer 43a, but may be provided over the separation layer 43a. A material that can absorb part of light used as laser light or the like can be used for the heat generation layer. For example, a metal film, a semiconductor film, an oxide film, or the like can be used as the heat generation layer when excimer laser light with a wavelength of 308 nm is used as the laser light. For example, a metal material such as titanium and tungsten, a semiconductor material such as amorphous silicon, an oxide conductive material such as titanium oxide, tungsten oxide, indium oxide, and indium tin oxide, or an indium-containing oxide semiconductor material can be used.

For another example for improving the separability, a layer containing oxygen, hydrogen, water, or the like is provided to be in contact with the separation layer 43a, heat treatment is performed to supply the oxygen, hydrogen, water, or the like into the separation layer 43a or the interface between the separation layer 43a and the layer. Oxygen, hydrogen, water, or the like may be supplied to the support substrate 44a. Oxygen, hydrogen, water, or the like may be supplied to the separation layer 43a. When heat treatment or plasma treatment is performed in an atmosphere containing oxygen, hydrogen, water, or the like, the oxygen, hydrogen, water, or the like can be supplied to the support substrate 44a and the separation layer 43a. Since there is no need to use a laser apparatus or the like, a display device can be manufactured at lower cost.

In some cases, the separation layer 43a remains on the light path in the liquid crystal element 90 or 40 after the separation. In the case where the separation layer 43a absorbs part of visible light, light transmitted the separation layer 43a might be colored. For this reason, after the separation, the separation layer 43a is preferably removed by etching. For example, in the case where an organic resin is used for the separation layer 43a, the remaining separation layer 43a can be removed by, for example, plasma treatment (also referred to as ashing treatment) in an oxygen-containing atmosphere.

Then, the conductive layer 23a is formed over the insulating layer 45. For the conductive layer 23a, an oxide conductive material is preferably used. Since the oxide conductive material is used for the conductive layer 23a, the light can pass even when the conductive layer 23a is positioned in the light path of the liquid crystal element 90. For the conductive layer 23a, a metal oxide, an oxide semiconductor material having low resistance, or the like can be used.

In the case where the oxide semiconductor material is used for the conductive layer 23a, oxygen vacancies may be generated in the oxide semiconductor material by plasma treatment, heat treatment, or the like, to increase the carrier density. Alternatively, impurities such as a rare gas of argon or the like, in addition to hydrogen and nitrogen, may be introduced in the oxide semiconductor material to increase the carrier density. Alternatively, a material to which oxygen is easily diffused may be used for the conductive layer 23b formed over the conductive layer 23a, to reduce oxygen in the oxide semiconductor. Note that two or more methods described above may be employed.

Then, the conductive layer 23b is formed over the conductive layer 23a including an opening. The conductive layer 23b can have a single-layer structure or a stacked structure that includes a metal or an alloy material. In the case where the conductive layer 23b has a stacked structure, a material having reflectivity higher than that of other layers is preferably used for a layer in contact with the conductive layer 23a.

Next, the insulating layer 83 is formed to cover the insulating layer 45, the conductive layer 23a, and the conductive layer 23b. Then, an opening reaching the conductive layer 23b is formed in part of the insulating layer 83.

Figure 10B:
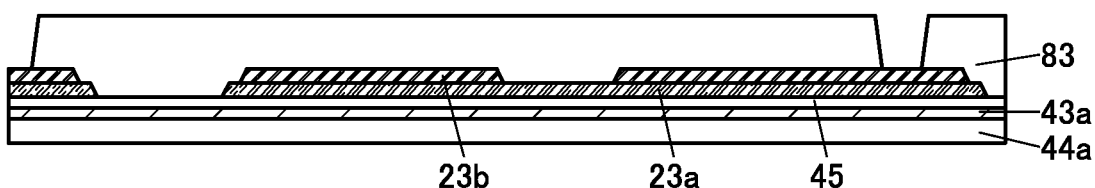

FIG. 10B illustrates a schematic cross-sectional view at this stage.

Next, the transistors 70a and 70b are formed over the insulating layer 83. The transistors 70a and 70b can be formed by a method similar to that of Structure example 1.

In the step of forming gates of the transistors 70a and 70b, when a conductive film is formed and processed, a conductive layer electrically connected to the conductive layer 23b through the opening provided in the insulating layer 83 is formed at the same time. Thus, the connection portion 80 can be formed.

To electrically connect one of the source and the drain of the transistor 70a to the connection portion 80, an opening is formed in part of an insulating layer serving as a gate insulating layer of the transistor 70a and the like.

Then, the insulating layer 81 is formed to cover the transistors 70a and 70b. At this time, in the insulating layer 81, an opening reaching one of the source and the drain of the transistor 70b is formed. After that, the conductive layer 91 is formed over the insulating layer 81.

Next, the alignment film 56a is formed over the insulating layer 81 and the conductive layer 91.

Figure 10C:
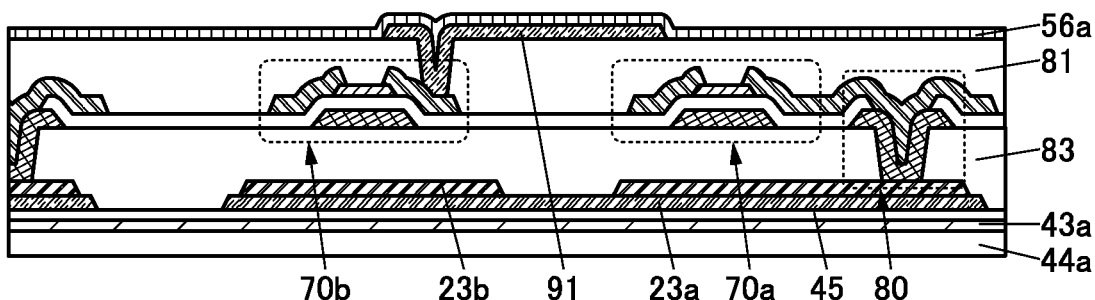

FIG. 10C is a schematic cross-sectional view at this stage.

Then, the substrate 21 is prepared, and the coloring layer 54 is formed over the substrate 21. The insulating layer 63 is formed to cover the coloring layer 54.

Next, over the insulating layer 63, the conductive layer 93, the structure body 14b, and the alignment film 56b are formed in this order.

Figure 10D:
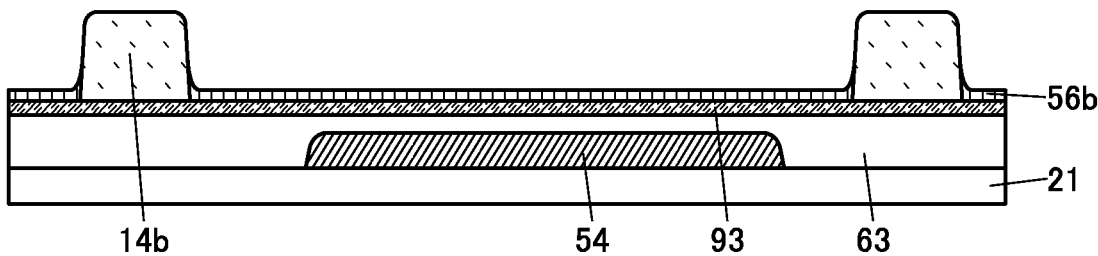

FIG. 10D is a schematic cross-sectional view at this stage.

Figure 11A:
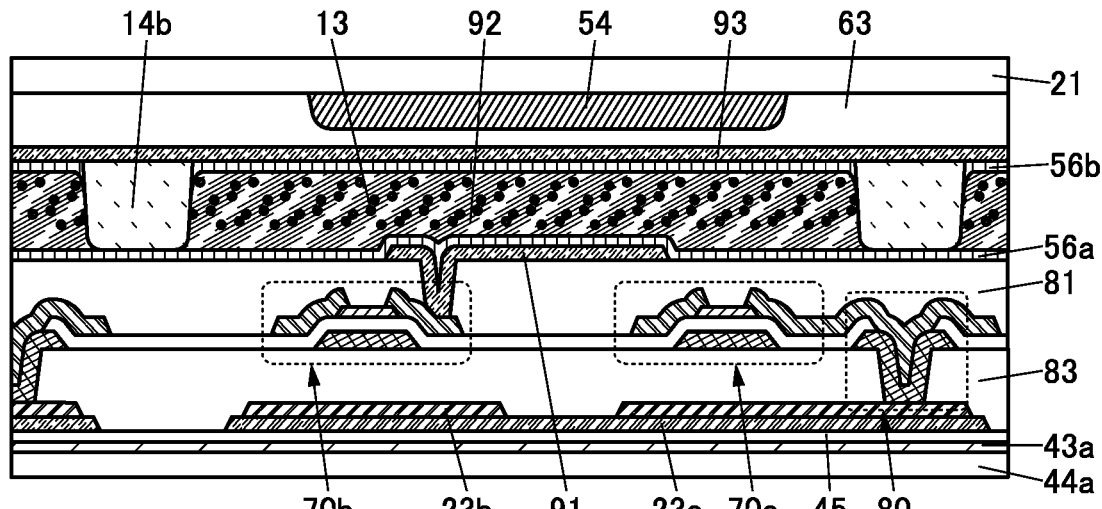
FIGS. 11A to 11C illustrate a method for manufacturing a display device of one embodiment.

Next, the substrate 21 is bonded to the support substrate 44a with a constituent of the liquid crystal layer 24b sandwiched therebetween (FIG. 11A).

Figure 11B:
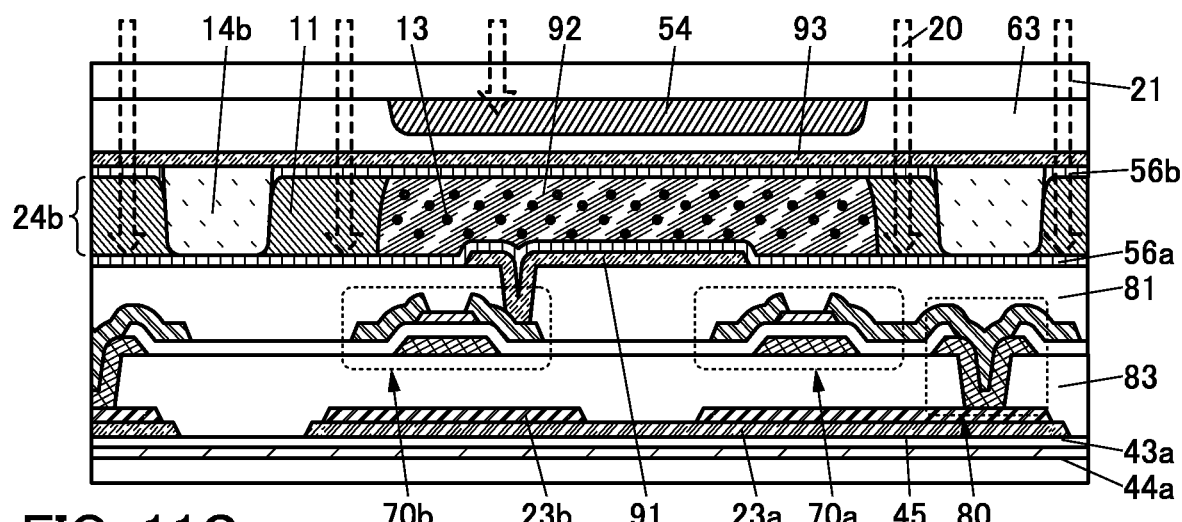

Then, the substrate 21 is irradiated with the light 20, and the partition 11 is formed in a region not overlapping with the coloring layer 54 (FIG. 11B).

Figure 11C:
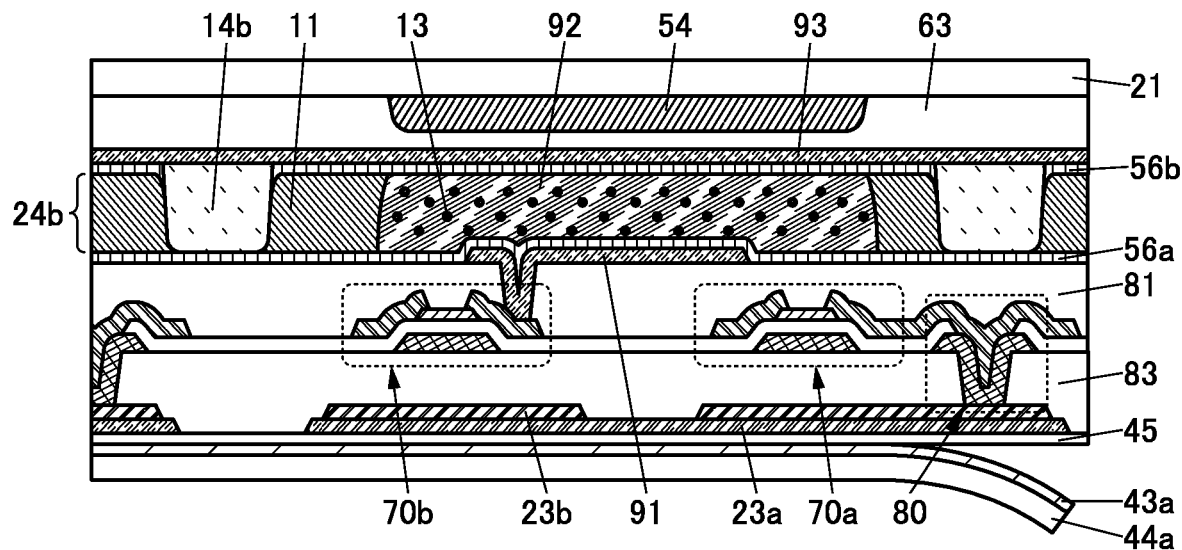

Then, separation is performed between the separation layer 43a and the insulating layer 45 to remove the support substrate 44a and the separation layer 43a (FIG. 11C).

In this manner, the partition 11 is preferably formed before the separation is performed. Since a plurality of partitions 11 can be provided between adjacent pixels, the strength of adhesion between a pair of layers (here, the alignment films 56a and 56b) between which the liquid crystal layer 24b is sandwiched can be increased. Thus, the separation in the liquid crystal layer 24b is suppressed in the step of performing the separation, so that the support substrate 44a can be separated with a higher yield.

As the method for separating the support substrate 44a from the insulating layer 45, applying mechanical force, etching the separation layer, and making liquid permeate the separation interface by dripping the liquid at the end portion of the support substrate 44a or soaking the support substrate 44a in the liquid are given as examples. Alternatively, separation may be performed by heating or cooling the support substrate 44a by utilizing a difference in thermal expansion coefficient of the two layers which form the separation interface.

In addition, treatment for exposing part of the separation interface may be performed before the separation is performed. For example, with lasers or a sharp tool, part of the insulating layer 45 on the separation layer 43a is removed. Thus, a portion in which the insulating layer 45 is removed is used as a trigger to perform the separation.

As described above, to improve the separability, the separation layer 43a and the like may be irradiated with laser light. Alternatively, to improve the separability, heat treatment may be performed during a process after the formation of the separation layer 43a and before the separation.

After the separation, part of the separation layer 43a remains on the surface of the insulating layer 45 in some cases. In that case, the remaining separation layer 43a may be removed by washing, etching, plasma treatment, wiping, or the like. When the remaining separation layer 43a does not affect the operation and display quality of the display device, the remaining separation layer 43a is not necessarily removed. In that case, a layer containing the constituent element of the separation layer 43a remains on the surface of the insulating layer 45.

Next, the insulating layer 45 is removed. The insulating layer 45 can be removed by a dry etching method or a wet etching method, for example. The insulating layer 45 is removed, so that the surfaces of the conductive layer 23b and the insulating layer 83 are exposed.

Note that there is no need to remove the insulating layer 45 when it has light-transmitting properties. However, if the thickness of the insulating layer 45 is too large, the driving voltage of the liquid crystal element 40 might be increased. In that case, the thickness of the insulating layer 45 may be reduced by the etching method.

Figure 12A:
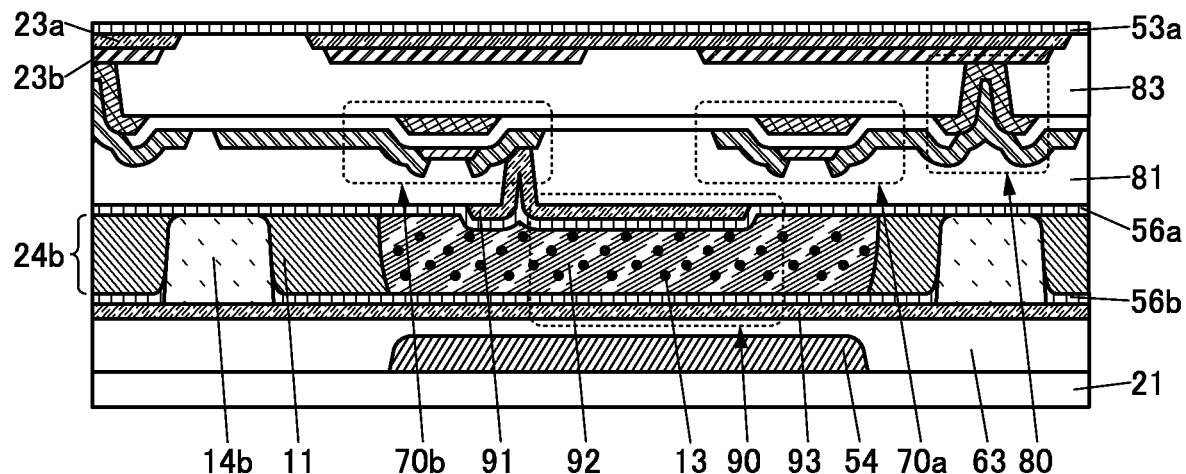
FIGS. 12A to 12C illustrate a method for manufacturing a display device of one embodiment.

Next, the alignment film 53a is formed over the conductive layer 23a (FIG. 12A). To form the alignment film 26a, for example, a thin film is formed and then subjected to a rubbing treatment.

Note that for another example, the insulating layer 45 which is formed of an organic resin is not removed and subjected to a rubbing treatment to be used as the alignment film 26a. For another example, after the separation is performed between the separation layer 43a which is formed of an organic resin and the support substrate 44a, the separation layer 43a is not removed and subjected to a rubbing treatment to be used as the alignment film 26a. Here, it is preferable that the insulating layer 45 have a small thickness or not be provided.

Next, the substrate 31 is prepared. The light-blocking layer 52, the coloring layers 51a and 51b, and the like are formed over the substrate 31. Then, the insulating layer 61 covering them is formed.

For the light-blocking layer 52, a metal material or a resin material can be used.

Figure 12B:
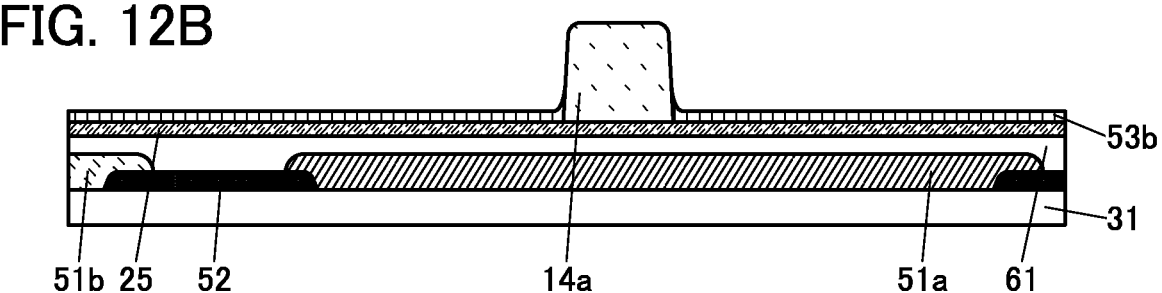

Next, the conductive layer 25, the structure body 14a, and the alignment film 53b are formed over the insulating layer 61 in this order (FIG. 12B).

Figure 12C:
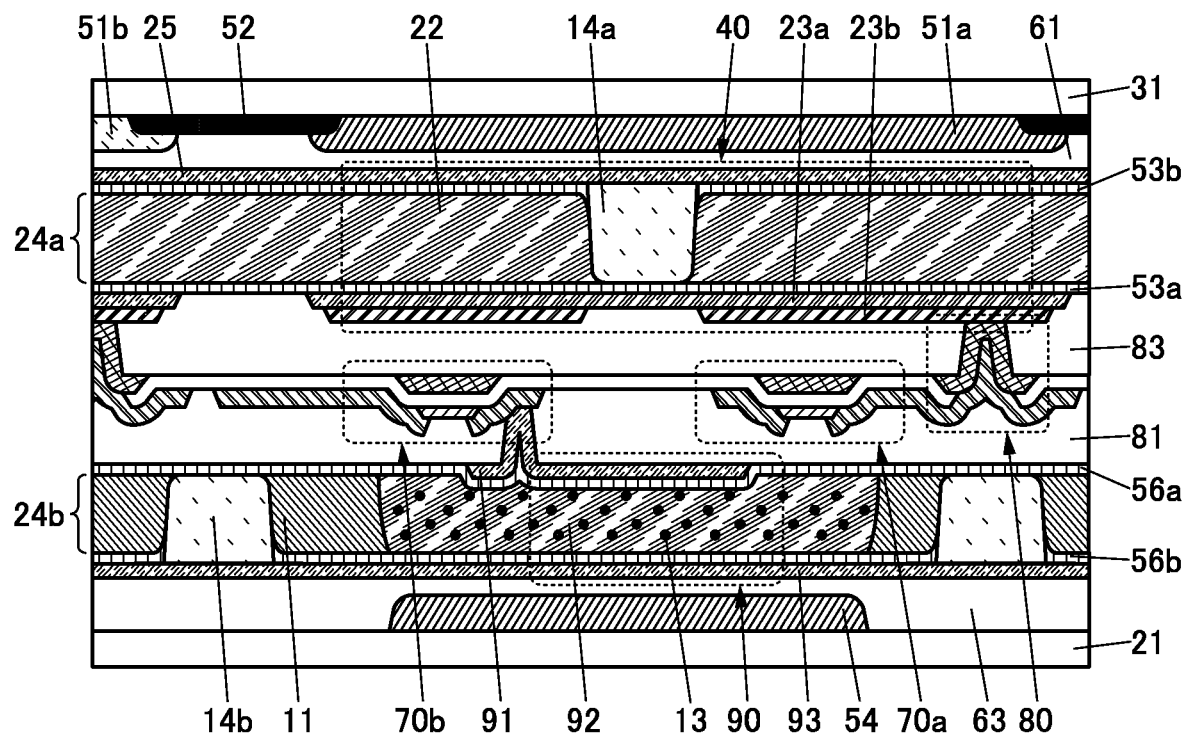

Finally, the substrates 31 and 21 are bonded with the liquid crystal 22 sandwiched therebetween (FIG. 12C).

According to the above steps, the display device shown in FIG. 8 can be manufactured.

The above is the description of Manufacturing method example 2.

[Components]

The above components will be described below.

A material having a flat surface can be used as the substrate included in the display device. The substrate on the side from which light from the display element is extracted is formed using a material transmitting the light. For example, a material such as glass, quartz, ceramics, sapphire, or an organic resin can be used.

The weight and thickness of the display device can be decreased by using a thin substrate. A flexible display device can be fabricated by using a substrate that is thin enough to have flexibility.

Since the substrate through which light emission is not extracted does not need to have a light-transmitting property, a metal substrate or the like can be used, other than the above-mentioned substrates. A metal substrate, which has high thermal conductivity, is preferable because the whole metal substrate can easily conduct heat and accordingly can prevent a local temperature rise in the display device. To obtain flexibility and bendability, the thickness of a metal substrate is preferably greater than or equal to 10 μm and less than or equal to 200 μm, more preferably greater than or equal to 20 μm and less than or equal to 50 μm.

Although there is no particular limitation on a material of a metal substrate, metals such as aluminum, copper, and nickel, an aluminum alloy, and an alloy such as stainless steel can preferably be used, for example.

It is possible to use a substrate subjected to insulation treatment in such a manner that a surface of a metal substrate is oxidized or an insulating film is formed on a surface. An insulating film may be formed by, for example, a coating method such as a spin-coating method or a dipping method, an electrodeposition method, an evaporation method, or a sputtering method. An oxide film may be formed on the substrate surface by an anodic oxidation method, exposure to or heating in an oxygen atmosphere, or the like.

Examples of the material that has flexibility and transmits visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. It is particularly preferable to use a material with a low thermal expansion coefficient, for example, a material with a thermal expansion coefficient lower than or equal to $30 \times 10^{-6}$/K, such as a polyamide imide resin, a polyimide resin, or PET. A substrate in which a glass fiber is impregnated with an organic resin or a substrate whose thermal expansion coefficient is reduced by mixing an inorganic filler with an organic resin can also be used. A substrate using such a material is lightweight, and thus a display device using this substrate can also be lightweight.

In the case where a fibrous body is included in the above material, a high-strength fiber of an organic compound or an inorganic compound is used as the fibrous body. The high-strength fiber is specifically a fiber with a high tensile elastic modulus or a fiber with a high Young's modulus. Typical examples thereof include a polyvinyl alcohol based fiber, a polyester based fiber, a polyamide based fiber, a polyethylene based fiber, an aramid based fiber, a polyparaphenylene benzobisoxazole fiber, a glass fiber, and a carbon fiber. As the glass fiber, glass fiber using E glass, S glass, D glass, Q glass, or the like can be used. These fibers may be used in a state of a woven or nonwoven fabric, and a structure body in which this fibrous body is impregnated with a resin and the resin is cured may be used as the flexible substrate. The structure body including the fibrous body and the resin is preferably used as the flexible substrate, in which case the reliability against breaking due to bending or local pressure can be increased.

Alternatively, glass, metal, or the like that is thin enough to have flexibility can be used as the substrate. Alternatively, a composite material where glass and a resin material are bonded to each other with a bonding layer may be used.

A hard coat layer (e.g., a silicon nitride layer and an aluminum oxide layer) by which a display device surface is protected from damage, a layer (e.g., an aramid resin layer) that can disperse pressure, or the like may be stacked over the flexible substrate. Furthermore, to suppress a decrease in the lifetime of the display element due to moisture and the like, an insulating film with low water permeability may be stacked over the flexible substrate. For example, an inorganic insulating material such as silicon nitride, silicon oxynitride, silicon nitride oxide, aluminum oxide, or aluminum nitride can be used.

The substrate may be formed by stacking a plurality of layers. When a glass layer is used, a barrier property against water and oxygen can be improved and thus a highly reliable display device can be provided.

[Transistor]

The transistor includes a conductive layer serving as the gate electrode, the semiconductor layer, a conductive layer serving as the source electrode, a conductive layer serving as the drain electrode, and an insulating layer serving as the gate insulating layer. In the above, a bottom-gate transistor is used.

Note that there is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

As a semiconductor material used for the transistor, an element of Group 14 (e.g., silicon or germanium), a compound semiconductor, or an oxide semiconductor can be used, for example. Typically, a semiconductor containing silicon, a semiconductor containing gallium arsenide, an oxide semiconductor containing indium, or the like can be used.

In particular, an oxide semiconductor having a wider band gap than silicon is preferably used. A semiconductor material having a wider band gap and a lower carrier density than silicon is preferably used because the off-state current of the transistor can be reduced.

For the semiconductor layer, it is particularly preferable to use an oxide semiconductor including a plurality of crystal parts whose c-axes are aligned substantially perpendicularly to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be favorably used for a flexible display device which is used in a bent state, or the like.

Moreover, the use of such an oxide semiconductor with crystallinity for the semiconductor layer makes it possible to provide a highly reliable transistor with a small change in electrical characteristics.

A transistor with an oxide semiconductor whose band gap is larger than the band gap of silicon has a low off-state current, and therefore, charges stored in a capacitor that is connected in series to the transistor can be held for a long time. When such a transistor is used for a pixel, operation of a driver circuit can be stopped while the gray level of each pixel is maintained. As a result, a display device with extremely low power consumption can be obtained.

The semiconductor layer preferably includes, for example, a film represented by an In-M-Zn-based oxide that contains at least indium, zinc, and M (a metal such as aluminum, titanium, gallium, germanium, yttrium, zirconium, lanthanum, cerium, tin, neodymium, or hafnium). In order to reduce variations in the electrical characteristics of the transistor including the oxide semiconductor, the oxide semiconductor preferably contains a stabilizer in addition to indium, zinc, and M.

Examples of the stabilizer, including metals that can be used as M, are gallium, tin, hafnium, aluminum, and zirconium. Other examples of the stabilizer include lanthanoids such as lanthanum, cerium, praseodymium, neodymium, samarium, europium, gadolinium, terbium, dysprosium, holmium, erbium, thulium, ytterbium, and lutetium.

As an oxide semiconductor included in the semiconductor layer, any of the following can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, an "In—Ga—Zn-based oxide" means an oxide containing In, Ga, and Zn as its main components, and there is no limitation on the ratio of In:Ga:Zn. The In—Ga—Zn-based oxide may contain another metal element in addition to In, Ga, and Zn.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced, and the same etching gas or the same etchant can be used in processing the semiconductor layer and the conductive layer. Note that even when the semiconductor layer and the conductive layer include the same metal elements, they have different compositions in some cases. For example, a metal element in a film is released during the manufacturing process of the transistor and the capacitor, which might result in different metal compositions.

The energy gap of the oxide semiconductor included in the semiconductor layer is preferably 2 eV or more, more preferably 2.5 eV or more, still more preferably 3 eV or more. With the use of an oxide semiconductor having such a wide energy gap, the off-state current of the transistor can be reduced.

In the case where the oxide semiconductor included in the semiconductor layer is an In-M-Zn oxide, it is preferable that the atomic ratio of metal elements of a sputtering target used to form a film of the In-M-Zn oxide satisfy In≥M and Zn≥M. As the atomic ratio of metal elements of such a sputtering target, In:M:Zn=1:1:1, In:M:Zn=1:1:1.2, In:M:Zn=3:1:2, In:M:Zn=4:2:4.1, and the like are preferable. Note that the atomic ratio of metal elements in the formed semiconductor layer varies from the above atomic ratio of metal elements of the sputtering target within a range of ±40% as an error.

An oxide semiconductor film with low carrier density is used as the semiconductor layer. For example, the semiconductor layer is an oxide semiconductor whose carrier density is lower than or equal to $1 \times 10^{17}/cm^3$, preferably lower than or equal to $1 \times 10^{15}/cm^3$, more preferably lower than or equal to $1 \times 10^{13}/cm^3$, still more preferably lower than or equal to $1 \times 10^{11}/cm^3$, yet still more preferably lower than $1 \times 10^{10}/cm^3$, and higher than or equal to $1 \times 10^{-9}/cm^3$. Such an oxide semiconductor is referred to as a highly purified intrinsic or substantially highly purified intrinsic oxide semiconductor. The oxide semiconductor has a low impurity concentration and a low density of defect states and can thus be referred to as an oxide semiconductor having stable characteristics.

Note that, without limitation to those described above, a material with an appropriate composition may be used depending on required semiconductor characteristics and electrical characteristics (e.g., field-effect mobility and threshold voltage) of a transistor. To obtain the required semiconductor characteristics of the transistor, it is preferable that the carrier density, the impurity concentration, the defect density, the atomic ratio between a metal element and oxygen, the interatomic distance, the density, and the like of the semiconductor layer be set to appropriate values.

When silicon or carbon, which is one of elements belonging to Group 14, is contained in the oxide semiconductor included in the semiconductor layer, the semiconductor layer includes an increased number of oxygen vacancies and thus becomes n-type. Thus, the concentration of silicon or carbon (measured by secondary ion mass spectrometry) in the semiconductor layer is lower than or equal to $2 \times 10^{18}$ atoms/cm$^3$, preferably lower than or equal to $2 \times 10^{17}$ atoms/cm$^3$.

Alkali metal and alkaline earth metal might generate carriers when bonded to an oxide semiconductor, in which case the off-state current of the transistor might be increased. Therefore, the concentration of alkali metal or alkaline earth metal of the semiconductor layer, which is measured by secondary ion mass spectrometry, is lower than or equal to $1 \times 10^{18}$ atoms/cm$^3$, preferably lower than or equal to $2 \times 10^{16}$ atoms/cm$^3$.

When nitrogen is contained in the oxide semiconductor included in the semiconductor layer, electrons serving as carriers are generated and the carrier density increases, so that the semiconductor layer easily becomes n-type. Thus, a transistor including an oxide semiconductor which contains nitrogen is likely to be normally on. Hence, the concentration of nitrogen which is measured by secondary ion mass spectrometry is preferably set to lower than or equal to $5 \times 10^{18}$ atoms/cm$^3$.

The semiconductor layer may have a non-single-crystal structure, for example. The non-single-crystal structure includes CAAC-OS (c-axis aligned crystalline oxide semiconductor, or c-axis aligned a-b-plane-anchored crystalline oxide semiconductor), a polycrystalline structure, a microcrystalline structure, or an amorphous structure, for example. Among the non-single-crystal structures, an amorphous structure has the highest density of defect states, whereas CAAC-OS has the lowest density of defect states.

An oxide semiconductor film having an amorphous structure has disordered atomic arrangement and no crystalline component, for example. Alternatively, an oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a region of CAAC-OS, and a region having a single-crystal structure. The mixed film may have, for example, a single-layer structure or a stacked structure including two or more of the above regions.

<Composition of CAC-OS>

Described below will be the composition of a cloud-aligned composite oxide semiconductor (CAC-OS) applicable to a transistor disclosed in one embodiment of the present invention.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide (InO$_{X1}$, where X1 is a real number greater than 0) or indium zinc oxide (In$_{X2}$Zn$_{Y2}$O$_{Z2}$, where X2, Y2, and Z2 are real numbers greater than 0), and gallium oxide (GaO$_{X3}$, where X3 is a real number greater than 0) or gallium zinc oxide (Ga$_{X4}$Zn$_{Y4}$O$_{Z4}$, where X4, Y4, and Z4 are real numbers greater than 0), and a mosaic pattern is formed. Then, InO$_{X1}$ or In$_{X2}$Zn$_{Y2}$O$_{Z2}$ forming the mosaic pattern is evenly distributed in the film. This composition is also referred to as a cloud-like composition.

That is, the CAC-OS is a composite oxide semiconductor with a composition in which a region including GaO$_{X3}$ as a main component and a region including In$_{X2}$Zn$_{Y2}$O$_{Z2}$ or InO$_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by InGaO$_3$(ZnO)$_{m1}$ (m1 is a natural number) and a crystalline compound represented by In$_{(1+x0)}$Ga$_{(1-x0)}$O$_3$(ZnO)$_{m0}$ ($-1 \leq x0 \leq 1$; m0 is a given number).

The above crystalline compounds have a single crystal structure, a polycrystalline structure, or a c-axis-aligned crystalline or CAAC structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a layered structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be deposited by a sputtering method under conditions where a substrate is not heated intentionally, for example. In the case of depositing the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow rate of an oxygen gas is preferably higher than or equal to 0% and lower than 30%, more preferably higher than or equal to 0% and lower than or equal to 10%.

The CAC-OS is characterized in that no clear peak is observed in measurement using θ/2θ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

As described above, the CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility (μ) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, a leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or $InO_{X1}$ complement each other, whereby a high on-state current (Ion) and high field-effect mobility (μ) can be achieved.

A semiconductor element including a CAC-OS has high reliability. Thus, the CAC-OS is suitably used in a variety of semiconductor devices typified by a display.

Alternatively, silicon is preferably used as a semiconductor in which a channel of a transistor is formed. Although amorphous silicon may be used as silicon, silicon having crystallinity is particularly preferable. For example, microcrystalline silicon, polycrystalline silicon, single-crystal silicon, or the like is preferably used. In particular, polycrystalline silicon can be formed at a lower temperature than single-crystal silicon and has higher field effect mobility and higher reliability than amorphous silicon. When such a polycrystalline semiconductor is used for a pixel, the aperture ratio of the pixel can be improved. Even in the case where the display portion with extremely high resolution is provided, a gate driver circuit and a source driver circuit can be formed over a substrate over which the pixels are formed, and the number of components of an electronic device can be reduced.

The bottom-gate transistor described in this embodiment is preferable because the number of manufacturing steps can be reduced. When amorphous silicon, which can be formed at a lower temperature than polycrystalline silicon, is used for the semiconductor layer, materials with low heat resistance can be used for a wiring, an electrode, and a substrate below the semiconductor layer, resulting in wider choice of materials. For example, an extremely large glass substrate can be favorably used. Meanwhile, the top-gate transistor is preferable because an impurity region is easily formed in a self-aligned manner and variations in characteristics can be reduced. In that case, the use of polycrystalline silicon, single-crystal silicon, or the like is particularly suitable.

[Conductive Layer]

As materials for the gates, the source, and the drain of a transistor, and the conductive layers serving as the wirings and electrodes included in the display device, any of metals such as aluminum, titanium, chromium, nickel, copper, yttrium, zirconium, molybdenum, silver, tantalum, and tungsten, or an alloy containing any of these metals as its main component can be used. A single-layer structure or a layered structure including a film containing any of these materials can be used. For example, the following structures can be given: a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, and a three-layer structure in which a molybdenum film or a molybdenum nitride film, an aluminum film or a copper film, and a molybdenum film or a molybdenum nitride film are stacked in this order. Note that an oxide such as indium oxide, tin oxide, or zinc oxide may be used.

Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium or an alloy material containing any of these metal materials can be used. Alternatively, a nitride of the metal material (e.g., titanium nitride) or the like may be used. In the case of using the metal material or the alloy material (or the nitride thereof), the thickness is set small enough to allow light transmission. Alternatively, a layered film of any of the above materials can be used as the conductive layer. For example, a layered film of indium tin oxide and an alloy of silver and magnesium is preferably used because the conductivity can be increased. They can also be used for conductive layers of a variety of wirings and electrodes included in a display device, and conductive layers (e.g., conductive layers serving as a pixel electrode and a common electrode) included in a display element

[Insulating Layer]

As an insulating material that can be used for the insulating layers, a resin such as acrylic or epoxy, a resin having a siloxane bond, or an inorganic insulating material such as silicon oxide, silicon oxynitride, silicon nitride oxide, silicon nitride, or aluminum oxide can be used.

The light-emitting element is preferably provided between a pair of insulating films with low water permeability, in which case entry of impurities such as water into the light-emitting element can be inhibited. Thus, a decrease in device reliability can be suppressed.

As an insulating film with low water permeability, a film containing nitrogen and silicon, such as a silicon nitride film or a silicon nitride oxide film, a film containing nitrogen and aluminum, such as an aluminum nitride film, or the like can be used. Alternatively, a silicon oxide film, a silicon oxynitride film, an aluminum oxide film, or the like may be used.

For example, the amount of water vapor transmission of the insulating film with low water permeability is lower than or equal to $1 \times 10^{-5}$ [g/(m$^2$·day)], preferably lower than or equal to $1 \times 10^{-6}$ [g/(m$^2$·day)], more preferably lower than or equal to $1 \times 10^{-7}$ [g/(m$^2$·day)], still more preferably lower than or equal to $1 \times 10^{-8}$ [g/(m$^2$·day)].

[Liquid Crystal Element]

The liquid crystal element can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element can employ a variety of modes; for example, other than the VA mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, an electrically controlled birefringence (ECB) mode, or a guest host mode can be used.

The liquid crystal element controls transmission or non-transmission of light utilizing an optical modulation action of liquid crystal. Note that the optical modulation action of liquid crystal is controlled by an electric field applied to the liquid crystal (including a horizontal electric field, a vertical electric field, and an oblique electric field). As the liquid crystal used for the liquid crystal element, thermotropic liquid crystal, low-molecular liquid crystal, high-molecular liquid crystal, polymer dispersed liquid crystal (PDLC), polymer network liquid crystal (PNLC), ferroelectric liquid crystal, anti-ferroelectric liquid crystal, or the like can be used. These liquid crystal materials exhibit a cholesteric phase, a smectic phase, a cubic phase, a chiral nematic phase, an isotropic phase, or the like depending on conditions.

As the liquid crystal material, either positive liquid crystal or negative liquid crystal may be used, and an appropriate liquid crystal material can be used depending on the mode or design to be used.

An alignment film can be provided to adjust the alignment of liquid crystal. In the case where a horizontal electric field mode is employed, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed to account for several weight percent or more is used for the liquid crystal layer in order to widen the temperature range. The liquid crystal composition which includes liquid crystal exhibiting a blue phase and a chiral material has a short response time and has optical isotropy. In addition, the liquid crystal composition which includes liquid crystal exhibiting a blue phase and a chiral material does not need alignment treatment and has small viewing angle dependence. An alignment film is not necessarily provided and rubbing treatment is thus not necessary; accordingly, electrostatic discharge damage caused by the rubbing treatment can be prevented and defects and damage of the liquid crystal display device in the manufacturing process can be reduced.

As the liquid crystal element, a transmissive liquid crystal element, a reflective liquid crystal element, a semi-transmissive liquid crystal element, or the like can be used.

In one embodiment of the present invention, in particular, a combination of a reflective liquid crystal element and a transmissive liquid crystal element can be used.

In the case where the transmissive or semi-transmissive liquid crystal element is used, two polarizing plates are provided such that a pair of substrates are sandwiched therebetween. A backlight (backlight unit) is provided outside one of the polarizing plates. As the backlight, a direct-below backlight or an edge-light backlight may be used. The direct-below backlight including an LED is preferably used because local dimming is easily performed to improve contrast. The edge-light backlight is preferably used because the thickness of a module including the backlight can be reduced.

In the case where a reflective liquid crystal element is used, a polarizing plate is provided on the display surface side. In addition, a light diffusion plate is preferably provided on the display surface side to improve visibility.

[Bonding Layer]

As the bonding layer, any of a variety of curable adhesives, e.g., a photo-curable adhesive such as an ultraviolet curable adhesive, a reactive curable adhesive, a thermosetting curable adhesive, and an anaerobic adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component-mixture-type resin may be used. Still alternatively, an adhesive sheet or the like may be used.

Furthermore, the resin may include a drying agent. For example, a substance that adsorbs moisture by chemical adsorption, such as an oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can inhibit entry of impurities such as moisture into an element, leading to an improvement in the reliability of the display panel.

In addition, a filler with a high refractive index or a light-scattering member may be mixed into the resin, in which case light extraction efficiency can be improved. For example, titanium oxide, barium oxide, zeolite, or zirconium can be used.

[Connection Layer]

As a connection layer, an anisotropic conductive film (ACF), an anisotropic conductive paste (ACP), or the like can be used.

[Coloring Layer]

Examples of materials that can be used for the coloring layer include a metal material, a resin material, and a resin material containing a pigment or dye.

[Light-Blocking Layer]

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked structure of a film containing a material of a coloring layer which transmits light of a certain color and a film containing a material of a coloring layer which transmits light of another color can be employed. It is preferred that the coloring layer and the light-blocking layer be formed using the same material because the same manufacturing apparatus can be used and the process can be simplified.

The above is the description of each of the components.

Structure Example 3

A more specific structure example of the display device of one embodiment of the present invention will be described below with reference to drawings.

Cross-Sectional Structure Example 3-1

Figure 13:
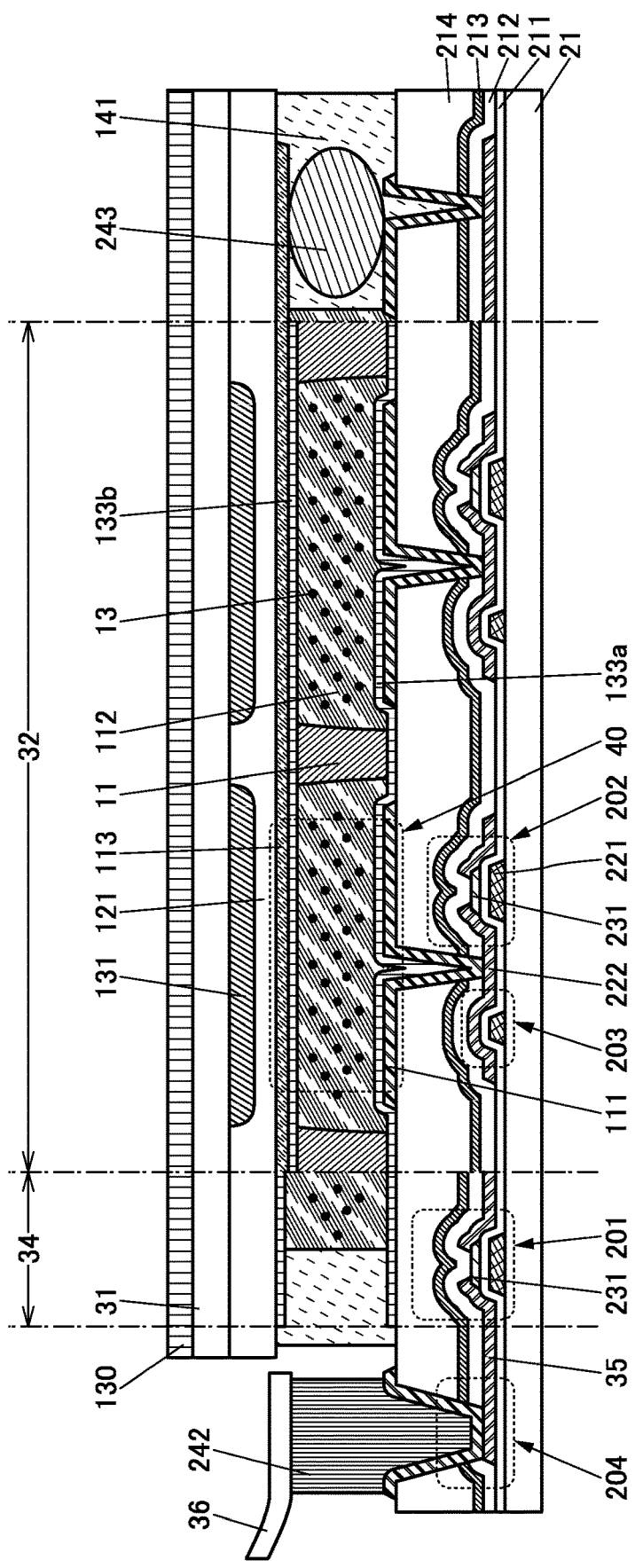
FIG. 13 illustrates a structure example of a display device of one embodiment.

FIG. 13 is a schematic cross-sectional view of a display device described below as an example. FIG. 13 illustrates an example of cross sections of a region including the FPC 36, a region including the circuit 34, a region including the display portion 32, and the like in FIG. 1A.

The substrate 21 and the substrate 31 are bonded to each other with a bonding layer 141. A region surrounded by the substrate 21, the substrate 31, and the bonding layer 141 is filled with liquid crystal 112. A polarizing plate 130 is provided on an outer surface of the substrate 31.

In FIG. 13, the liquid crystal element 40 includes the conductive layer 111, part of the conductive layer 113, and the liquid crystal 112 sandwiched therebetween. In addition, an alignment film 133a is provided between the liquid crystal 112 and the conductive layer 111, and an alignment film 133b is provided between the liquid crystal 112 and the conductive layer 113.

In addition, between the substrate 21 and the substrate 31, the monomers 13 are dispersed in the liquid crystal 112. Moreover, the partitions 11 are provided between the substrate 21 and the substrate 31.

Although not illustrated, a front light can be provided outside the polarizing plate 130. As the front light, an edge-light front light is preferably used. A front light including an LED is preferably used because power consumption can be reduced.

The substrate 31 is provided with a coloring layer 131, an insulating layer 121, the conductive layer 113 serving as a common electrode of the liquid crystal element 40, the alignment film 133b, and the like.

The substrate 21 is provided with the conductive layer 111 serving as a pixel electrode of the liquid crystal element 40, the alignment film 133a, a transistor 201, a transistor 202, a capacitor 203, a connection portion 204, the wiring 35, and the like. For example, the transistor 201 corresponds to the transistor 70 described above.

Insulating layers such as an insulating layer 211, an insulating layer 212, an insulating layer 213, and an insulating layer 214 are provided over the substrate 21. A portion of the insulating layer 211 functions as a gate insulating layer of each transistor, and another portion thereof functions as a dielectric of the capacitor 203. The insulating layer 212, the insulating layer 213, and the insulating layer 214 are provided to cover each transistor and the capacitor 203. The insulating layer 214 functions as a planarization layer. Note that an example where the three insulating layers, the insulating layers 212, 213, and 214, are provided to cover the transistors and the like is described here; however, one embodiment of the present invention is not limited to this example, and four or more insulating layers, a single insulating layer, or two insulating layers may be provided. The insulating layer 214 functioning as a planarization layer is not necessarily provided when not needed.

The transistor 201 and the transistor 202 each include a conductive layer 221 part of which functions as a gate, conductive layers 222 parts of which function as a source and a drain, and a semiconductor layer 231. Here, a plurality of layers obtained by processing the same conductive film are shown with the same hatching pattern.

In the transistor 202, one of the pair of conductive layers 222 which is not electrically connected to the conductive layer 111 may function as part of a signal line. The conductive layer 222 functioning as a gate of the transistor 202 may also function as part of a scan line.

FIG. 13 illustrates a cross section of two pixels (sub-pixels) as an example of the display portion 32. One sub-pixel includes, for example, the transistor 202, the capacitor 203, the liquid crystal element 40, and the coloring layer 131. For example, the coloring layers 131 are selectively formed so that a sub-pixel exhibiting a red color, a sub-pixel exhibiting a green color, and a sub-pixel exhibiting a blue color are arranged; thus, full-color display can be achieved.

FIG. 13 illustrates an example of the circuit 34 in which the transistor 201 is provided.

Although the transistors 201 and 202 each include one gate in FIG. 13, the semiconductor layer 231 where a channel is formed may be provided between two gates. Such a structure enables control of threshold voltages of transistors. In that case, the two gates may be connected to each other and supplied with the same signal to operate the transistors. Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display device in which the number of wirings is increased because of an increase in size or resolution.

Note that the transistor included in the circuit 34 and the transistor included in the display portion 32 may have the same structure. A plurality of transistors included in the circuit 34 may have the same structure or different structures. A plurality of transistors included in the display portion 32 may have the same structure or different structures.

A material through which impurities such as water or hydrogen do not easily diffuse is preferably used for at least one of the insulating layers 212 and 213 which cover the transistors. That is, the insulating layer 212 or the insulating layer 213 can function as a barrier film. Such a structure can effectively suppress diffusion of the impurities into the transistors from the outside, and a highly reliable display device can be provided.

The conductive layer 111 is provided over the insulating layer 214. The conductive layer 111 is electrically connected to one of a source and a drain of the transistor 202 through an opening formed in the insulating layer 214, the insulating layer 213, the insulating layer 212, and the like. The conductive layer 111 is also electrically connected to one electrode of the capacitor 203.

The insulating layer 121 is provided on the substrate 31 side to cover the coloring layer 131. The insulating layer 121 may have a function of a planarization layer. The insulating layer 121 enables the conductive layer 113 to have an almost flat surface, resulting in a uniform alignment state of the liquid crystal 112.

In FIG. 13, the partitions 11 are each positioned to overlap with a region between two adjacent conductive layers 111. In addition, the partitions 11 are positioned to overlap with the alignment film 133a, the alignment film 133b, the conductive layer 113, and the like.

In the liquid crystal element 40, the conductive layer 111 has a function of reflecting visible light, and the conductive layer 113 has a function of transmitting visible light. Light incident from the substrate 31 side is polarized by the polarizing plate 130, passes through the conductive layer 113 and the liquid crystal 112, and is reflected by the conductive layer 111. Then, the light passes through the liquid crystal 112 and the conductive layer 113 again and reaches the polarizing plate 130. In this case, the alignment of the liquid crystal 112 is controlled with a voltage that is applied between the conductive layer 111 and the conductive layer 113, and thus optical modulation of light can be controlled. That is, the intensity of light emitted through the polarizing plate 130 can be controlled. Light other than one in a particular wavelength region of the light is absorbed by the coloring layer 131, and thus, emitted light is red light, for example.

As the polarizing plate 130, a linear polarizing plate or a circularly polarizing plate can be used. An example of a circularly polarizing plate is a stack including a linear polarizing plate and a quarter-wave retardation plate. Such a structure can reduce reflection of external light. The cell gap, alignment, driving voltage, and the like of the liquid crystal element used as the liquid crystal element 40 are controlled in accordance with the kind of the polarizing plate 130 so that desirable contrast is obtained.

The conductive layer 113 is electrically connected to a conductive layer provided on the substrate 21 side through a connector 243 in a portion close to an end portion of the substrate 31. Thus, a potential or a signal can be supplied from an FPC, an IC, or the like provided on the substrate 21 side to the conductive layer 113.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. As the connector 243, a material capable of elastic deformation or plastic deformation is preferably used. As illustrated in FIG. 13, the connector 243 which is the conductive particle has a shape that is vertically crushed in some cases. With the crushed shape, the contact area between the connector 243 and a conductive layer electrically connected to the connector 243 can be increased, resulting in a reduction in contact resistance and suppression of the generation of problems such as disconnection.

The connector 243 is preferably provided such that it is covered with the bonding layer 141. For example, the connectors 243 are dispersed in the bonding layer 141 before curing of the bonding layer 141.

The connection portion 204 is provided in a region near an end portion of the substrate 21. The connection portion 204 is electrically connected to the FPC 36 through a connection layer 242. In the structure in FIG. 13, the connection portion 204 is formed by stacking part of the wiring 35 and a conductive layer obtained by processing the same conductive film as the conductive layer 111.

The above is the description of Cross-sectional structure example 3-1.

Cross-Sectional Structure Example 3-2

A structure example of a touch panel that includes a touch sensor will be described below as an example of the display device of one embodiment of the present invention.

Figure 14:
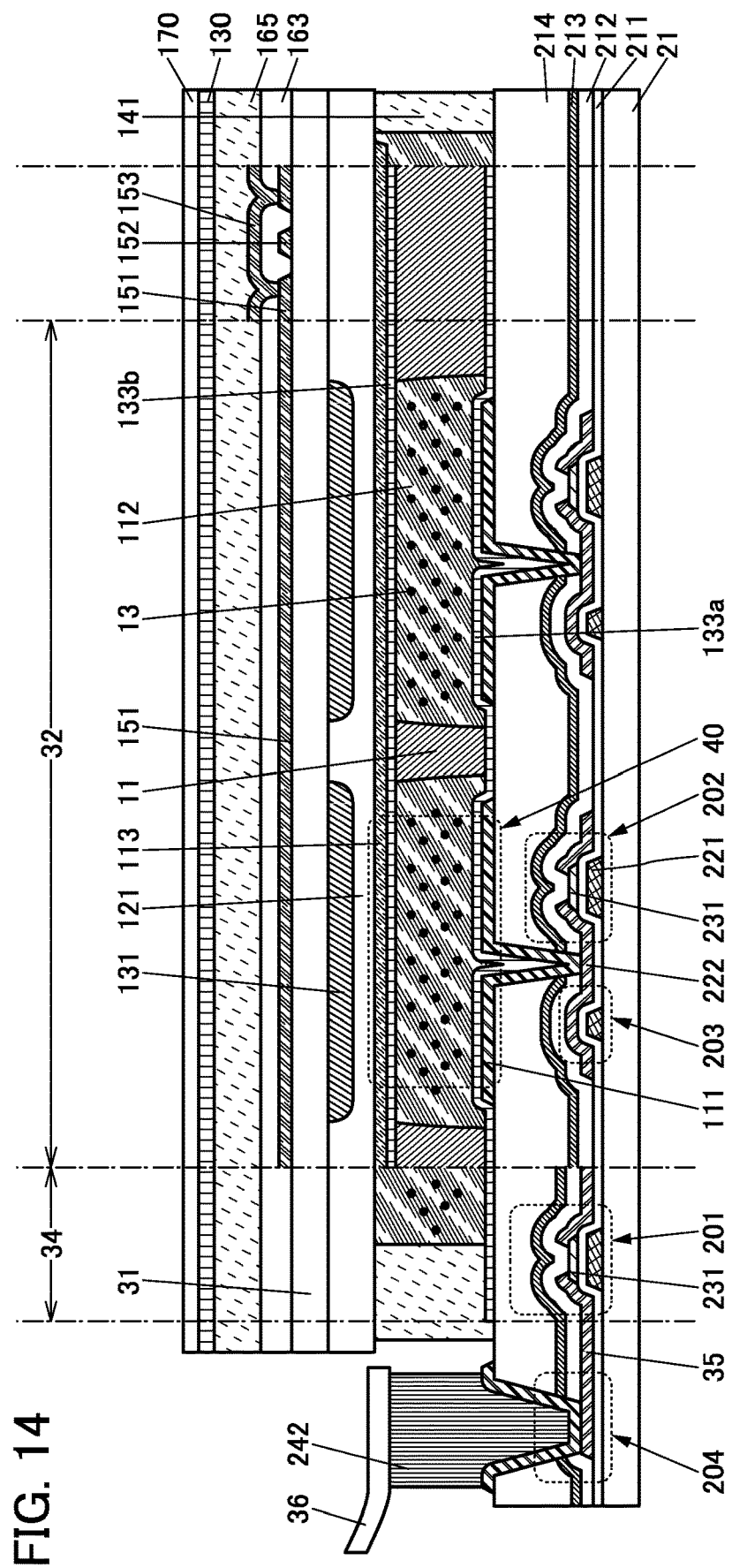
FIG. 14 illustrates a structure example of a display device of one embodiment.

FIG. 14 is a schematic cross-sectional view of a display device described below as an example.

FIG. 14 illustrates an example in which the conductive layers 151 and 152 and the like included in the touch sensor are formed on the surface of the substrate 31 that is opposite to the surface facing the substrate 21. This structure can be referred to as an on-cell touch panel.

The conductive layers 151 and 152 and the like are formed over the substrate 31 and covered with the insulating layer 163. The conductive layer 153 is provided over the insulating layer 163.

The conductive layers 151 and 152 each serve as a wiring included in a capacitive touch sensor.

FIG. 14 clearly shows an intersection of the conductive layers 151 and 152. Through openings in the insulating layer 163, the conductive layer 153 is electrically connected to the two conductive layers 151 between which the conductive layer 152 is positioned.

A substrate 170 is a substrate serving as a touch surface, and for example, serves as part of a housing, protective glass, or the like of an electronic device in which the display device is incorporated. In FIG. 14, the substrate 170 and a polarizing plate 130 are stacked, and the polarizing plate 130 and the substrate 31 are bonded with a bonding layer 165.

FIG. 14 illustrates an example in which the conductive layer 151 is provided in a region overlapping with the liquid crystal element 40, the coloring layer 131, and the like. In that case, the conductive layer 151 can be formed using a material transmitting visible light. A film containing a metal oxide, a film containing graphene, a film that contains a metal or an alloy and is thin enough to transmit visible light, or the like can be used for the conductive layer 151. The same applies to the conductive layer 152. The conductive layer 153 may also be formed using a material transmitting visible light; however, a material blocking visible light, such as a metal or an alloy, may also be used in the case where the area of the conductive layer 153 is extremely small.

The conductive layers 151 and 152 may be positioned such that they do not overlap with the liquid crystal element 40 in the display portion. In other words, the conductive layer 151 has a mesh shape with an opening overlapping with the liquid crystal element 40. In such a structure where the conductive layer 151 is not positioned on the path of light emitted from the outside and reflected by the liquid crystal element 40 to be emitted to the outside, the conductive layer 151 does not cause a decrease in luminance substantially; thus, a display device with high visibility and low power consumption can be fabricated. Note that the conductive layers 152 and 153 can each have a similar structure. In addition, not overlapping with the liquid crystal element 40, the conductive layers 151, 152, and 153 can be formed using a metal material with relatively low resistance. This increases the sensitivity of the touch sensor as compared with the case where a light-transmitting conductive material is used for the conductive layers 151, 152, and 153.

The above is the description of Cross-sectional structure example 3-2.

Structure Example 4

More specific cross-sectional structure examples of the display device shown in Structure example 2 that includes both a reflective liquid crystal element and a transmissive liquid crystal element and can display an image both in a transmissive mode and in a reflective mode will be described below.

Cross-Sectional Structure Example 4

Figure 15:
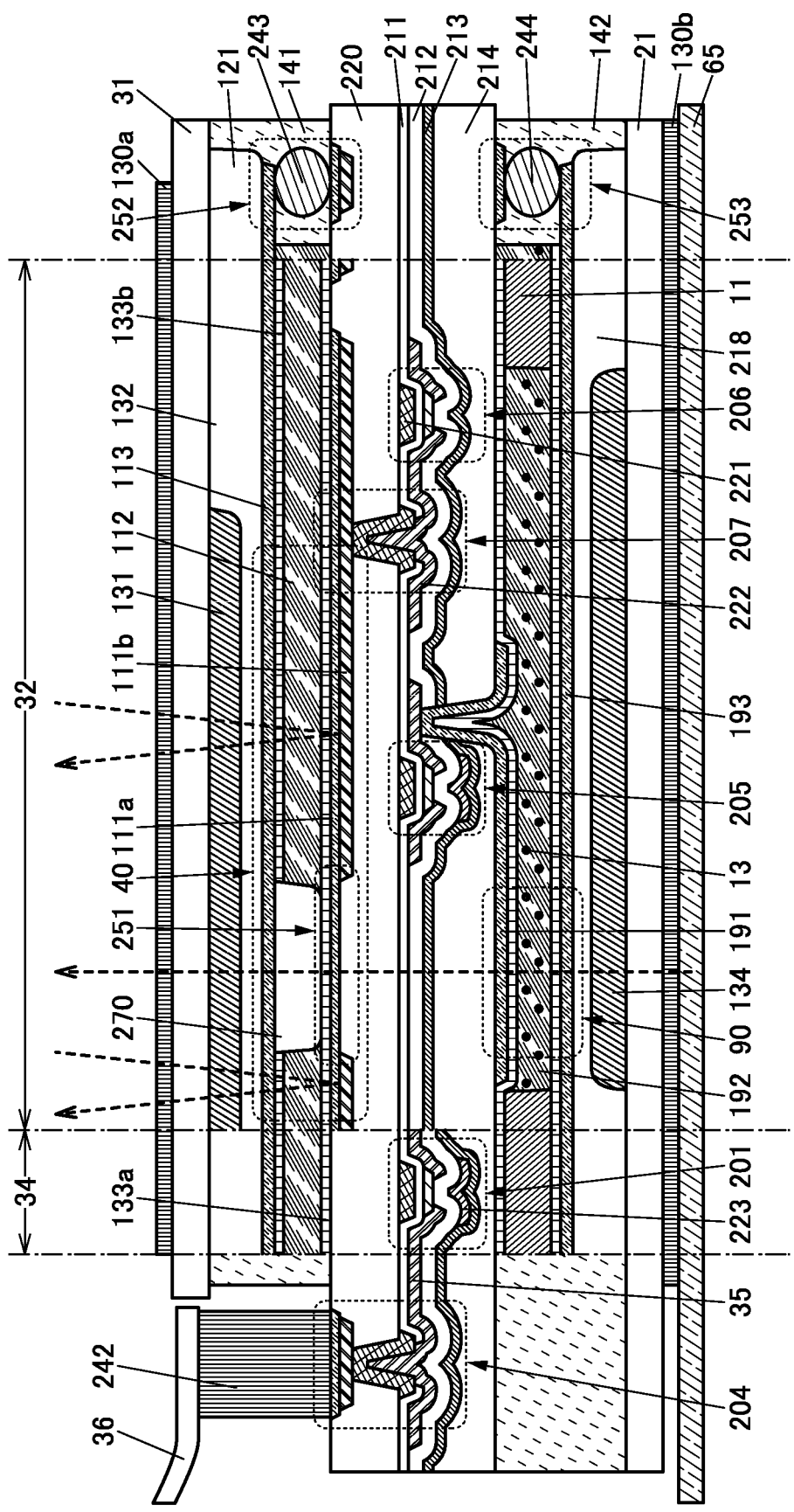
FIG. 15 illustrates a structure example of a display device of one embodiment.

FIG. 15 is a schematic cross-sectional view of a display device described below as an example. The display device illustrated in FIG. 15 corresponds to the display device illustrated in FIG. 8.

The display device includes an insulating layer 220 between the substrates 21 and 31. Furthermore, the display device includes the liquid crystal element 90, the transistor 205, the transistor 206, the coloring layer 134, the coloring layer 131, the partition 11, and the like between the insulating layer 220 and the substrate 21. Furthermore, the display device includes the liquid crystal element 40, the coloring layer 131, and the like between the insulating layer 220 and the substrate 31.

In addition, a polarizing plate 130a is provided on the outer side of the substrate 31. A polarizing plate 130b and the backlight unit 65 are provided on the outer side of the substrate 21.

The coloring layer 134 is provided on the surface of the substrate 21 that faces the substrate 31. An insulating layer 218 covers the coloring layer 134.

The liquid crystal element 40 is a reflective liquid crystal element. The liquid crystal element 40 has a stacked structure of a conductive layer 111a, the liquid crystal 112, and the conductive layer 113. A conductive layer 111b which reflects visible light is provided in contact with the surface of the conductive layer 111a that faces the substrate 21. The conductive layer 111b includes an opening 251. The conductive layers 111a and 113 contain a material transmitting visible light.

The liquid crystal element 90 is a transmissive liquid crystal element. The liquid crystal element 90 has a structure in which a conductive layer 191, liquid crystal 192, and a conductive layer 193 are stacked in this order from the insulating layer 220 side. Monomers 13 are dispersed in the liquid crystal 192. The conductive layers 191 and 193 each contain a material transmitting visible light. Light emitted from the backlight unit 65 is polarized by the polarizing plate 130b, colored through the coloring layer 134, and reaches the polarizing plate 130a through the liquid crystal element 90, the insulating layer 220, the opening 251, a structure body 270, and the like.

One of a source and a drain of the transistor 205 is electrically connected to the conductive layer 191.

One of a source and a drain of the transistor 206 is electrically connected to the conductive layer 111b through a connection portion 207. The conductive layers 111b and 111a are in contact with and electrically connected to each other. Here, in the connection portion 207, the conductive layers provided on both surfaces of the insulating layer 220 are connected to each other through openings in the insulating layer 220.

The connection portion 204 is provided in a region that does not overlap with the substrate 31. The connection portion 204 has a structure similar to that of the connection portion 207. On the top surface of the connection portion 204, a conductive layer obtained by processing the same conductive film as the conductive layer 111a is exposed. Thus, the connection portion 204 and the FPC 36 can be electrically connected to each other through the connection layer 242.

A connection portion 252 is provided in part of a region where the bonding layer 141 is provided. In the connection portion 252, the conductive layer obtained by processing the same conductive film as the conductive layer 111a is electrically connected to part of the conductive layer 113 with a connector 243. Accordingly, a signal or a potential input from the FPC 36 connected to the substrate 21 side can be supplied to the conductive layer 113 formed on the substrate 31 side through the connection portion 252.

A connection portion 253 is provided in part of a region where the adhesive layer 142 is provided. In the connection portion 253, the conductive layer obtained by processing the same conductive film as the conductive layer 191 is electrically connected to part of the conductive layer 193 with a connector 244.

The above is the description of Cross-sectional Structure Example 4.

[Transistor]

An example of a structure of a transistor that can be used in the display device will be described below.

Figure 16A:
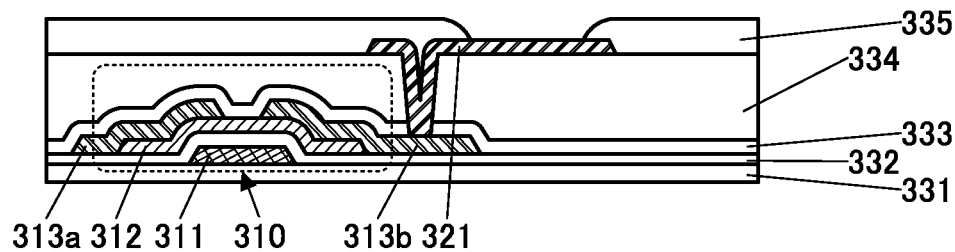
FIGS. 16A to 16D illustrate structure examples of a display device of one embodiment.

A transistor 310 illustrated in FIG. 16A is an example of a bottom-gate transistor.

The transistor 310 includes a conductive layer 311 serving as a gate electrode, part of an insulating layer 332 serving as a gate insulating layer, a semiconductor layer 312, a conductive layer 313a serving as one of a source electrode and a drain electrode, and a conductive layer 313b serving as the other of the source electrode and the drain electrode.

In FIG. 16A, the transistor 310 is provided over an insulating layer 331. An insulating layer 334 is provided to cover the transistor 310, and a conductive layer 321 is provided over the insulating layer 334. The conductive layer 321 is electrically connected to the conductive layer 313b through an opening formed in the insulating layer 334 and serves as a pixel electrode. In an example in FIG. 16A, an insulating layer 335 is provided to cover an end portion of the conductive layer 321.

In the transistor 310, the conductive layer 311 functioning as a gate electrode is located closer to the formation surface (the insulating layer 331 side) than the semiconductor layer 312. The insulating layer 332 is provided to cover the conductive layer 311. The semiconductor layer 312 is provided to cover the conductive layer 311. A region of the semiconductor layer 312 that overlaps with the conductive layer 311 corresponds to a channel formation region. The conductive layers 313a and 313b are provided in contact with the top surface and side end portions of the semiconductor layer 312.

Note that in the transistor 310 shown as an example, the width of the semiconductor layer 312 is wider than that of the conductive layer 311. In such a structure, the semiconductor layer 312 is located between the conductive layer 311 and each of the conductive layers 313a and 313b. Thus, the parasitic capacitance between the conductive layer 311 and each of the conductive layers 313a and 313b can be reduced.

The transistor 310 is a channel-etched transistor and can be favorably used for a high-resolution display device because the occupation area of the transistor can be reduced comparatively easily.

Figure 16B:
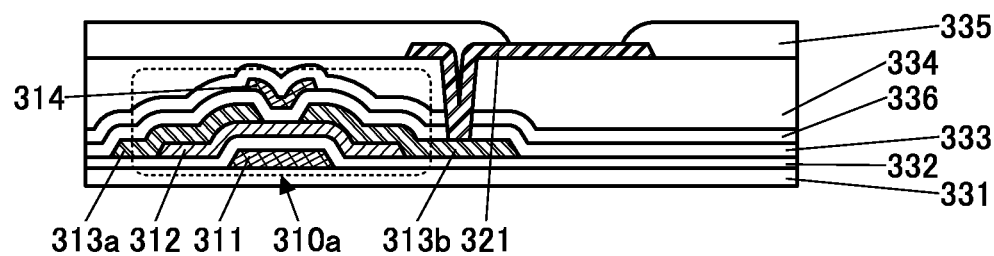

A transistor 310a illustrated in FIG. 16B is different from the transistor 310 in including a conductive layer 314 and an insulating layer 336. The conductive layer 314 is provided over an insulating layer 333 and includes a region overlapping with the semiconductor layer 312. The insulating layer 336 is provided to cover the conductive layer 314 and the insulating layer 333.

The conductive layer 314 is positioned to face the conductive layer 311 with the semiconductor layer 312 therebetween. In the case where the conductive layer 311 is used as a first gate electrode, the conductive layer 314 can serve as a second gate electrode. By supplying the same potential to the conductive layer 311 and the conductive layer 314, the on-state current of the transistor 310a can be increased. By supplying a potential for controlling the threshold voltage to one of the conductive layer 311 and the conductive layer 314 and a potential for driving to the other, the threshold voltage of the transistor 310a can be controlled.

A conductive material including an oxide is preferably used for the conductive layer 314. In that case, a conductive film to be the conductive layer 314 is formed in an atmosphere containing oxygen, whereby oxygen can be supplied to the insulating layer 333. The proportion of an oxygen gas in a film formation gas is preferably higher than or equal to 90% and lower than or equal to 100%. Oxygen supplied to the insulating layer 333 is then supplied to the semiconductor layer 312 by later heat treatment; as a result, oxygen vacancies in the semiconductor layer 312 can be reduced.

It is particularly preferable to use a low-resistance oxide semiconductor for the conductive layer 314. In that case, the insulating layer 336 is preferably formed using an insulating film that releases hydrogen, e.g., a silicon nitride film. Hydrogen is supplied to the conductive layer 314 during the formation of the insulating layer 336 or by heat treatment to be performed after that, whereby the electrical resistance of the conductive layer 314 can be reduced effectively.

Figure 16C:
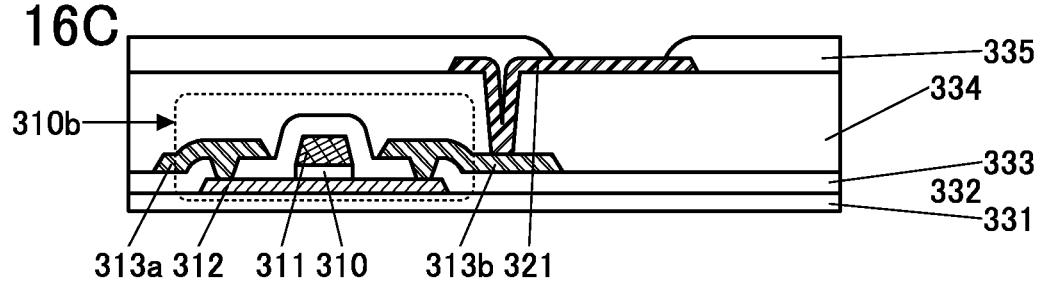

A transistor 310b illustrated in FIG. 16C is a top-gate transistor.

In the transistor 310b, the conductive layer 311 functioning as a gate electrode is provided over the semiconductor layer 312 (provided on the side opposite to the formation surface side). The semiconductor layer 312 is formed over the insulating layer 331. The insulating layer 332 and the conductive layer 311 are stacked over the semiconductor layer 312. The insulating layer 333 is provided to cover the top surface and the side end portions of the semiconductor layer 312, side surfaces of the insulating layer 332, and the conductive layer 311. The conductive layers 313a and 313b are provided over the insulating layer 333. The conductive layers 313a and 313b are electrically connected to the top surface of the semiconductor layer 312 through openings provided in the insulating layer 333.

Note that although the insulating layer 332 is not present in a portion that does not overlap with the conductive layer 311 in the example, the insulating layer 332 may be provided to cover the top surface and the side end portion of the semiconductor layer 312.

In the transistor 310b, the conductive layer 311 can be physically apart from each of the conductive layers 313a and 313b easily; thus, the parasitic capacitance between the conductive layer 311 and each of the conductive layers 313a and 313b can be reduced.

Figure 16D:
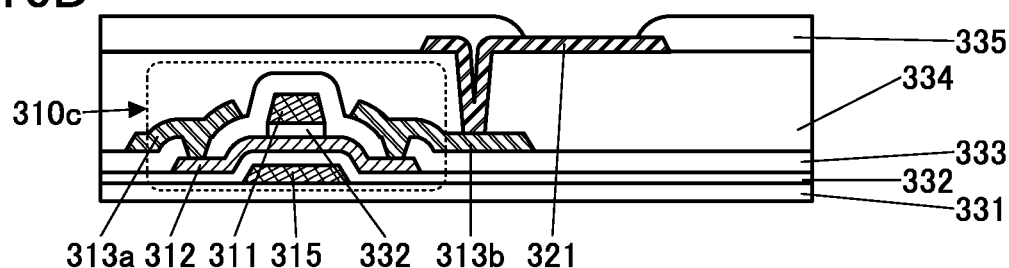

A transistor 310c illustrated in FIG. 16D is different from the transistor 310b in including a conductive layer 315 and an insulating layer 337. The conductive layer 315 is provided over the insulating layer 331 and includes a region overlapping with the semiconductor layer 312. The insulating layer 337 is provided to cover the conductive layer 315 and the insulating layer 331.

The conductive layer 315 serves as a second gate electrode like the conductive layer 314. Thus, the on-state current can be increased and the threshold voltage can be controlled, for example.

The above is the description of the transistor.

At least part of this embodiment can be implemented in combination with any of the other embodiments described in this specification as appropriate.

Embodiment 2

In this embodiment, as an example of the display device of one embodiment of the present invention, a display device (display panel) that includes both a reflective liquid crystal element and a transmissive liquid crystal element and can display an image in a transmissive mode, in a reflective mode, and in a hybrid mode in which both of these modes are employed simultaneously will be described below. Such a display panel can also be referred to as a transmission and reflection hybrid display (transmission/reflection hybrid display or TR-hybrid display).

One example of such a display device is a structure in which a reflective liquid crystal element including an electrode that reflects visible light a transmissive liquid crystal element including an electrode that transmits visible light are stacked together. In this structure, it is preferable that the electrode reflecting visible light have an opening and the opening overlap with the transmissive element. This enables driving in the transmissive mode by which light is emitted from the transmissive liquid crystal element through the opening. Furthermore, in a plan view, as compared with the case where the reflective liquid crystal element and the transmissive liquid crystal element are arranged side by side, in the case where the transmissive liquid crystal element and the reflective liquid crystal element are stacked together, the size of a pixel including both the liquid crystal element and the light-emitting element can be reduced; thus, a higher-definition display device can be fabricated.

It is also preferable that a transistor for driving the transmissive liquid crystal element and a transistor included in the reflective liquid crystal element be separately provided. Thus, the transmissive liquid crystal element and the reflective liquid crystal element can be individually driven.

Here, it is preferable that a pixel circuit for driving the liquid crystal element include a transistor using an oxide semiconductor and thus having an extremely low off-state current. Alternatively, a charge memory element may be applied to the pixel circuit. This allows the gray level to be maintained even when writing operation to a pixel is stopped while a still image is displayed using the liquid crystal element. That is, display can be maintained even when the frame rate is set to an extremely small value. Thus, display with extremely low power consumption can be performed.

In one embodiment of the present invention, switching between a first mode in which an image is displayed by the reflective element, a second mode in which an image is displayed by the transmissive element, and a third mode in which an image is displayed by the reflective element and the transmissive element can be performed. The third mode can be referred to as a hybrid mode.

[Specific Example of First to Third Modes]

Here, a specific example of the case where the above-described first to third modes are employed is described with reference to FIGS. 17A to 17D and FIGS. 18A to 18C.

Note that the case where the first to third modes are switched automatically and depending on the illuminance is described below. In the case where the modes are switched automatically depending on the illuminance, an illuminance sensor or the like is provided in the display device and the display mode can be switched in response to data from the illuminance sensor, for example.

Figure 17A:
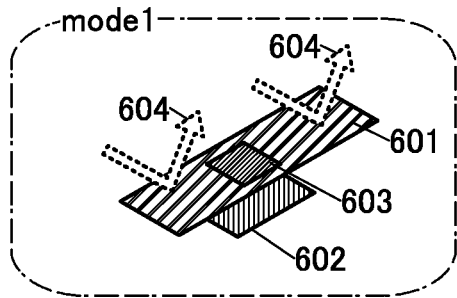
FIGS. 17A to 17D are schematic diagrams and a state transition diagram of a display device of one embodiment.
Figure 17B:
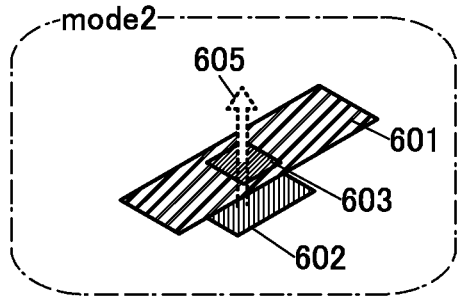
Figure 17C:
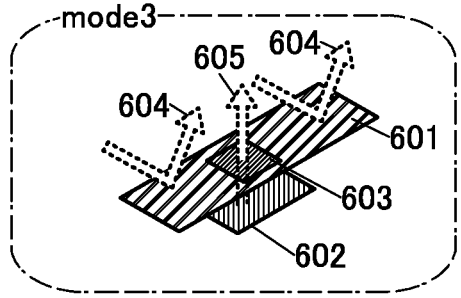

FIGS. 17A to 17C are schematic diagrams of a pixel for describing display modes that are possible for the display device in this embodiment.

In FIGS. 17A to 17C, a first display element 601, a second display element 602, an opening 603, reflected light 604 that is reflected by the first display element 601, and transmitted light 605 emitted from the second display element 602 through the opening 603 are illustrated. Note that FIG. 17A, FIG. 17B, and FIG. 17C are diagrams illustrating a first mode (mode 1), a second mode (mode 2), and a third mode (mode 3), respectively.

FIGS. 17A to 17C illustrate the case where a reflective liquid crystal element is used as the first display element 601 and a transmissive liquid crystal element is used as the second display element 602.

In the first mode illustrated in FIG. 17A, gray scale display can be performed by driving the reflective liquid crystal element that is the first display element 601 to adjust the intensity of reflected light. For example, as illustrated in FIG. 17A, the intensity of the reflected light 604 reflected by the reflective electrode in the reflective liquid crystal element that is the first display element 601 is adjusted with the liquid crystal layer. In this manner, gray scale can be expressed.

In the second mode illustrated in FIG. 17B, gray scale can be expressed by adjusting the intensity of light transmitted through the transmissive liquid crystal element that is the second display element 602. Note that light transmitted through the second display element 602 passes through the opening 603 and is extracted to the outside as the transmitted light 605.

The third mode illustrated in FIG. 17C is a display mode in which the first mode and the second mode which are described above are combined. For example, gray scale is expressed in such a manner that the intensity of the reflected light 604 reflected by the reflective electrode in the reflective liquid crystal element that is the first display element 601 is adjusted with the liquid crystal layer. In a period during which the first display element 601 is driven, gray scale is expressed by adjusting the intensity of light transmitted through the transmissive liquid crystal element that is the second display element 602, i.e., the intensity of the transmitted light 605.

[State Transition of First to Third Modes]

Figure 17D:
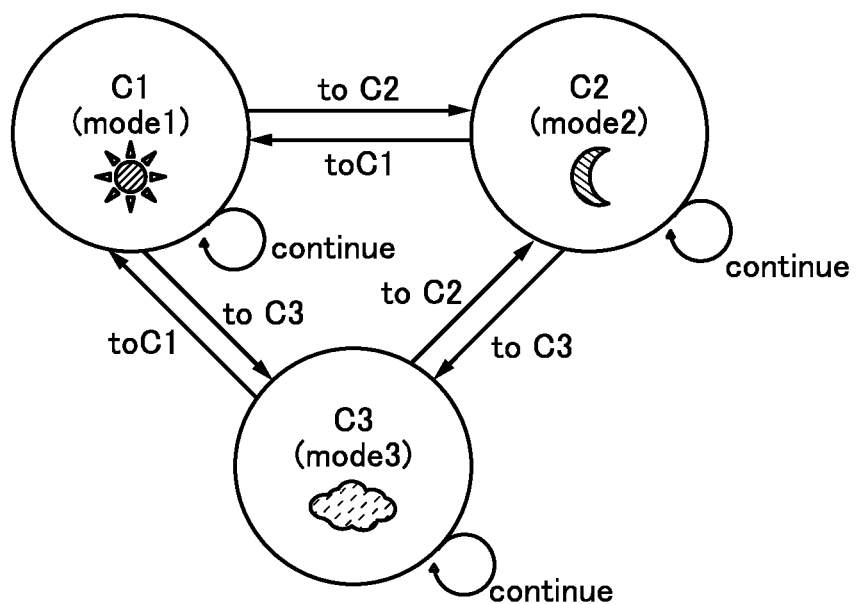

Next, a state transition of the first to third modes is described with reference to FIG. 17D. FIG. 17D is a state transition diagram of the first mode, the second mode, and the third mode. In FIG. 17D, a state C1, a state C2, and a state C3 correspond to the first mode, the second mode, and the third mode, respectively.

As shown in FIG. 17D, any of the display modes can be selected with illuminance in the states C1 to C3. For example, under a high illuminance such as in outdoor environments, the state can be brought into the state C1. In the case where the illuminance decreases as from outdoors to indoors, the state C1 transitions to the state C2. In the case where the illuminance is low even outdoors and gray scale display with reflected light is not sufficient, the state C2 transitions to the state C3. Needless to say, transition from the state C3 to the state C1, transition from the state C1 to the state C3, transition from the state C3 to the state C2, or transition from the state C2 to the state C1 also occurs.

In FIG. 17D, symbols of the sun, the moon, and a cloud are illustrated as images representing the first mode, the second mode, and the third mode, respectively.

As illustrated in FIG. 17D, in the case where the illuminance does not change or slightly changes in the states C1 to C3, the present state may be maintained without transitioning to another state.

The above configuration of switching the display mode with illuminance contributes to a reduction in the frequency of gray scale display with the intensity of light emitted from a transmissive liquid crystal element, which requires the backlight or the like having relatively high power consumption. Accordingly, the power consumption of the display device can be reduced. In the display device, the operation mode can be further switched in accordance with the amount of remaining battery power, the contents to be displayed, the illuminance of the surrounding environment. Although the case where the display mode is automatically switched with illuminance is described above as an example, one embodiment of the present invention is not limited thereto, and a user may switch the display mode manually.

[Operation Mode]

Next, an operation mode which can be employed in the first display element is described with reference to FIGS. 18A to 18C.

A normal driving mode (Normal mode) with a normal frame frequency (typically, higher than or equal to 30 Hz and lower than or equal to 240 Hz, or higher than or equal to 60 Hz and lower than or equal to 240 Hz) and an idling stop (IDS) driving mode with a low frame frequency will be described below.

Note that the idling stop (IDS) driving mode refers to a method in which after image data is written, rewriting of image data is stopped. This increases the interval between writing of image data and subsequent writing of image data, thereby reducing the power that would be consumed by writing of image data in that interval. The idling stop (IDS) driving mode can be performed at a frame frequency which is 1/100 to 1/10 of the normal driving mode, for example.

Figure 18A:
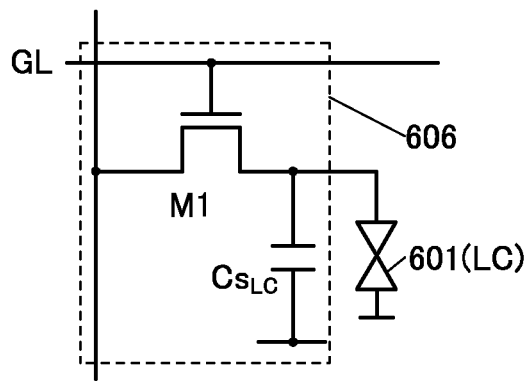
FIGS. 18A to 18C are a circuit diagram and timing charts of one embodiment.
Figure 18B:
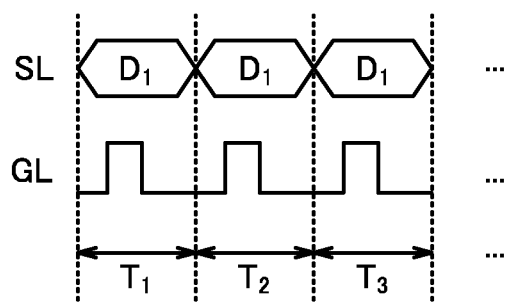
Figure 18C:

FIGS. 18A to 18C are a circuit diagram and timing charts illustrating the normal driving mode and the idling stop (IDS) driving mode. Note that in FIG. 18A, the first display element 601 (here, a reflective liquid crystal element) and a pixel circuit 606 electrically connected to the first display element 601 are illustrated. In the pixel circuit 606 illustrated in FIG. 18A, a signal line SL, a gate line GL, a transistor M1 connected to the signal line SL and the gate line GL, and a capacitor CsLc connected to the transistor M1 are illustrated.

A transistor including a metal oxide in a semiconductor layer is preferably used as the transistor M1. A metal oxide having semiconductor characteristics can be referred to as a metal oxide semiconductor or an oxide semiconductor (abbreviated to an OS). As a typical example of a transistor, a transistor including an oxide semiconductor (OS transistor) is described. The OS transistor has an extremely low leakage current in a non-conduction state (off-state current), so that charge can be retained in a pixel electrode of a liquid crystal element when the OS transistor is turned off.

In the circuit diagram illustrated in FIG. 18A, a liquid crystal element LC becomes a leakage path of data $D_1$. Therefore, to perform idling stop driving appropriately, the resistivity of the liquid crystal element LC is preferably higher than or equal to $1.0 \times 10^{14}$ Ω·cm.

Note that for example, an In—Ga—Zn oxide or an In—Zn oxide is preferably used for a channel region of the above OS transistor. The In—Ga—Zn oxide can typically have an atomic ratio of In:Ga:Zn=1:1:1 or a neighborhood thereof, or an atomic ratio of In:Ga:Zn=4:2:3 or a neighborhood thereof.

FIG. 18B is a timing chart showing waveforms of signals supplied to the signal line SL and the gate line GL in the normal driving mode. In the normal driving mode, a normal frame frequency (e.g., 60 Hz) is used for operation. In the case where one frame period is divided into periods $T_1$ to $T_3$, a scanning signal is supplied to the gate line GL in each frame period and data $D_1$ is written from the signal line SL. This operation is performed both to write the same data $D_1$ in the periods $T_1$ to $T_3$ and to write different data in the periods $T_1$ to $T_3$.

In contrast, FIG. 18C is a timing chart showing waveforms of signals supplied to the signal line SL and the gate line GL in the idling stop (IDS) driving mode. In the idling stop (IDS) driving, a low frame frequency (e.g., 1 Hz) is used for operation. One frame period is denoted by a period $T_1$ and includes a data writing period $T_W$ and a data retention period $T_{RET}$. In the idling stop (IDS) driving mode, a scanning signal is supplied to the gate line GL and the data $D_1$ of the signal line SL is written in the period $T_W$, the gate line GL is fixed to a low-level voltage in the period $T_{RET}$, and the transistor M1 is turned off so that the written data $D_1$ is retained. Note that the low frame frequency may be higher than or equal to 0.1 Hz and lower than 60 Hz, for example.

The idling stop (IDS) driving mode is effective in combination with the aforementioned first mode or third mode, in which case power consumption can be further reduced.

As described above, the display device of this embodiment can display an image by switching between the first to third modes. Thus, an all-weather display device or a highly convenient display device with high visibility regardless of the ambient brightness can be fabricated.

The display device of this embodiment preferably includes a plurality of first pixels including first display elements and a plurality of second pixels including second display elements. The first pixels and the second pixels are preferably arranged in matrices.

Each of the first pixels and the second pixels can include one or more sub-pixels. The first pixel can include, for example, one sub-pixel (e.g., a white (W) sub-pixel), three sub-pixels (e.g., cyan (C), magenta (M), and yellow (Y) sub-pixels), or four sub-pixels (e.g., cyan (C), magenta (M), yellow (Y), and white (W) sub-pixels or cyan (C), magenta (M), yellow (Y), and green (G) sub-pixels). The second pixel can include, for example, one sub-pixel (e.g., a white (W) sub-pixel), three sub-pixels (e.g., red (R), green (G), and blue (B) sub-pixels), or four sub-pixels (e.g., red (R), green (G), blue (B), and white (W) sub-pixels, or red (R), green (G), blue (B), and yellow (Y) sub-pixels). Note that color elements included in the first and second pixels are not limited to the above, and may be combined with another color as necessary.

The display device of this embodiment can be configured to display a color image using either the first pixels or the second pixels.

<Schematic Perspective View of Display Device>

Figure 19:
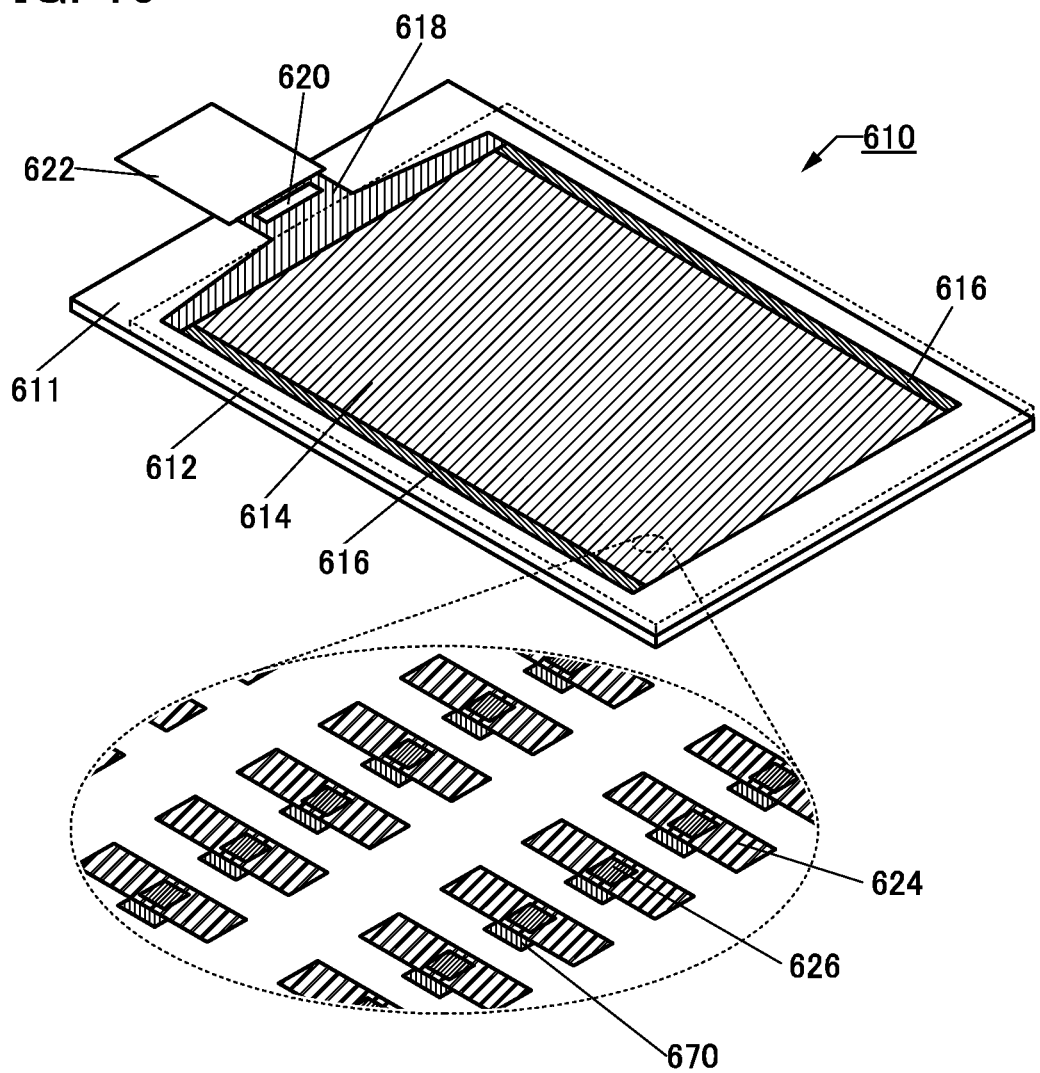
FIG. 19 illustrates a structure example of a display device of one embodiment.

Next, a display device of this embodiment is described with reference to FIG. 19. FIG. 19 is a schematic perspective view of a display device 610.

In the display device 610, a substrate 611 and a substrate 612 are attached to each other. In FIG. 19, the substrate 612 is denoted by a dashed line.

The display device 610 includes a display portion 614, a circuit 616, a wiring 618, and the like. FIG. 19 illustrates an example in which the display device 610 is provided with an IC 620 and an FPC 622. Thus, the structure illustrated in FIG. 19 can be referred to as a display module including the display device 610, the IC 620, and the FPC 622.

As the circuit 616, for example, a scan line driver circuit can be used.

The wiring 618 has a function of supplying a signal and power to the display portion 614 and the circuit 616. The signal and power are input to the wiring 618 from the outside through the FPC 622 or from the IC 620.

FIG. 19 illustrates an example in which the IC 620 is provided over the substrate 611 by a chip on glass (COG) method, a chip on film (COF) method, or the like. An IC including a scan line driver circuit, a signal line driver circuit, or the like can be used as the IC 620, for example. Note that the display device 610 is not necessarily provided with the IC 620. Furthermore, the IC 620 may be provided over the FPC by a COF method or the like.

FIG. 19 illustrates an enlarged view of part of the display portion 614. Electrodes 624 included in a plurality of display elements are arranged in a matrix in the display portion 614. The electrode 624 has a function of reflecting visible light, and serves as a reflective electrode of a liquid crystal element 650.

Furthermore, as illustrated in FIG. 19, the electrode 624 includes an opening 626. In addition, the display portion 614 includes a transmissive liquid crystal element 670 that is positioned closer to the substrate 611 than the electrode 624 is. Light from the liquid crystal element 670 is emitted to the substrate 612 side through the opening 626 in the electrode 624. The area of a light-transmitting region in the liquid crystal element 670 may be equal to that of the opening 626. One of the area of the light-transmitting region in the liquid crystal element 670 and the area of the opening 626 is preferably larger than the other because a margin for misalignment can be increased.

Structure Example

Figure 20A:
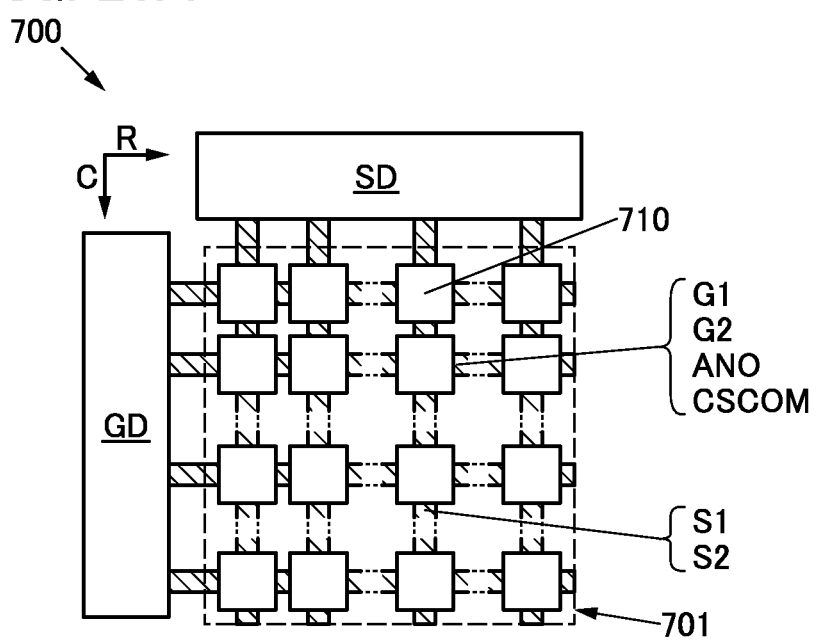
Figure 20A:
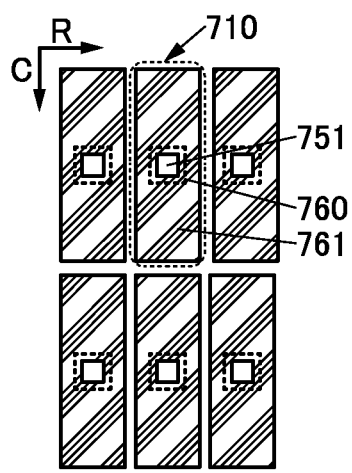
Figure 20A:
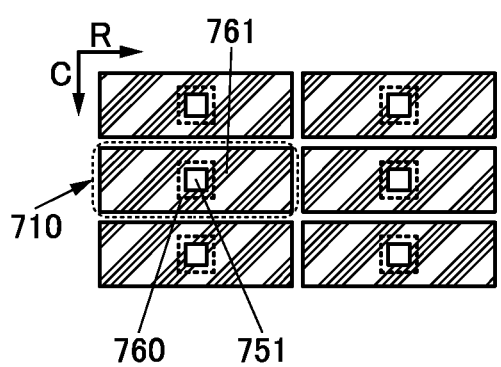

FIG. 20A is a block diagram illustrating an example of the structure of a display device 400. The display device 400 includes a plurality of pixels 710 that are arranged in a matrix in a display portion 701. The display device 400 also includes a circuit GD and a circuit SD. In addition, the display device 400 includes a plurality of wirings G1, a plurality of wirings G2, a plurality of wirings ANO, and a plurality of wirings CSCOM, which are electrically connected to the circuit GD and the plurality of pixels 710 arranged in a direction R. Moreover, the display device 400 includes a plurality of wirings S1 and a plurality of wirings S2, which are electrically connected to the circuit SD and the plurality of pixels 710 arranged in a direction C.

Although the configuration including one circuit GD and one circuit SD is illustrated here for simplicity, the circuit GD and the circuit SD for driving the reflective liquid crystal element and those for driving the transmissive liquid crystal element may be provided separately.

The pixel 710 includes a reflective liquid crystal element and a transmissive liquid crystal element.

FIG. 20B1 illustrates a structure example of a conductive layer 761 included in the pixel 710. The conductive layer 761 serves as a reflective electrode of the reflective liquid crystal element in the pixel 710. The conductive layer 761 includes an opening 751.

In FIG. 20B1, a light-emitting element 760 in a region overlapping with the conductive layer 761 is shown by a dashed line. The transmissive light-emitting element 760 overlaps with the opening 751 included in the conductive layer 761. Thus, light from the transmissive light-emitting element 760 is emitted to the display surface side through the opening 751.

In FIG. 20B1, the pixels 710 adjacent in the direction R correspond to different emission colors.

Alternatively, arrangement illustrated in FIG. 20B2 may be employed.

If the ratio of the total area of the opening 751 to the total area except for the opening is too large, display performed using the reflective liquid crystal element is dark. If the ratio of the total area of the opening 751 to the total area except for the opening is too small, display performed using the transmissive liquid crystal element 760 is dark.

If the area of the opening 751 in the electrode 761 serving as a reflective electrode is too small, light emitted from the transmissive liquid crystal element 760 is not efficiently extracted.

The opening 751 may have a polygonal shape, a quadrangular shape, an elliptical shape, a circular shape, a cross-like shape, a stripe shape, a slit-like shape, or a checkered pattern, for example. The opening 751 may be close to the adjacent pixel.

Circuit Configuration Example

Figure 21:
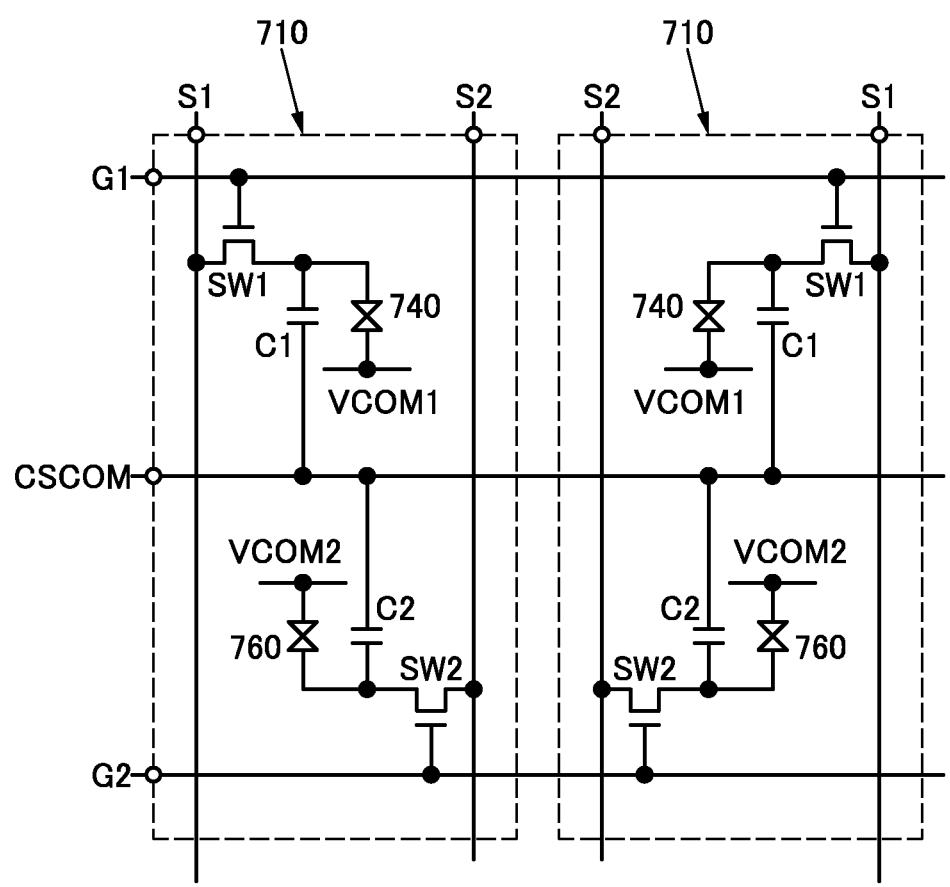
FIG. 21 is a circuit diagram of a display device of one embodiment.

FIG. 21 is a circuit diagram illustrating a configuration example of the pixel 710. FIG. 21 shows two adjacent pixels 710.

The pixel 710 includes a switch SW1, a capacitor C1, a liquid crystal element 740, a switch SW2, a transistor M, a capacitor C2, the light-emitting element 760, and the like. The pixel 710 is electrically connected to the wiring G1, the wiring G2, the wiring CSCOM, the wiring S1, and the wiring S2. FIG. 21 also illustrates a wiring VCOM1 electrically connected to the liquid crystal element 740 and a wiring VCOM2 electrically connected to the liquid crystal element 760.

FIG. 21 illustrates an example in which a transistor is used as each of the switches SW1 and SW2.

A gate of the switch SW1 is connected to the wiring G1. One of a source and a drain of the switch SW1 is connected to the wiring S1, and the other of the source and the drain is connected to one electrode of the capacitor C1 and one electrode of the liquid crystal element 740. The other electrode of the capacitor C1 is connected to the wiring CSCOM. The other electrode of the liquid crystal element 740 is connected to the wiring VCOM1.

A gate of the switch SW2 is connected to the wiring G2. One of a source and a drain of the switch SW2 is connected to the wiring S2, and the other of the source and the drain is connected to one electrode of the capacitor C2 and one electrode of the liquid crystal element 760. The other electrode of the capacitor C2 is connected to the wiring CSCOM. The other electrode of the light-emitting element 760 is connected to the wiring VCOM2.

The wiring G1 can be supplied with a signal for changing the on/off state of the switch SW1. A predetermined potential can be supplied to the wiring VCOM1. The wiring S1 can be supplied with a signal for changing the orientation of liquid crystal of the liquid crystal element 740. A predetermined potential can be supplied to the wiring CSCOM.

The wiring G2 can be supplied with a signal for changing the on/off state of the switch SW2. A predetermined potential can be supplied to the wiring VCOM2. The wiring S2 can be supplied with a signal for controlling the orientation of liquid crystals of the liquid crystal element 760.

In the pixel 710 of FIG. 21, for example, an image can be displayed in the reflective mode by driving the pixel with the signals supplied to the wiring G1 and the wiring S1 and utilizing the optical modulation of the liquid crystal element 740. In the case where an image is displayed in the transmissive mode, the pixel is driven with the signals supplied to the wiring G2 and the wiring S2 and utilizing the optical modulation of the liquid crystal element 760. In the case where both modes are performed at the same time, the pixel can be driven with the signals supplied to the wiring G1, the wiring G2, the wiring S1, and the wiring S2.

Note that FIG. 21 illustrates an example in which one pixel 710 includes one liquid crystal element 740 and one light-emitting element 760. Here, the pixel 710 functions as a subpixel. When the liquid crystal element 760 is driven by a time gray scale method, full-color display can be performed in the transmissive mode or both of the modes using one pixel 710.

Figure 22:
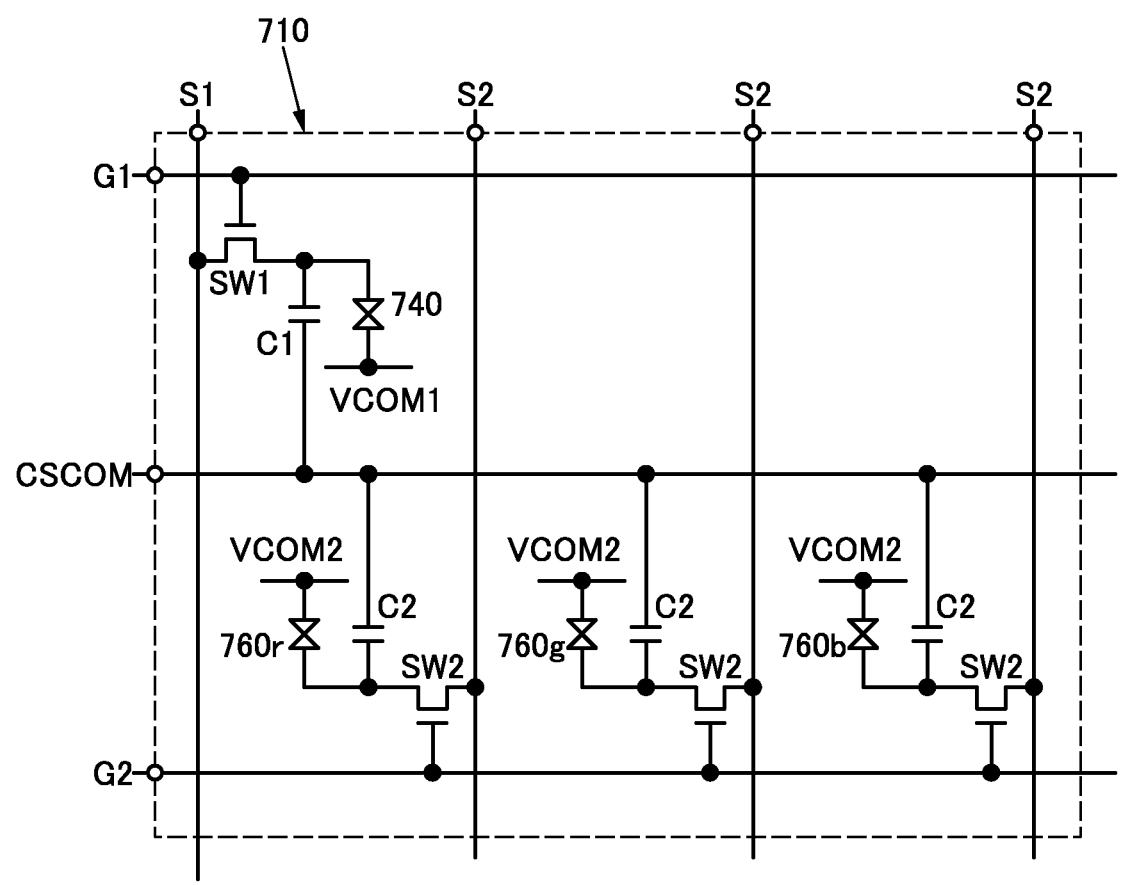
FIG. 22 is a circuit diagram of a display device of one embodiment.

FIG. 22 shows an example in which one pixel 710 includes one reflective liquid crystal element 740 and three transmissive liquid crystal elements (a liquid crystal element 760r, a liquid crystal element 760g, and a liquid crystal element 760b). The liquid crystal element 760r, the liquid crystal element 760g, and the liquid crystal element 760b, which are transmissive liquid crystal elements, transmit red light (R), green light (G), and blue light (B), respectively. The pixel 710 shown in FIG. 22 can perform full-color display in the transmissive mode or both of the modes using the three transmissive liquid crystal elements.

At least part of this embodiment can be implemented in combination with any of the other embodiments described in this specification as appropriate.

Embodiment 3

In this embodiment, a display module that can be manufactured using one embodiment of the present invention is described.

Figure 23A:
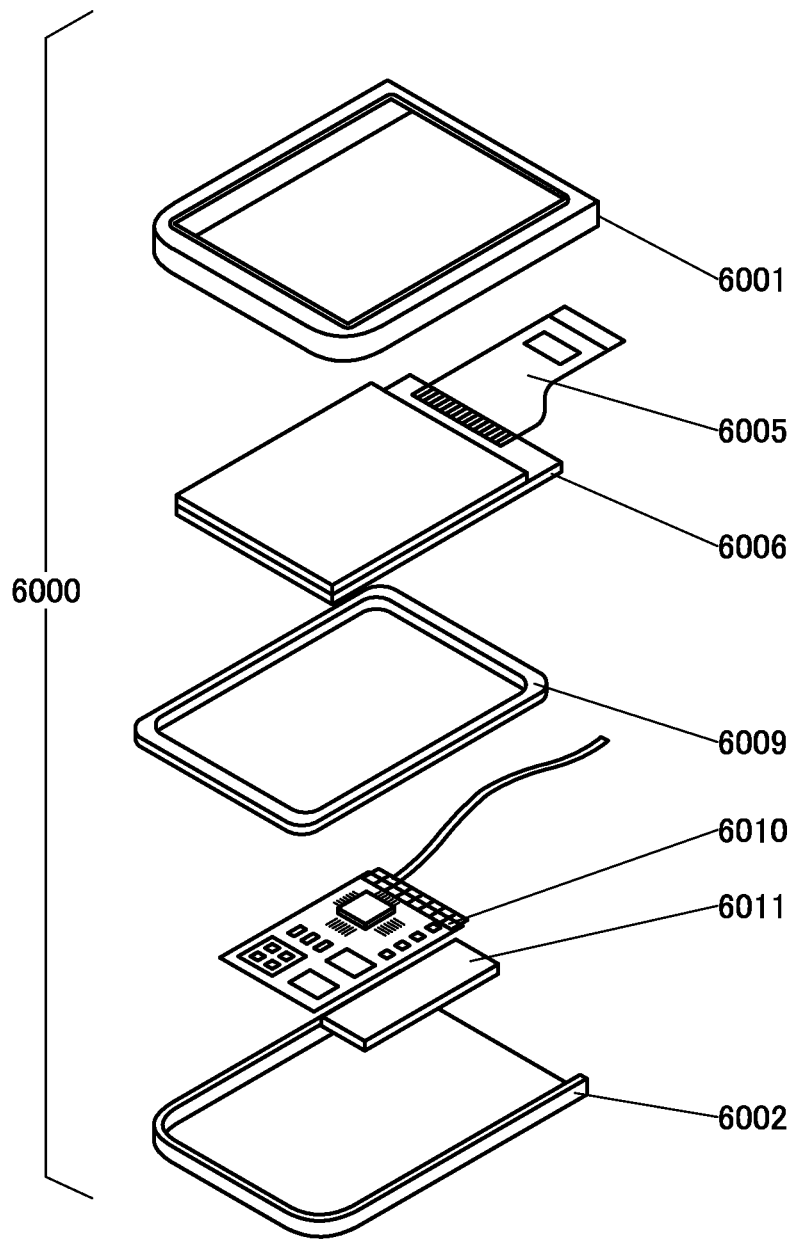
FIGS. 23A and 23B illustrate structure examples of a display module of one embodiment.

In a display module 6000 illustrated in FIG. 23A, a display panel 6006 connected to an FPC 6005, a frame 6009, a printed circuit board 6010, and a battery 6011 are provided between an upper cover 6001 and a lower cover 6002.

For example, the above-described display device manufactured using one embodiment of the present invention can be used for the display panel 6006. Thus, a display module having high visibility can be achieved regardless of the intensity of external light.

The shapes and sizes of the upper cover 6001 and the lower cover 6002 can be changed as appropriate in accordance with the sizes of the display panel 6006.

A touch panel may be provided so as to overlap with the display panel 6006. The touch panel can be a resistive touch panel or a capacitive touch panel and may be formed to overlap with the display panel 6006. Instead of providing the touch panel, the display panel 6006 can have a touch panel function.

The frame 6009 protects the display panel 6006 and also serves as an electromagnetic shield for blocking electromagnetic waves generated by the operation of the printed circuit board 6010. The frame 6009 may serve as a radiator plate.

The printed circuit board 6010 has a power supply circuit and a signal processing circuit for outputting a video signal and a clock signal. As a power source for supplying power to the power supply circuit, an external commercial power source or the battery 6011 provided separately may be used. The battery 6011 can be omitted in the case of using a commercial power source.

The display module 6000 can be additionally provided with a member such as a polarizing plate, a retardation plate, or a prism sheet.

Figure 23B:
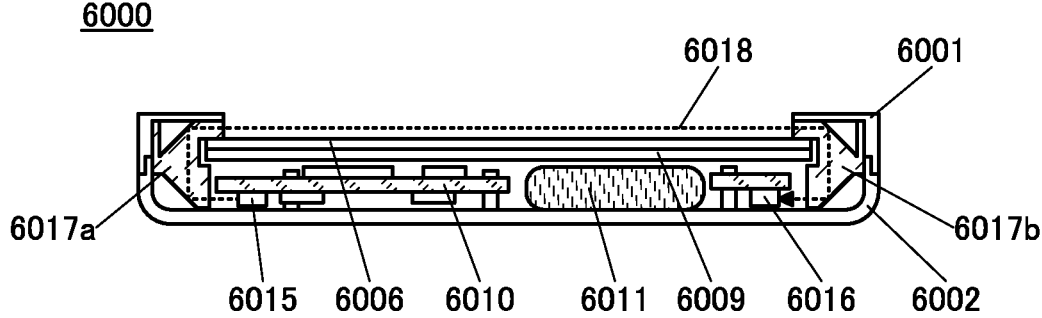

FIG. 23B is a cross-sectional schematic view of the display module 6000 including an optical touch sensor.

The display module 6000 includes a light-emitting portion 6015 and a light-receiving portion 6016 provided on the printed circuit board 6010. A pair of light guide portions (a light guide portion 6017a and a light guide portion 6017b) is provided in a region surrounded by the upper cover 6001 and the lower cover 6002.

A plastic can be used for the upper cover 6001 and the lower cover 6002, for example. The upper cover 6001 and the lower cover 6002 can each be thin (e.g., more than or equal to 0.5 mm and less than or equal to 5 mm). In that case, the display module 6000 can be significantly lightweight. In addition, the upper cover 6001 and the lower cover 6002 can be manufactured with a small amount of material, and therefore, manufacturing cost can be reduced.

The display panel 6006 overlaps with the printed circuit board 6010 and the battery 6011 with the frame 6009 located therebetween. The display panel 6006 and the frame 6009 are fixed to the light guide portion 6017a and the light guide portion 6017b.

Light 6018 emitted from the light-emitting portion 6015 travels over the display panel 6006 through the light guide portion 6017a and reaches the light-receiving portion 6016 through the light guide portion 6017b. For example, blocking of the light 6018 by a sensing target such as a finger or a stylus can be detected as touch operation.

A plurality of light-emitting portions 6015 are provided along two adjacent sides of the display panel 6006, for example. A plurality of light-receiving portions 6016 and a plurality of light-emitting portions 6015 are provided at both ends of the display panel 6006. Accordingly, information about the position of touch operation can be obtained.

As the light-emitting portion 6015, a light source such as an LED element can be used. It is particularly preferable to use a light source that emits infrared light, which is not visually recognized by users and is harmless to users, as the light-emitting portion 6015.

As the light-receiving portion 6016, a photoelectric element that receives light emitted by the light-emitting portion 6015 and converts it into an electrical signal can be used. A photodiode that can receive infrared light can be suitably used.

For the light guide portions 6017a and 6017b, members that transmit at least the light 6018 can be used. With the use of the light guide portions 6017a and 6017b, the light-emitting portion 6015 and the light-receiving portion 6016 can be placed under the display panel 6006, and a malfunction of the touch sensor due to external light reaching the light-receiving portion 6016 can be suppressed. It is particularly preferable to use a resin that absorbs visible light and transmits infrared light. This is more effective in suppressing the malfunction of the touch sensor.

At least part of this embodiment can be implemented in combination with any of the other embodiments described in this specification as appropriate.

Embodiment 4

In this embodiment, electronic devices to which the display device of one embodiment of the present invention can be applied are described.

The display device of one embodiment of the present invention can achieve high visibility regardless of the intensity of external light. For this reason, the display device can be suitably used for portable electronic devices, wearable electronic devices (wearable devices), e-book readers, television devices, digital signage, and the like.

Figure 24A:
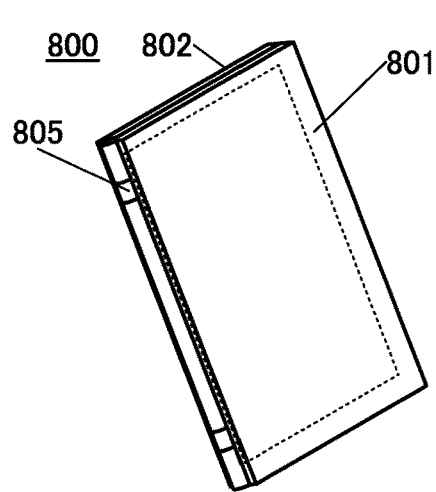
FIGS. 24A to 24D illustrate structure examples of an electronic device of one embodiment.
Figure 24B:
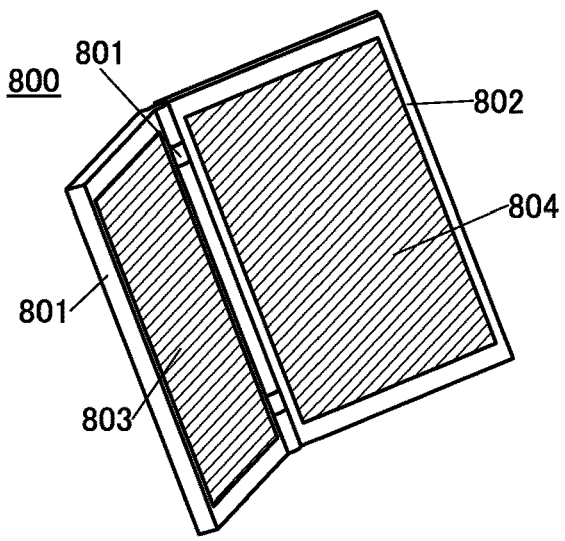

FIGS. 24A and 24B illustrate an example of a portable information terminal 800. The portable information terminal 800 includes a housing 801, a housing 802, a display portion 803, a display portion 804, and a hinge 805, for example.

The housing 801 and the housing 802 are joined together with the hinge 805. The portable information terminal 800 folded as illustrated in FIG. 24A can be changed into the state illustrated in FIG. 24B, in which the housing 801 and the housing 802 are opened.

For example, text information can be displayed on the display portions 803 and 804; thus, the portable information terminal can be used as an e-book reader. Furthermore, still images and moving images can be displayed on the display portions 803 and 804.

The portable information terminal 800 can be folded when being carried, and thus has general versatility.

Note that the housings 801 and 802 may have a power button, an operation button, an external connection port, a speaker, a microphone, and the like.

Figure 24C:
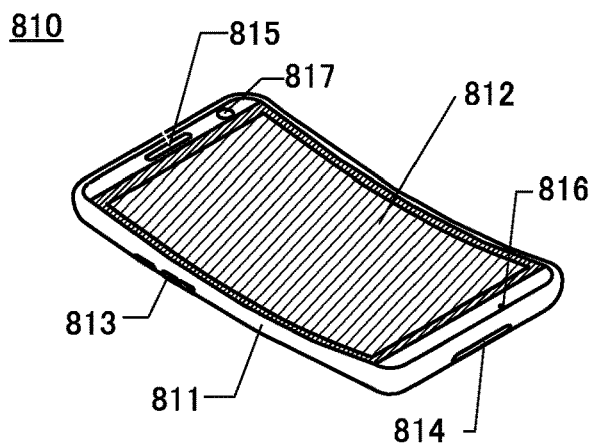

FIG. 24C illustrates an example of a portable information terminal. A portable information terminal 810 illustrated in FIG. 24C includes a housing 811, a display portion 812, operation buttons 813, an external connection port 814, a speaker 815, a microphone 816, a camera 817, and the like.

The display portion 812 is provided with the display device of one embodiment of the present invention.

The portable information terminal 810 includes a touch sensor in the display portion 812. Operations such as making a call and inputting a letter can be performed by a touch on the display portion 812 with a finger, a stylus, or the like.

With the operation buttons 813, power on/off can be switched and types of images displayed on the display portion 812 can be switched. For example, images can be switched from a mail creation screen to a main menu screen.

When a detection device such as a gyroscope sensor or an acceleration sensor is provided inside the portable information terminal 810, the direction of display on the screen of the display portion 812 can be automatically changed by determining the orientation of the portable information terminal 810 (whether the portable information terminal 810 is placed horizontally or vertically). The direction of display on the screen can also be changed by a touch on the display portion 812, operation with the operation buttons 813, sound input using the microphone 816, or the like.

The portable information terminal 810 has one or more of a telephone function, a notebook function, an information browsing function, and the like. Specifically, the portable information terminal 810 can be used as a smartphone. The portable information terminal 810 is capable of executing a variety of applications such as mobile phone calls, e-mailing, viewing and editing texts, music reproduction, video replay, Internet communication, and games.

Figure 24D:
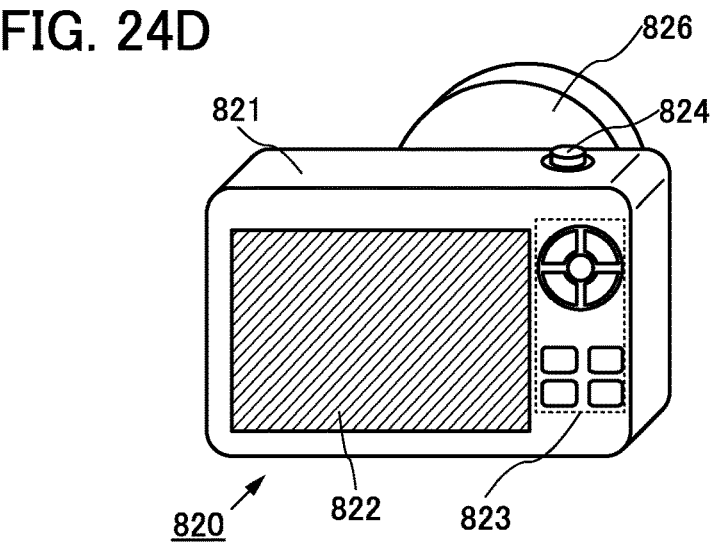

FIG. 24D illustrates an example of a camera. A camera 820 includes a housing 821, a display portion 822, operation buttons 823, a shutter button 824, and the like. The camera 820 is provided with an attachable lens 826.

The display portion 822 is provided with the display device of one embodiment of the present invention.

Although the lens 826 of the camera 820 here is detachable from the housing 821 for replacement, the lens 826 may be integrated with the housing 821.

Still images or moving images can be taken with the camera 820 by pushing the shutter button 824. In addition, images can be taken by a touch on the display portion 822 that serves as a touch panel.

Note that a stroboscope, a viewfinder, or the like can be additionally provided in the camera 820. Alternatively, these may be incorporated in the housing 821.

Figure 25A:
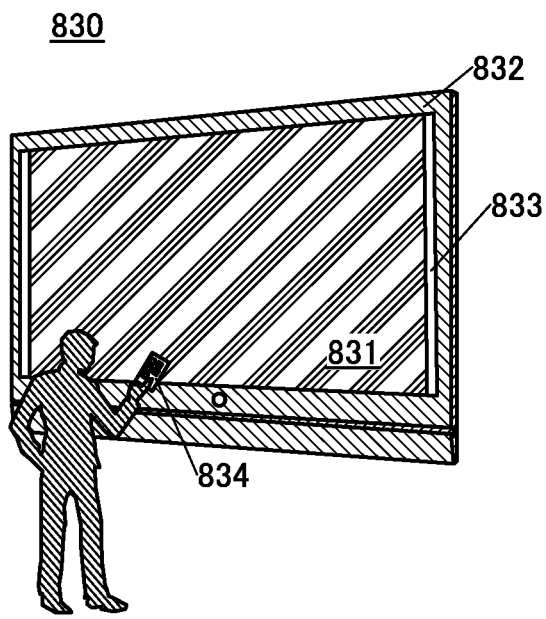
FIGS. 25A to 25C each illustrate structure examples of electronic devices of one embodiment.

FIG. 25A illustrates a television device 830. The television device 830 includes a display portion 831, a housing 832, a speaker 833, and the like. The television device 830 can further include an LED lamp, operation keys (including a power switch or an operation switch), a connection terminal, a variety of sensors, a microphone, and the like.

The television device 830 can be controlled with a remote controller 834.

The television device 830 can receive airwaves such as a ground wave and a wave transmitted from a satellite. The television device 830 can receive airwaves for analog broadcasting, digital broadcasting, and the like, and image-and-sound broadcasting, sound-only broadcasting, and the like. For example, the television device 830 can receive airwaves transmitted in a certain frequency band, such as a UHF band (about 300 MHz to 3 GHz) or a VHF band (30 MHz to 300 MHz). When a plurality of pieces of data received in a plurality of frequency bands is used, the transfer rate can be increased and more information can thus be obtained. Accordingly, the display portion 831 can display an image with a resolution higher than the full high definition, such as 4K, 8K, 16K, or more.

An image to be displayed on the display portion 831 may be generated using broadcasting data transmitted with technology for transmitting data through a computer network such as the Internet, a local area network (LAN), or Wi-Fi (registered trademark). In that case, the television device 830 does not necessarily include a tuner.

Figure 25B:
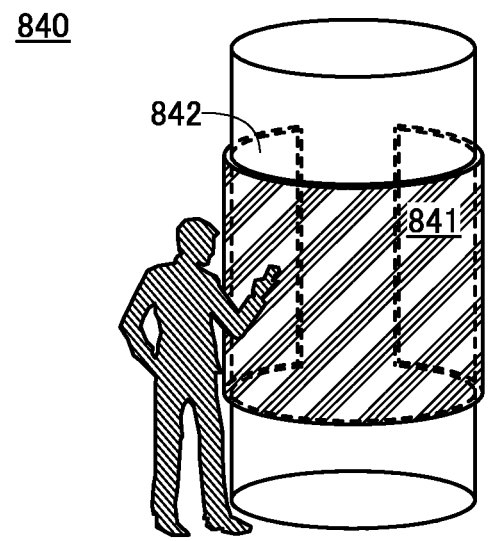

FIG. 25B illustrates a digital signage 840 mounted on a cylindrical pillar 842. The digital signage 840 includes a display portion 841.

The larger display portion 841 can provide more information at a time. In addition, a larger display portion 841 attracts more attention, so that the effectiveness of the advertisement can be increased, for example.

It is preferable to use a touch panel in the display portion 841 because a device with such a structure does not just display a still or moving image, but can be operated by users intuitively. Alternatively, in the case where the display device of one embodiment of the present invention is used for providing information such as route information or traffic information, usability can be enhanced by intuitive operation.

Figure 25C:
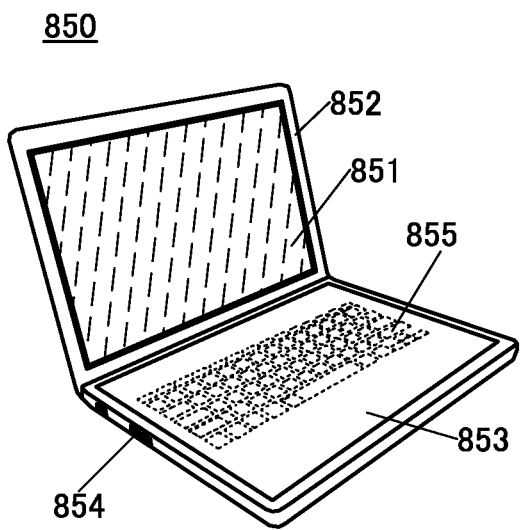

FIG. 25C illustrates a notebook personal computer 850. The personal computer 850 includes a display portion 851, a housing 852, a touch pad 853, a connection port 854, and the like.

The touch pad 853 functions as an input unit such as a pointing device or a pen tablet and can be controlled with a finger, a stylus, or the like.

Furthermore, a display element is incorporated in the touch pad 853. As illustrated in FIG. 25C, when an input key 855 is displayed on a surface of the touch pad 853, the touch pad 853 can be used as a keyboard. In that case, a vibration module may be incorporated in the touch pad 853 so that sense of touch is achieved by vibration when a user touches the input key 855.

Figure 26A:
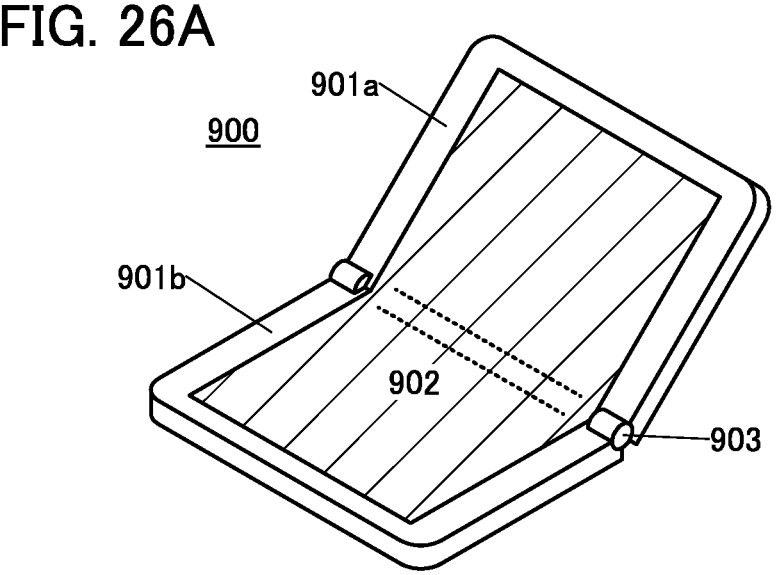
FIGS. 26A to 26C illustrate structure examples of an electronic device of one embodiment.
Figure 26B:
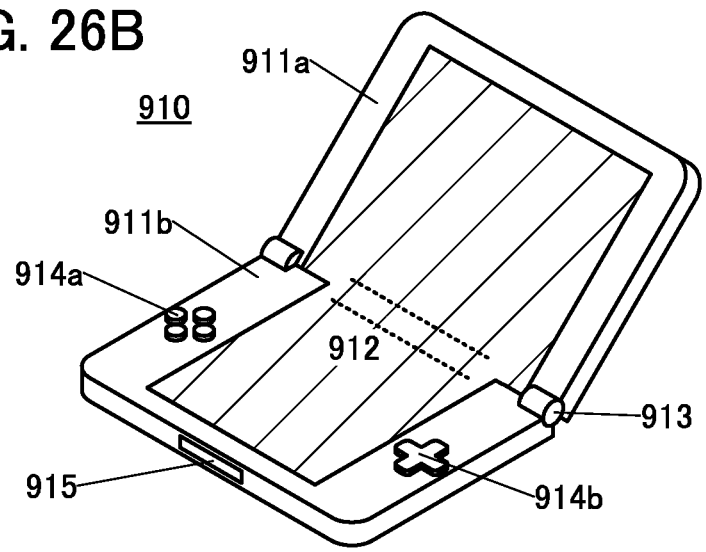
Figure 26C:
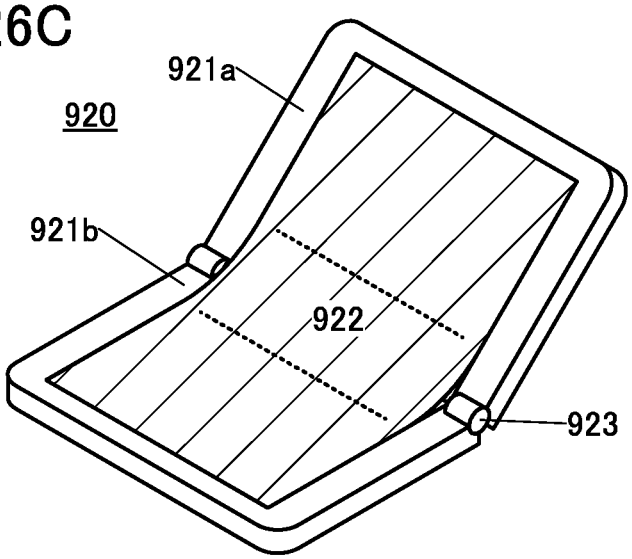

FIGS. 26A to 26C illustrate foldable electronic devices.

An electronic device 900 illustrated in FIG. 26A includes a housing 901a, a housing 901b, a hinge 903, a display portion 902, and the like. The display portion 902 is incorporated into the housing 901a and the housing 901b.

The housing 901a and the housing 901b are rotatably joined to each other by the hinge 903. The electronic device 900 can be changed in shape between a state where the housing 901a and the housing 901b are closed and a state where they are opened as shown in FIG. 26A. Thus, the electronic device has high portability when carried and excels in visibility when used because of its large display region.

The hinge 903 preferably includes a locking mechanism so that an angle between the housing 901a and the housing 901b does not become larger than a predetermined angle when the housing 901a and the housing 901b are opened. For example, an angle at which they become locked (they are not opened any further) is preferably greater than or equal to 90° and less than 180° and can be typically 90°, 120°, 135°, 150°, 175°, or the like. In that case, the convenience, safety, and reliability can be improved.

The display portion 902 functions as a touch panel and can be controlled with a finger, a stylus, or the like.

One of the housing 901a and the housing 901b is provided with a wireless communication module, and data can be transmitted and received through a computer network such as the Internet, a local area network (LAN), or Wi-Fi (registered trademark).

The display portion 902 is preferably formed using one flexible display, in which case an image can be displayed continuously between the housing 901a and the housing 901b. Note that each of the housings 901a and 901b may be provided with a display. It is preferable that in the state where the electronic device 900 is opened such that the housing 901a and the housing 901b are exposed, part of the flexible display included in the display portion 902 be held while being curved. Note that each of the housing 901a and the housing 901b may be provided with a display.

FIG. 26B illustrates an electronic device 910 that functions as a portable game console. The electronic device 910 includes a housing 911a, a housing 911b, a display portion 912, a hinge 913, an operation button 914a, an operation button 914b, and the like.

A cartridge 915 can be inserted into the housing 911b. The cartridge 915 stores application software such as a game, for example, and a variety of applications can be executed on the electronic device 910 by replacing the cartridge 915.

FIG. 26B shows an example in which the size of a portion of the display portion 912 overlapping with the housing 911a is different from the size of a portion of the display portion 912 overlapping with the housing 911b. Specifically, part of the display portion 912 of the housing 911a is larger than part of the display portion 912 overlapping with the housing 911b where the operation buttons 914a and 914b are provided. For example, the display portions can be used for different purposes by performing display using the display portion 912 on the housing 911a side as a main screen and on the housing 911b side as an operation screen.

In an electronic device 920 illustrated in FIG. 26C, a flexible display portion 922 is provided across a housing 921a and a housing 921b which are joined to each other by a hinge 923.

FIG. 26C shows an embodiment in which the display portion 922 is opened with a large curvature with the housing 921a and the housing 921b exposed. For example, the display portion 922 is held with a curvature radius of 1 mm or greater and 50 mm or less, preferably 5 mm or greater and 30 mm or less. Part of the display portion 922 can display an image while being bent display since pixels are continuously arranged from the housing 921a to the housing 921b.

Since the hinge 923 includes the above-described locking mechanism, excessive force is not applied to the display portion 922; thus, breakage of the display portion 922 can be prevented. Consequently, a highly reliable electronic device can be obtained.

At least part of this embodiment can be implemented in combination with any of the other embodiments described in this specification as appropriate.

This application is based on Japanese Patent Application serial no. 2016-195604 filed with Japan Patent Office on Oct. 3, 2016, the entire contents of which are hereby incorporated by reference.

What is claimed is:

1. A manufacturing method of a display device comprising:
    forming, over a support substrate, a first electrode, an insulating layer covering the first electrode, and a second electrode including a portion not overlapping with the first electrode over the insulating layer;
    forming, over a second substrate, a coloring layer and a fourth electrode over the coloring layer;
    bonding the support substrate and the second substrate such that a second liquid crystal layer containing a liquid crystal, a monomer, and a polymerization initiator is sandwiched therebetween, a portion where the coloring layer and the first electrode do not overlap with each other is formed, and a portion where the coloring layer and the second electrode overlap with each other is formed;
    polymerizing the monomer contained in the second liquid crystal layer in a region not overlapping with the coloring layer by light irradiation to the coloring layer and the second liquid crystal layer from the second substrate side;
    separating the support substrate from the first electrode to remove the support substrate; and
    bonding the second substrate and a first substrate such that a first liquid crystal layer containing a liquid crystal is sandwiched between the first substrate and the first electrode.

2. The manufacturing method of a display device according to claim 1, wherein a wavelength range of the light is ultraviolet light or infrared light.

3. The manufacturing method of a display device according to claim 2, wherein a wavelength of the ultraviolet light is 100 nm to 400 nm.

4. The manufacturing method of a display device according to claim 1, wherein the fourth electrode is configured to transmit the light.

5. The manufacturing method of a display device according to claim 1, further comprising the step of:
    forming a transistor over the insulating layer,
    wherein the transistor is electrically connected to the second electrode.

6. The manufacturing method of a display device according to claim 5, wherein the transistor contains a metal oxide in a semiconductor layer where a channel is formed.

* * * * *